US007312283B2

(12) United States Patent
Martin et al.

(10) Patent No.: US 7,312,283 B2
(45) Date of Patent: *Dec. 25, 2007

(54) POLYMERIZATION CATALYSTS AND PROCESS FOR PRODUCING BIMODAL POLYMERS IN A SINGLE REACTOR

(75) Inventors: Joel L. Martin, Bartlesville, OK (US); Matthew G. Thorn, Mason, OH (US); Max P. McDaniel, Bartlesville, OK (US); Michael D. Jensen, Laurel, MD (US); Qing Yang, Bartlesville, OK (US); Paul J. DesLauriers, Bartlesville, OK (US); Mark E. Kertok, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/209,006

(22) Filed: Aug. 22, 2005

(65) Prior Publication Data

US 2007/0043176 A1 Feb. 22, 2007

(51) Int. Cl.
*C08F 4/76* (2006.01)
*B01J 31/38* (2006.01)

(52) U.S. Cl. .............. 526/116; 526/114; 526/113; 526/160; 526/170; 526/126; 526/127; 526/129; 526/130; 526/348.2; 526/348.6; 526/351; 526/352; 526/943; 502/103

(58) Field of Classification Search ............. 502/113, 502/103; 526/119, 118, 156, 195, 127, 129, 526/160, 170, 943, 116
See application file for complete search history.

(56) References Cited

U.S. PATENT DOCUMENTS

| | | | |
|---|---|---|---|
| 4,547,551 A | 10/1985 | Bailey et al. | |
| 4,939,217 A | 7/1990 | Stricklen | |
| 5,071,808 A | 12/1991 | Antberg et al. | |
| 5,075,467 A | 12/1991 | Desobry | |
| 5,191,132 A | 3/1993 | Patsidis et al. | |
| 5,223,467 A | 6/1993 | Razavi | |
| 5,483,014 A | 1/1996 | Turner et al. | |
| 5,498,581 A | 3/1996 | Welch et al. | |
| 5,534,473 A | 7/1996 | Welch et al. | |
| 5,594,078 A | 1/1997 | Welch et al. | |
| 5,594,080 A | 1/1997 | Waymouth et al. | |
| 5,646,322 A | 7/1997 | van Beek et al. | |
| 5,700,748 A | 12/1997 | Murray | |
| 5,719,241 A | 2/1998 | Razavi et al. | |
| 5,780,659 A | 7/1998 | Schmid et al. | |
| 5,854,363 A | 12/1998 | Jung et al. | |
| 5,866,497 A | 2/1999 | Murray | |
| 5,886,202 A | 3/1999 | Jung et al. | |
| 5,907,021 A | 5/1999 | Turner et al. | |
| 6,107,230 A | 8/2000 | McDaniel et al. | |
| 6,165,929 A | 12/2000 | McDaniel et al. | |
| 6,262,201 B1 | 7/2001 | Welch et al. | |
| 6,268,447 B1 | 7/2001 | Murray et al. | |
| 6,274,684 B1 | 8/2001 | Loveday et al. | |
| 6,291,699 B1 | 9/2001 | Birmingham et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,391,816 B1 | 5/2002 | McDaniel et al. | |
| 6,395,666 B1 | 5/2002 | McDaniel et al. | |
| 6,462,161 B1 | 10/2002 | Cady et al. | |
| 6,482,905 B1 | 11/2002 | Schmidt et al. | |
| 6,489,263 B2 | 12/2002 | Murray et al. | |
| 6,524,987 B1 | 2/2003 | Collins et al. | |
| 6,541,413 B1 | 4/2003 | Razavi et al. | |
| 6,548,441 B1 | 4/2003 | McDaniel et al. | |
| 7,041,617 B2 * | 5/2006 | Jensen et al. | 502/113 |
| 2005/0159300 A1 * | 7/2005 | Jensen et al. | 502/103 |

FOREIGN PATENT DOCUMENTS

| | | |
|---|---|---|
| DE | 1 959 322 | 11/1969 |
| EP | 1 201 711 A1 | 5/2002 |
| EP | 1 405 866 A1 | 4/2004 |
| JP | 9-59289 | 3/1997 |
| WO | WO 99/60033 A1 | 11/1999 |
| WO | WO 01/23433 A1 | 4/2001 |

(Continued)

OTHER PUBLICATIONS

Wengrovius, J. et al., "Attempts to Prepare Alkylidene Zirconium Complexes by Hydrogen Atom Abstraction", J. Organometallic Chem., vol. 205, pp. 319-327 (1981).
Erker, G et al., "Convenient Route to Monocyclopentadienyl-zirconium (IV) Complexes", Inorg. Chem., vol. 21, pp. 1277-1278 (1982).
Sandman, D. et al., "5,6:11,12-Bis(ditelluro)tetracene: Syntheses, Molecular, and Supramolecular Properties", Organometallics, vol. 1, pp. 739-742 (1982).
Llinás, G. et al., "(C5Me5) SiMe3 as a Mild and Effective Reagent for Transfer of the C5Me5 Ring: an improved Route . . . ", J. Organometallic Chem., vol. 304, pp. 37-40 (1988).

(Continued)

*Primary Examiner*—David W. Wu
*Assistant Examiner*—Rip A. Lee
(74) *Attorney, Agent, or Firm*—Merchant & Gould, LLC

(57) ABSTRACT

Catalyst compositions comprising a first metallocene compound, a second metallocene compound, an activator-support, and an organoaluminum compound are provided. Methods for preparing and using such catalysts to produce polyolefins are also provided. The compositions and methods disclosed herein provide ethylene polymers having a HLMI of from about 0.5 to about 25, a polymer density of from about 0.920 to about 0.965, and a polydispersity of from about 3.0 to about 30.

75 Claims, 2 Drawing Sheets

FOREIGN PATENT DOCUMENTS

| | | |
|---|---|---|
| WO | WO 01/23434 A1 | 4/2001 |
| WO | WO 01/41920 A1 | 6/2001 |
| WO | WO 01/44309 A1 | 6/2001 |
| WO | WO 01/58587 A1 | 8/2001 |
| WO | WO 01/83498 A1 * | 11/2001 |
| WO | WO 01/90239 A1 | 11/2001 |
| WO | WO 03/008468 A1 | 1/2003 |
| WO | WO 03/020821 A1 | 3/2003 |

OTHER PUBLICATIONS

Lund, E. et al., "Rapid and Efficient Procedures for the Synthesis of Monocyclopentadienyl Complexes of Hafnium and Zirconium", Organometallics, vol. 9, pp. 2426-2427 (1990).

Winter, C. et al., "Cyclopentadienylmetal Trichloride Formation versus Metallocene Dichloride Formaton in the Reactions . . . ", Organometallics, vol. 10, pp. 210-214 (1991).

Martin, A. et al., "Molecular Structure of trichloro(n5-pentamethylcyclopentadienyl) zirconium (IV)", J. Organometallic Chem., vol. 480, pp. C10-C11 (1994).

Sitzmann, H. et al., "Titan-, Zirconium- und Hafniumkomplexe mit 1,2,4-Tri-tert-bytyl-cyclopentadienyl . . . ", Chem. Ber., vol. 127, pp. 3-9 (1994).

Hitchcock, P. et al. "Ligand Redistribution Reactions As A Route to Cyclopentadienyl- or 1-aza-allylzirconium (IV) . . . ", Polyhedron, vol. 14, No. 19, pp. 2745-2752 (1995).

Amor, J. et al., "Synthesis of bis(tert-butyl)cyclopentaidienyl Derivatives of Titanium and Zirconium . . . ", J. Organmetallic Chem., vol. 497, pp. 127-131 (1995).

Kravchenko, R. et al., "Propylene Polymerization with Chiral and Archiral Unbridged 2-Arylindene Metallocences", Organometallics, vol. 16, pp. 3635-3639 (1997).

Peifer, PhD., B., Self-Immobilizing Metallocene Catalysts for the Polymerization of Olefins, Dissertation, Univ. of Bayreauth—Germany (1995).

Jung, M., "ansa Metallocene Complexes of Zirconium as Catalysts for the Olefin Polymerization", Dissertation, Univ. of Bayreauth—Germany (1997).

Koppl, A., "Aluminoxane Based Immobilized Cocatalysts for Heterogeneous Olefin Polymerization", Disseration, Univ. of Bayreauth—Germany (Dec. 13, 1997—updated).

Deppner, M., "Substituted Idenyl Complexes of Zirconium as Catalysts for Olefin Polymerization", Dissertation, Univ. of Bayreauth—Germany (Feb. 1998).

Jany, G., et al., Para-fluro benzyl Substituted bis(indenyl)metallocene as Catalysts Precursors in Ethene Polymerization, J. Organo. Chem., vol. 533, pp. 173-178 (Feb. 1998).

Licht, E., "Metallacyclic Zirconocene Complexes as Catlaysts for Homogenous and Heterogeneous Olefin . . . ", Dissertation, Univ. of Bayreauth—Germany (May 14, 1998—updated).

Naga, N. et al., "Stereochemical Control in Propylene Polymerization with Non-Bridged Metallocene Dichloride/Methyaluminoxane", Polymer, vol. 39, No. 13, pp. 2703-2708 (1998).

Licht, E. et al., "Phenylalkyl-substituted zirconocene dichloride complexes as Catalysts Precursors for Homogenous . . . ", J. Organometallic Chem., vol. 599, pp. 275-287 (2000).

* cited by examiner

POLYMERIZATION CATALYSTS AND PROCESS FOR PRODUCING BIMODAL POLYMERS IN A SINGLE REACTOR

TECHNICAL FIELD OF THE INVENTION

This invention relates to the field of olefin polymerization catalysis, catalyst compositions, methods for the polymerization and copolymerization of olefins, and polyolefins.

BACKGROUND OF THE INVENTION

Polyethylene (PE) is consumed in the USA at the rate of over ten million metric tons every year. Presently, a variety of PE resins can be used to produce high stiffness pipe used in water, gas, and other fluid transport applications. Polyethylene pipe classified as PE-100, MRS 10, or ASTM D3350 typical cell classification 345566C is especially desirable for use under conditions requiring higher pressure ratings. To obtain a PE-100 classification, PE-100 pipe is required to meet certain standards specifying stiffness, resistance to slow crack growth, resistance to chemical attack, and low-temperature toughness (expressed as rapid crack propagation). Further, such pipe must meet a deformation standard that is determined under pressure at elevated temperatures.

It is also desirable for PE-100 pipe to exhibit toughness. This characteristic can be important in many polyethylene pipe applications, for example, where the pipe is buried underground or where the pipe is used to transport coarse or abrasive slurries. Accordingly, there is a need for a resin and a PE-100 pipe made therefrom that has improved physical properties and impact resistance properties.

With conventional processes and resins, there is a trade off between high stiffness and high environmental stress cracking resistance (ESCR). While either high stiffness or high ESCR items can be manufactured, conventional processes do not produce items having both high stiffness and high ESCR.

There is a need for a means of producing bimodal ethylene copolymers in which the component polymers have narrow molecular weight distributions and in which the comonomer can preferentially be placed in the high molecular weight portion, if desired. Further, there is a need for a cost-effective catalyst system for controlling the level of long chain branching (LCB) in PE to levels appropriate for resin applications such as HDPE film, pipe and bottles.

SUMMARY OF THE INVENTION

The present invention generally relates to a catalyst composition including at least two metallocene compounds, an activator, and a cocatalyst. The present invention further relates to processes for producing such a catalyst composition, polymerization processes, and polymers produced therefrom. The metallocene compounds are combined with an activator, an aluminum alkyl compound, and an olefin monomer to produce a polyolefin having a bimodal molecular weight distribution. The resulting polymers feature an outstanding balance of stiffness and slow crack growth resistance. Additionally, the polymers produced according to the present invention have excellent impact strength.

In accordance with the present invention, the two metallocene compounds are selected such that the polymers produced therefrom have two distinctly different molecular weights. One of the metallocenes, generally a tightly bridged metallocene containing a substituent that includes a terminal olefin, produces a high molecular weight component. Another metallocene, which is generally not bridged and may be more responsive to hydrogen than the first metallocene, produces a low molecular weight component of the resin.

According to one aspect, a catalyst composition comprises a first metallocene compound, a second metallocene compound, an activator-support, and an organoaluminum compound. The first metallocene compound has the formula:

$$(X^1)(X^2R^1_2)(X^3)(X^4)M^1;$$

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aliphatic or aromatic group having from 1 to about 20 carbon atoms. A second substituent of the disubstituted bridging group is an unsaturated aliphatic group having from 3 to about 10 carbon atoms. $R^1$ is H, an alkyl group having from 1 to about 12 carbon atoms, or an aryl group having from 1 to about 12 carbon atoms; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group may be a phenyl group, a cyclohexylphenyl group, a naphthyl group, or a methyl group. The second substituent of the disubstituted bridging group may be a butenyl group, a pentenyl group, or a hexenyl group.

According to this and other aspects of the present invention, the first metallocene can include, but is not limited to:

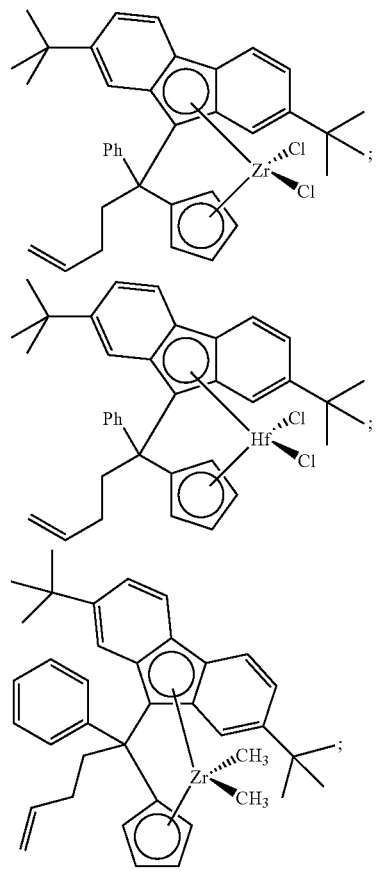

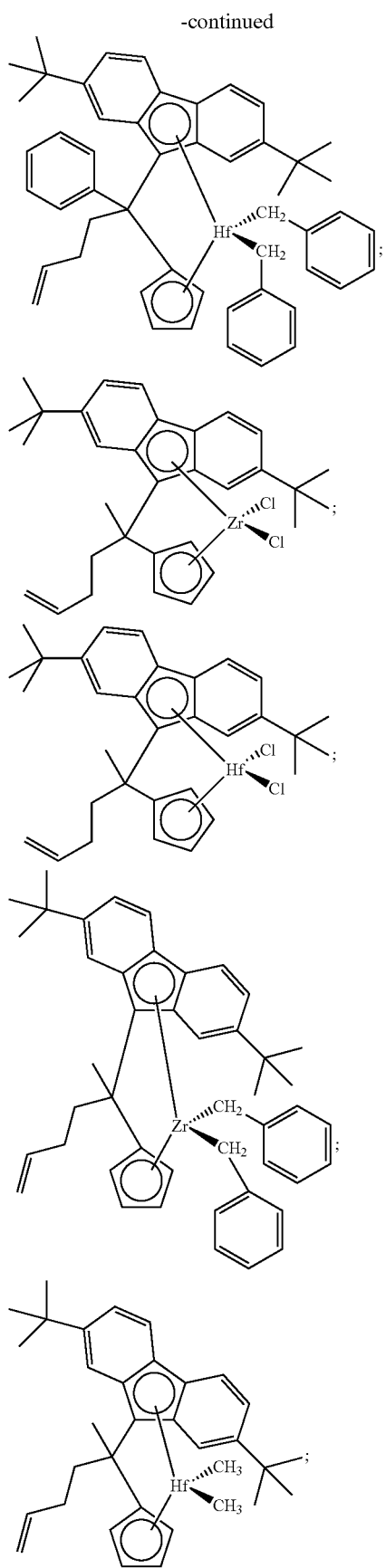
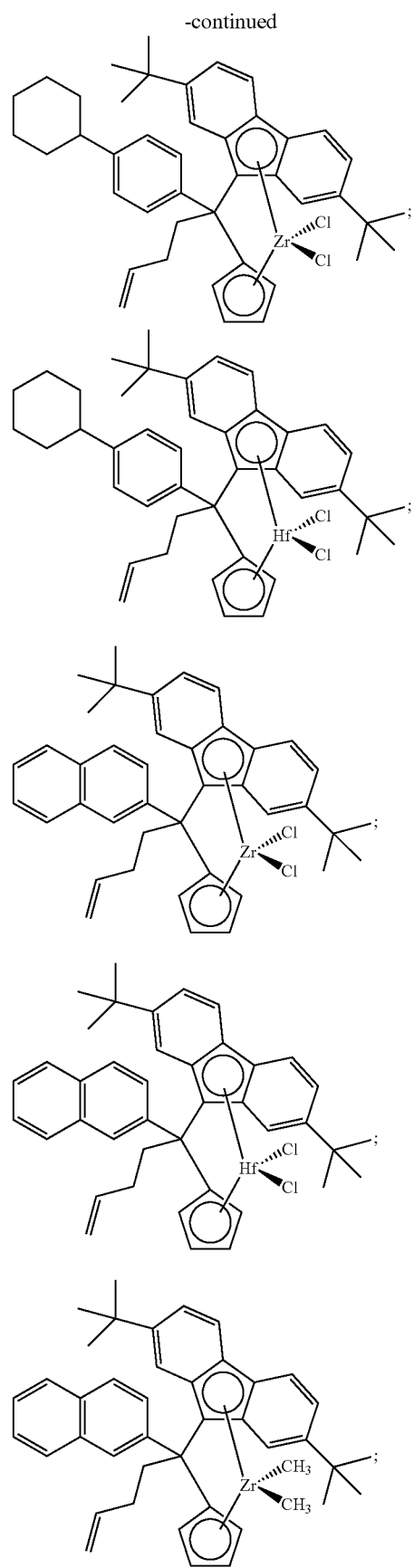

-continued
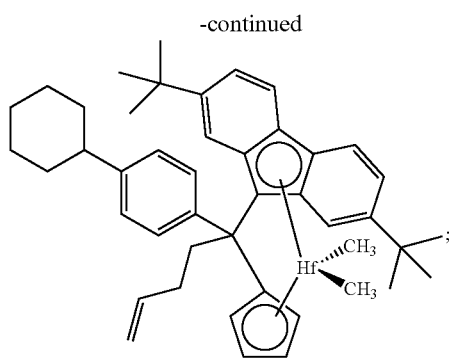
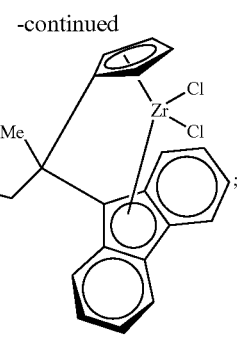
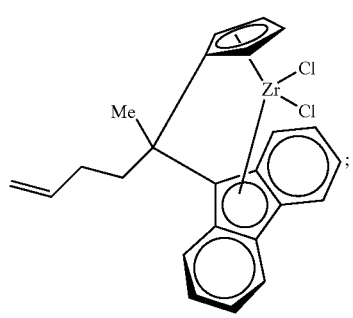
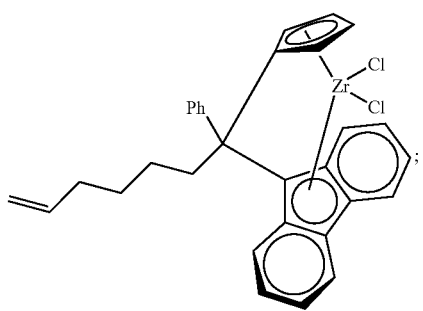
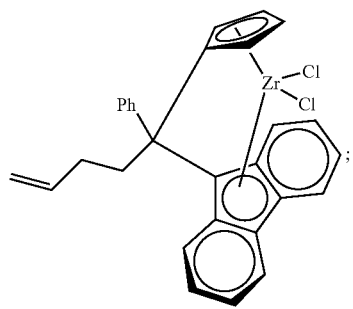
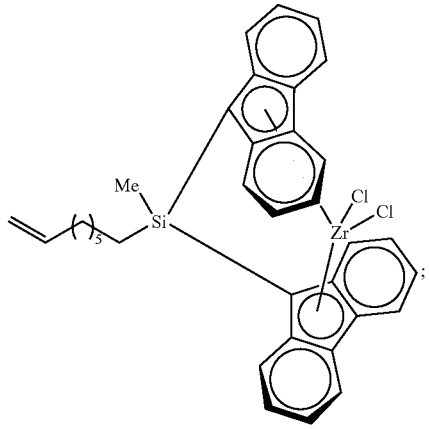
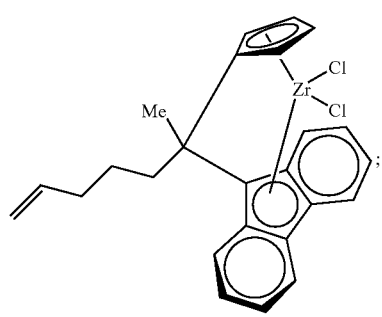
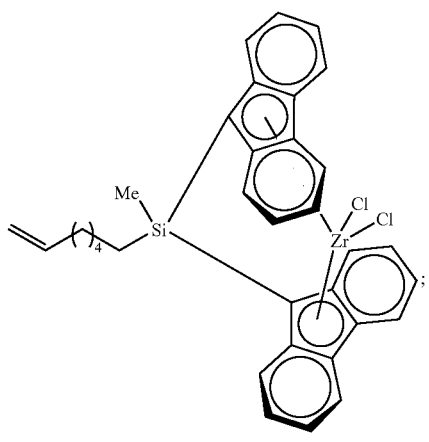
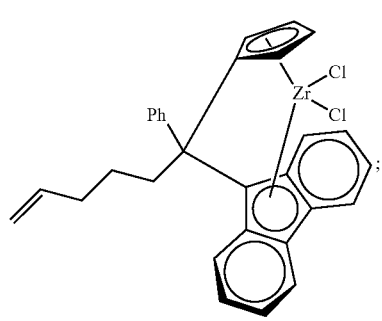

-continued

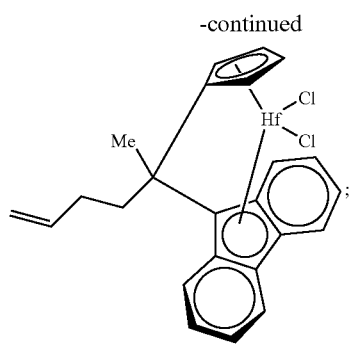

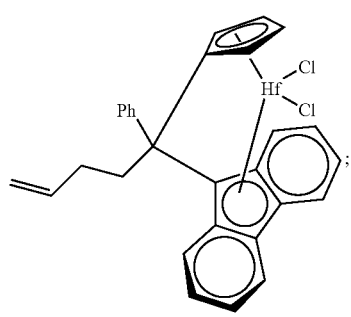

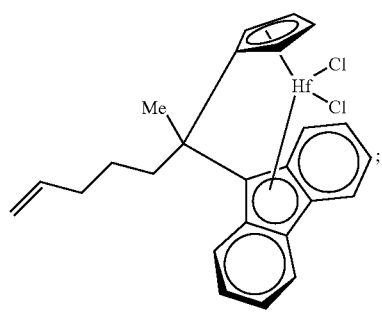

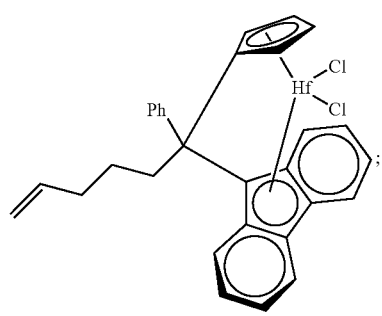

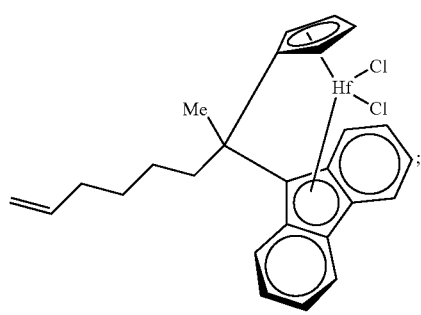

-continued

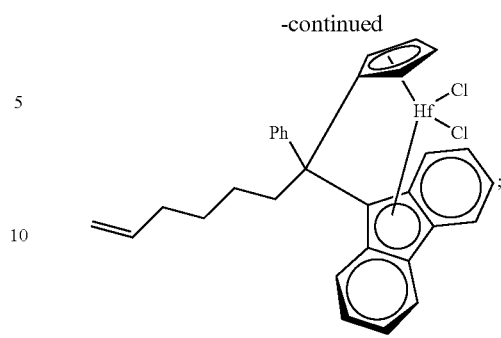

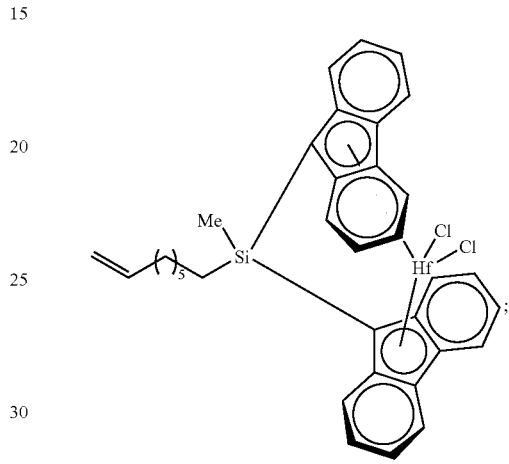

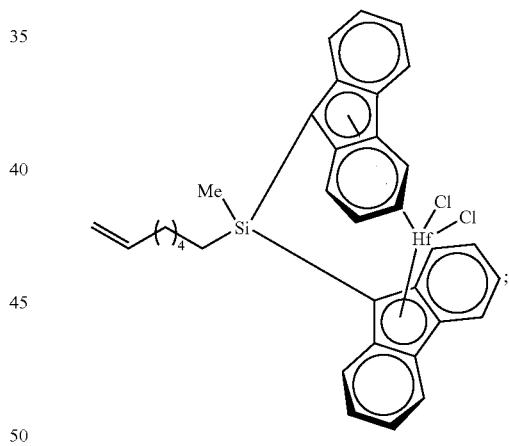

or any combination thereof.

The second metallocene compound has the formula:

$(X^5)(X^6)(X^7)(X^8)M^2;$ wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

According to this and other aspects of the present invention, the second metallocene can include but is not limited to:
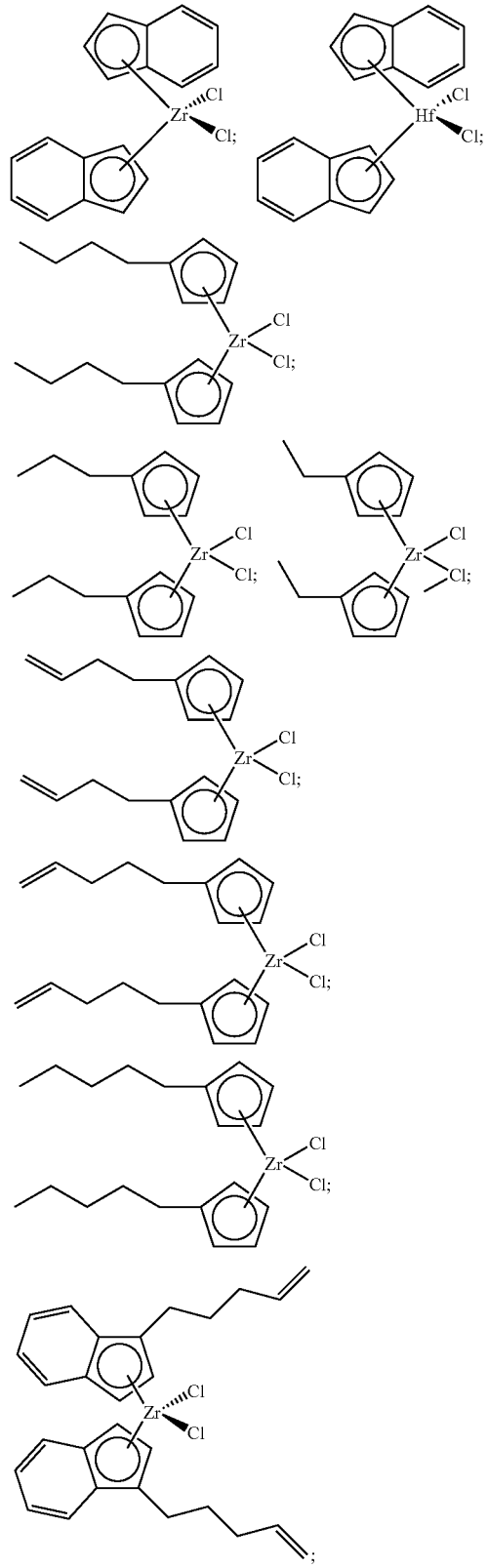
-continued
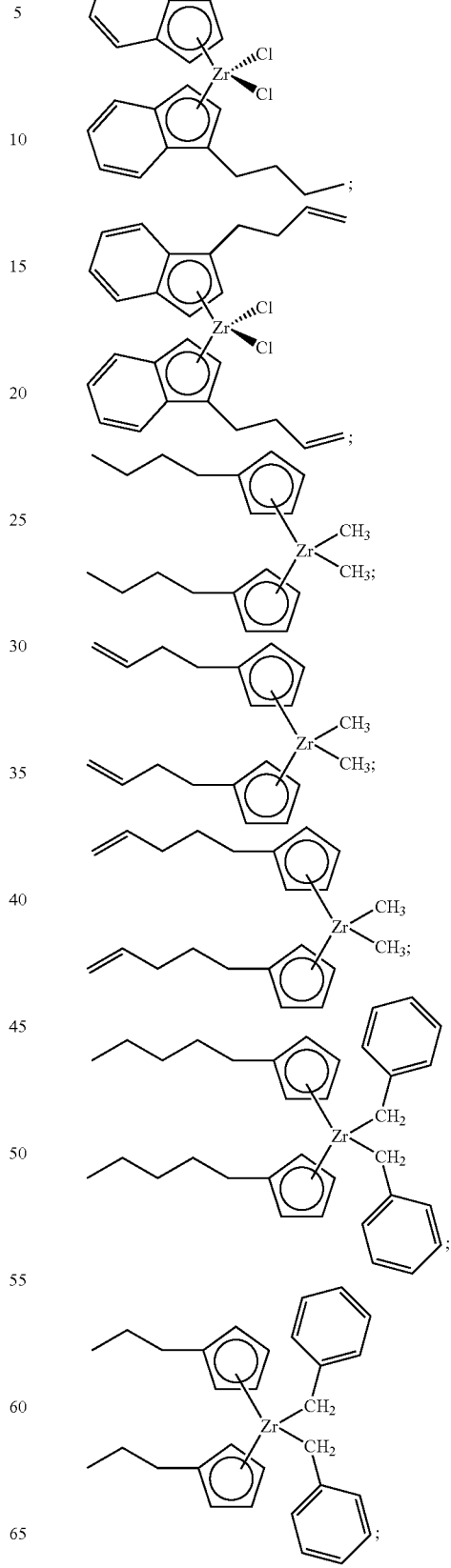

-continued

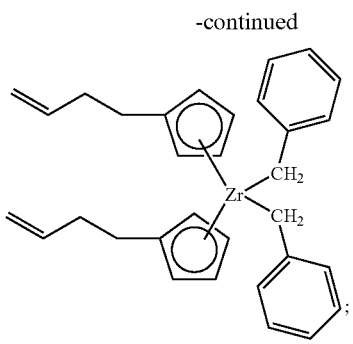

or any combination thereof.

According to this and other aspects of the present invention, the ratio of the first metallocene compound to the second metallocene compound may be from about 1:10 to about 10:1. According to other aspects of the present invention, the ratio of the first metallocene compound to the second metallocene compound may be from about 1:5 to about 5:1. According to yet other aspects of the present invention, the ratio of the first metallocene compound to the second metallocene compound may be from about 1:2 to about 2:1.

According to this and other aspects of the present invention, the activator-support may be a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof.

The organoaluminum compound used with the present invention may have the formula:

$(R^2)_3Al;$ in which $(R^2)$ is an aliphatic group having from 2 to about 6 carbon atoms. In some instances, $(R^2)$ is ethyl, propyl, butyl, hexyl, or isobutyl.

According to another aspect of the present invention, a catalyst composition comprises an ansa-metallocene compound, an unbridged metallocene compound, an activator-support, and an organoaluminum compound. The ansa-metallocene compound is:

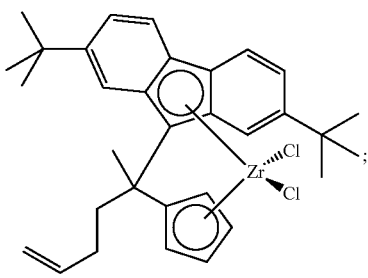

-continued

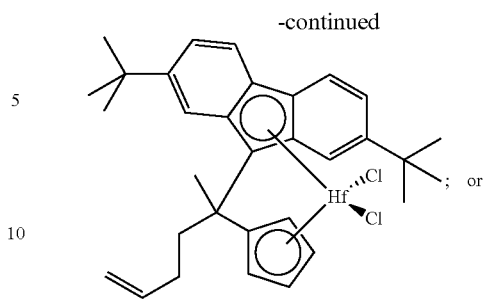

a combination thereof.

The unbridged metallocene compound is:

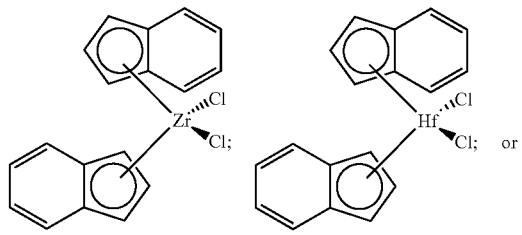

a combination thereof.

According to this and other aspects of the present invention, the activator-support may be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, a pillared clay, or any combination thereof.

According to yet another aspect of the present invention, a catalyst composition comprises an ansa-metallocene compound, an unbridged metallocene compound, an activator-support, and an organoaluminum compound. The ansa-metallocene compound is:

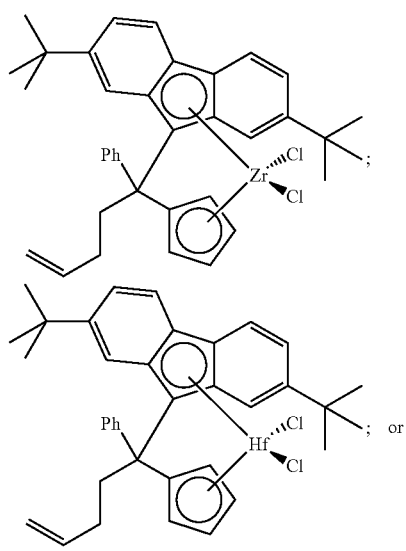

a combination thereof.

The unbridged metallocene has the formula:

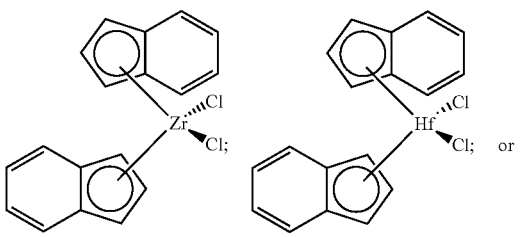

a combination thereof.

The catalyst composition of the present invention may thus comprise a first metallocene compound, a second metallocene compound, an activator-support, and at least one organoaluminum compound, wherein:

(a) the first metallocene compound is:

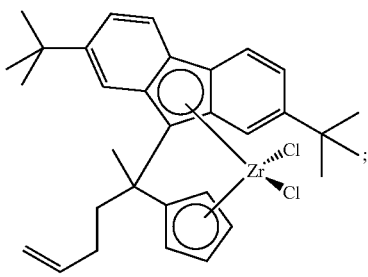

(b) the second metallocene is:

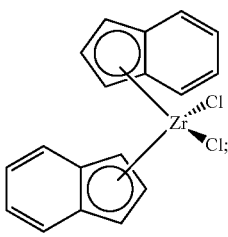

(c) the activator-support is sulfated alumina; and
(d) the organoaluminum compound is triethylaluminum.

The present invention also contemplates a catalyst composition comprising a first metallocene compound, a second metallocene compound, an activator-support, and at least one organoaluminum compound, wherein:

(a) the first metallocene compound is:

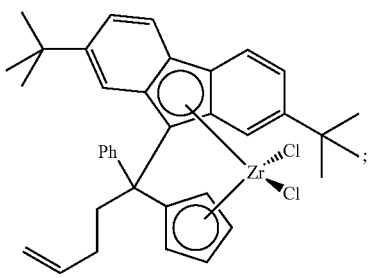

(b) the second metallocene is:

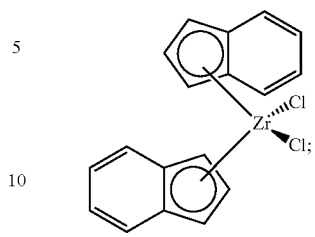

(c) the activator-support is sulfated alumina; and
(d) the organoaluminum compound is triethylaluminum.

The present invention also contemplates a process for polymerizing olefins in the presence of a catalyst composition. The process comprises contacting the catalyst composition with at least one type of olefin monomer under polymerization conditions, where the catalyst composition comprises an ansa-metallocene compound, an unbridged metallocene compound, an activator-support, and an organoaluminum compound. The ansa-metallocene compound has the formula:

$$(X^1)(X^2R^1{}_2)(X^3)(X^4)M^1;$$

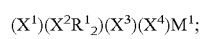

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aliphatic or aromatic group having from 1 to about 20 carbon atoms. A second substituent of the disubstituted bridging group is an unsaturated aliphatic group having from 3 to about 10 carbon atoms. $R^1$ is H, an alkyl group having from 1 to about 12 carbon atoms, or an aryl group having from 1 to about 12 carbon atoms; $(X^3)$ and $(X^4)$ are independently a halide; and $M^1$ is Zr or Hf.

The unbridged metallocene has the formula:

$$(X^5)(X^6)(X^7)(X^8)M^2;$$

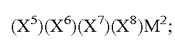

wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently a halide, and $M^2$ is Zr or Hf.

The present invention further contemplates a process for producing a catalyst composition comprising contacting a first metallocene compound, a second metallocene compound, an activator-support, and at least one organoaluminum compound. The first metallocene compound has the formula:

$$(X^1)(X^2R^1{}_2)(X^3)(X^4)M^1;$$

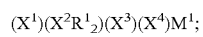

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group comprises an aliphatic or aromatic group having from 1 to about 20 carbon atoms. A second substituent of the disubstituted bridging group is an unsaturated aliphatic group having from 3 to about 10 carbon atoms. $R^1$ is H, an alkyl group having from 1 to about 12 carbon atoms, or an aryl group having from 1 to about 12 carbon atoms; $(X^3)$ and $(X^4)$ independently are a halide; and $M^1$ is Zr or Hf.

The second metallocene has the formula:

$$(X^5)(X^6)(X^7)(X^8)M^2;$$

wherein $(X^5)$ and $(X^6)$ are independently selected from a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; and, $(X^7)$ and $(X^8)$ independently are a halide, and $M^2$ is Zr or Hf.

The present invention further contemplates a polymer or copolymer of ethylene characterized by a HLMI of from about 0.5 to about 25, a polymer density of from about 0.920 to about 0.965, and a polydispersity of from about 3.0 to about 30. The polymer or copolymer of ethylene may be characterized further by a weight average molecular weight greater than about 50,000. The polymer or copolymer of ethylene may be characterized still further by a PENT value greater than about 10 hours.

The present invention also contemplates a polymer or copolymer of ethylene characterized by an HLMI of from about 3.0 to about 15, a polymer density of from about 0.935 to about 0.960, and a polydispersity of from about 5.0 to about 30. The polymer or copolymer of ethylene may be characterized further by a weight average molecular weight greater than about 150,000. The polymer or copolymer of ethylene may be characterized still further by a PENT value greater than about 30.

The present invention further contemplates a polymer or copolymer of ethylene characterized by a HLMI of from about 4.0 to about 10, a polymer density of from about 0.940 to about 0.955, and a polydispersity of from about 6.0 to about 25. The polymer or copolymer of ethylene may be characterized further by an average molecular weight greater than about 200,000. The polymer or copolymer of ethylene may be characterized still further by a PENT value of greater than about 500 hours.

A method of making a PE-100 pipe is also encompassed by the present invention. The method includes extruding the polymer or copolymer in a molten state through a die to form the PE-100 pipe and cooling the pipe.

Additionally, a PE-100 pipe comprising the polymer or copolymer of the present invention is contemplated.

DEFINITIONS

Figure 1:
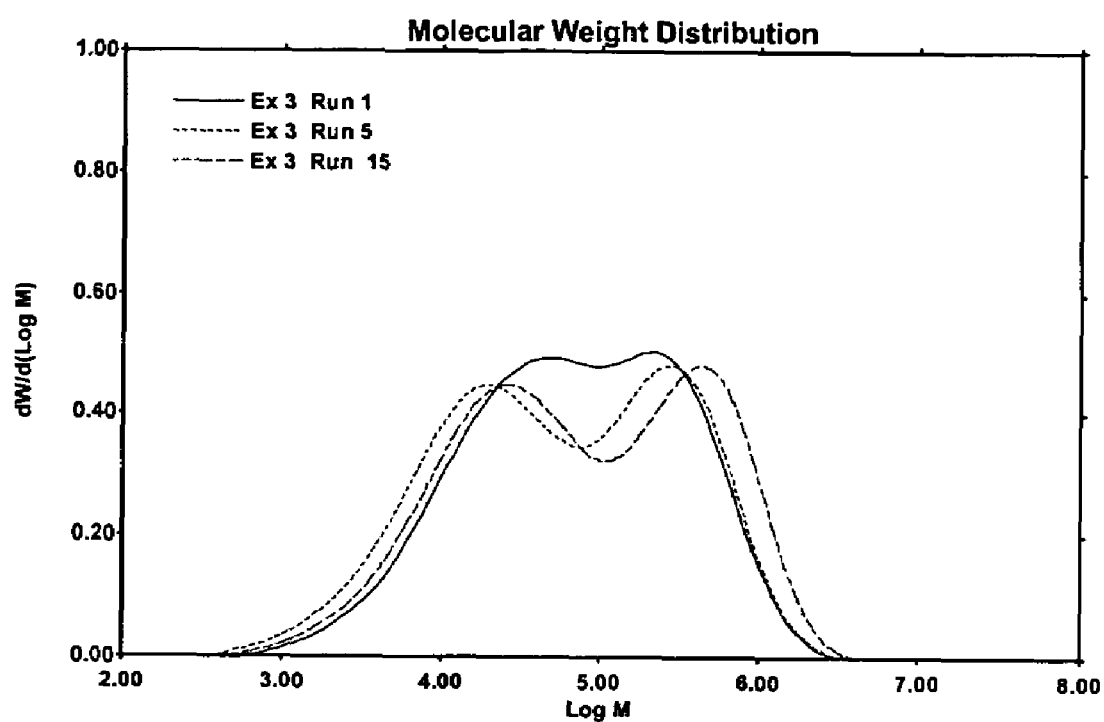
FIG. 1 presents gel permeation chromatography curves for Runs 1, 5, and 12 of Example 3, prepared according to the present invention.

To define more clearly the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and copolymers of ethylene and another olefinic comonomer. "Polymer" is also used herein to mean homopolymers and copolymers of any olefin monomer disclosed herein.

The term "cocatalyst" is used generally herein to refer to the organoaluminum compounds that may constitute one component of the catalyst composition. Additionally, "cocatalyst" refers to the optional components of the catalyst composition including, but not limited to, aluminoxanes, organoboron compounds, organozinc compounds, or ionizing ionic compounds, as disclosed herein. The term "cocatalyst" may be used regardless of the actual function of the compound or any chemical mechanism by which the compound may operate. In one aspect of this invention, the term "cocatalyst" is used to distinguish that component of the catalyst composition from the metallocene compound.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[\text{cation}]^+[BY_4]^-$, where Y represents a fluorinated organic group. For convenience, fluoroorgano boron and fluoroorgano borate compounds are typically referred to collectively by "organoboron compounds" or by either name as the context requires.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound (or compounds), olefin monomer, and organoaluminum compound (or compounds), before this mixture is contacted with the activator-support and optional additional organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of the metallocene compound, olefin monomer, organoaluminum compound, and chemically-treated solid oxide, formed from contacting the precontacted mixture of a portion of these components with any additional components added to make up the postcontacted mixture. Generally, the additional component added to make up the postcontacted mixture is the chemically-treated solid oxide, and, optionally, may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term "metallocene", as used herein, describes a compound comprising two $\eta^5$-cycloalkadienyl-type ligands in the molecule. Thus, the metallocenes of this invention are bis($\eta^5$-cyclopentadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound. Unless otherwise specified, the following abbreviations are used: Cp for cyclopentadienyl; Ind for indenyl; and Flu for fluorenyl.

The terms "catalyst composition", "catalyst mixture", and the like do not depend upon the actual product resulting from the contact or reaction of the components of the mixtures, the nature of the active catalytic site, or the fate of the aluminum cocatalyst, the metallocene compound, any olefin monomer used to prepare a precontacted mixture, or the chemically-treated solid oxide after combining these components. Therefore, the terms "catalyst composition", "catalyst mixture", and the like may include both heterogeneous compositions and homogenous compositions.

The term "hydrocarbyl" is used herein to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms "chemically-treated solid oxide", "solid oxide activator-support", "acidic activator-support", "activator-support", "treated solid oxide compound", or simply "activator", and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

DETAILED DESCRIPTION OF THE INVENTION

The present invention is directed generally to new catalyst compositions, methods for preparing catalyst compositions, methods for using the catalyst compositions to polymerize olefins, the resins polymerized using the catalysts, and the pipe comprising these resins. In particular, the present invention relates to new catalyst compositions and methods of using such catalyst compositions to form polyolefins having an excellent balance of stiffness and slow crack growth resistance. The invention is also directed to polyolefins and PE 100 pipe having an excellent balance of stiffness and slow crack growth resistance. Resin that can be employed to produce both small diameter (1 inch to 12 inches in diameter) and large diameter (greater than 12 inches in diameter) PE-100 pipe is described in U.S. Patent Application Pub. No. 2003/0199648 A1 (U.S. patent application Ser. No. 10/373,648), published Oct. 23, 2003, which is incorporated herein by reference in its entirety.

The catalyst composition includes at least two metallocenes. The first metallocene is used to produce a high molecular weight component, and is generally a tightly bridged metallocene containing a substituent that includes a terminal olefin. The second metallocene, used to produce the low molecular weight component, is generally not bridged and is more responsive to hydrogen than the first metallocene. The metallocenes are combined with a solid activator, an aluminum alkyl compound, and an olefin monomer to produce the desired bimodal polyolefin. It has been discovered that the bi-metallocene catalyst system of the present invention provides a useful combination of polyolefin properties, such as stiffness and slow crack growth resistance, so the resin is suitable for blowing film, forming a pipe, and so forth.

According to one aspect of the present invention, a composition of matter is provided. The composition includes a first metallocene compound, a second metallocene compound, an activator-support, and an organoaluminum compound. According to other aspects, the present invention is directed to a catalyst composition, a catalyst composition for polymerizing olefins, a method of preparing a catalyst composition, a method of using a catalyst composition, and the like, in each case encompassing a first metallocene compound, a second metallocene compound, an activator-support, and an organoaluminum compound. The present invention is further directed to a method for producing polyolefins and pipe, and the polyolefins and pipe produced therefrom.

A. Catalyst Composition and Components

The present invention is directed to a catalyst composition comprising a first metallocene compound, a second metallocene compound, an activator-support, and an organoaluminum compound. The first metallocene produces a high molecular weight component, and is generally a tightly bridged metallocene containing a substituent that includes a terminal olefin. The second metallocene, used to produce the low molecular weight component, is generally not bridged and is more responsive to hydrogen than the first metallocene. The combination of metallocenes is used with an activator-support and an organoaluminum compound to form polyolefins having an excellent balance of stiffness and slow crack growth resistance.

Catalyst compositions comprising various combinations of these metallocenes including, but not limited to, at least one first metallocene compound, at least one second metallocene compound, and any combination of more than one first metallocene compound, more than one second metallocene compound are also contemplated by this invention. Further, use of more than one activator-support and more than one organoaluminum compound is also contemplated.

1. The Metallocene Compounds (a) The First Metallocene Compound

According to one aspect of the present invention, the first metallocene compound is an ansa-metallocene compound having the formula:

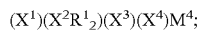

wherein $(X^1)$ is cyclopentadienyl, indenyl, or fluorenyl; $(X^2)$ is fluorenyl; and $(X^1)$ and $(X^2)$ are connected by a disubstituted bridging group comprising one atom bonded to both $(X^1)$ and $(X^2)$, wherein the atom is carbon or silicon;

wherein a first substituent of the disubstituted bridging group comprises an aliphatic or aromatic group having from 1 to about 20 carbon atoms; a second substituent of the disubstituted bridging group is an unsaturated aliphatic group having from 3 to about 10 carbon atoms; $R^1$ is H, an alkyl group having from 1 to about 12 carbon atoms, or an aryl group having from 1 to about 12 carbon atoms; $(X^3)$ and $(X^4)$ independently are a halide; and $M^1$ is Zr or Hf.

The first substituent of the disubstituted bridging group may be a phenyl group, a cyclohexylphenyl group, a naphthyl group, or a methyl group. The second substituent of the disubstituted bridging group may be a butenyl group, a pentenyl group, or a hexenyl group.

According to yet another aspect of the present invention, the first metallocene is an ansa-metallocene compound having the formula:

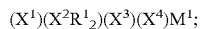

wherein $(X^1)$ is cyclopentadienyl, indenyl, or fluorenyl; $(X^2)$ is fluorenyl; $(X^1)$ and $(X^2)$ are connected by a disubstituted bridging group comprising one atom bonded to both $(X^1)$ and $(X^2)$, wherein the atom is carbon or silicon;

wherein a first substituent of the disubstituted bridging group comprises an aliphatic or aromatic group having from 1 to about 20 carbon atoms; a second substituent of the disubstituted bridging group is an unsaturated aliphatic group having from 3 to about 6 carbon atoms; $R^1$ is an alkyl group having from 1 to about 4 carbon atoms; $(X^3)$ and $(X^4)$ independently are a halide; and $M^1$ is Zr or Hf.

According to one aspect of the present invention, the first substituent of the disubstituted bridging group may be a phenyl group, a cyclohexylphenyl group, a naphthyl group, or a methyl group. According to another aspect of the present invention, the second substituent of the disubstituted bridging group may be a butenyl group, a pentenyl group, or a hexenyl group.

Some examples of metallocene compounds that may be suitable for use as the first metallocene compound in accordance with the present invention include, but are not limited to:

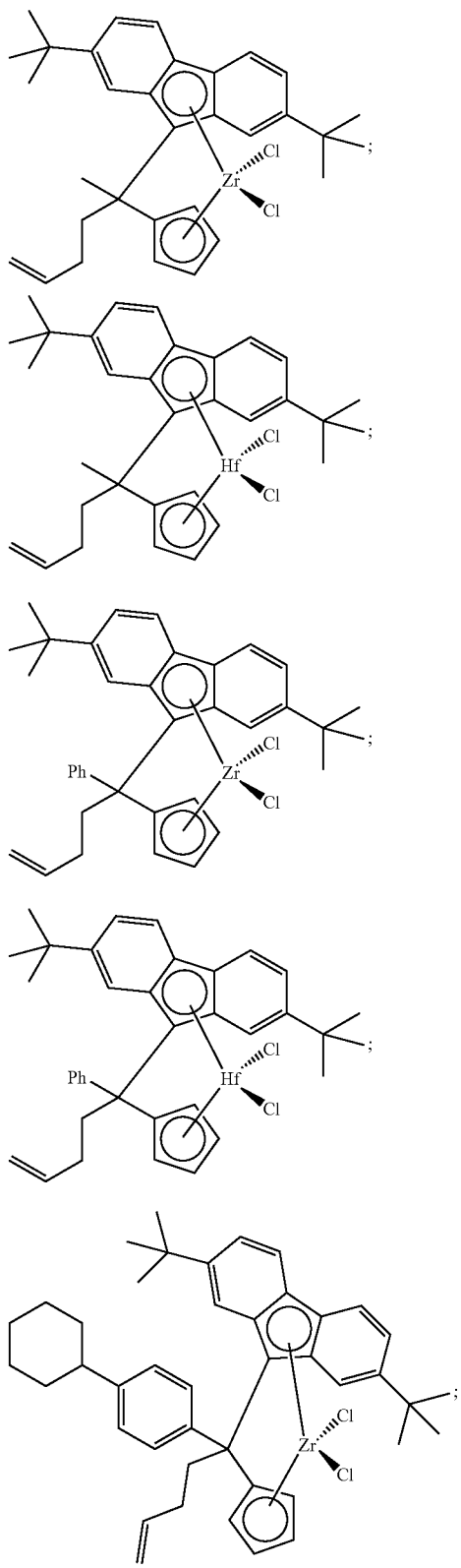

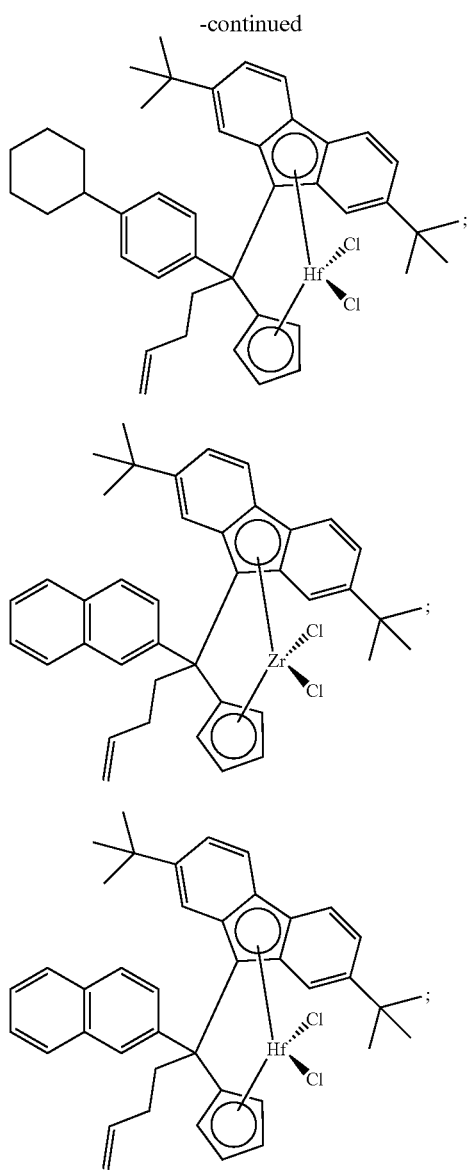
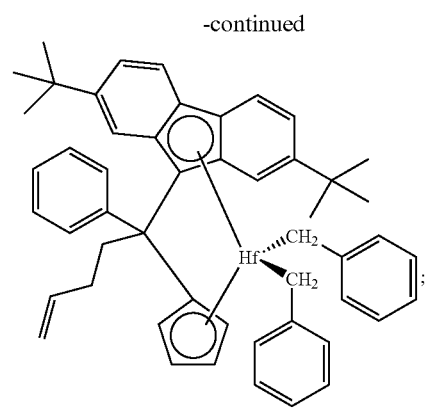
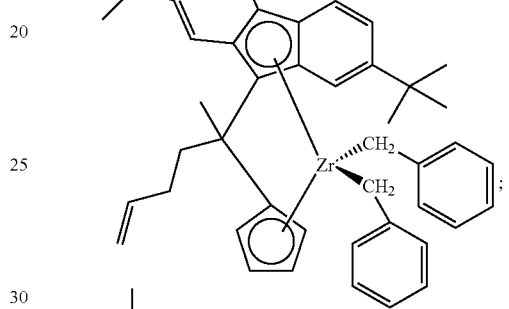
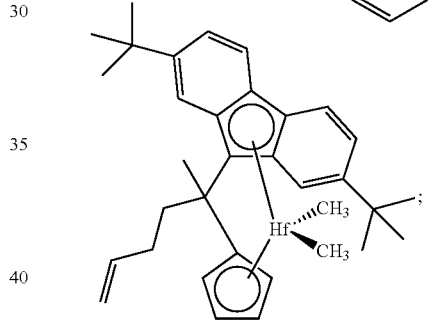
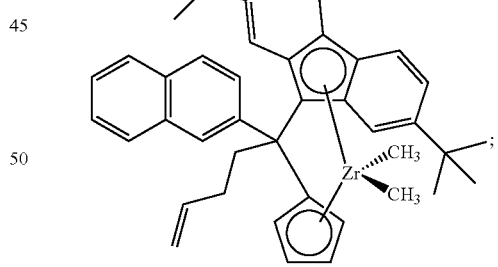
or any combination thereof.
Additional examples of metallocene compounds that may be suitable for use as the first metallocene compound in accordance with the present invention include, but are not limited to:
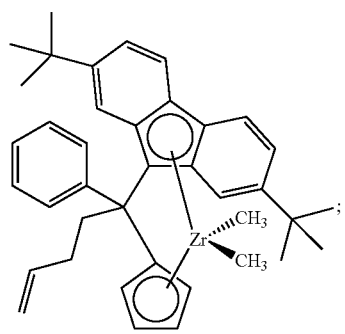
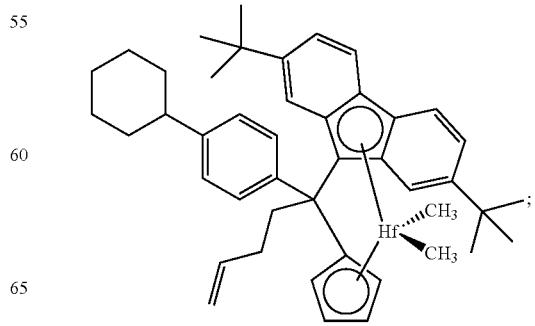

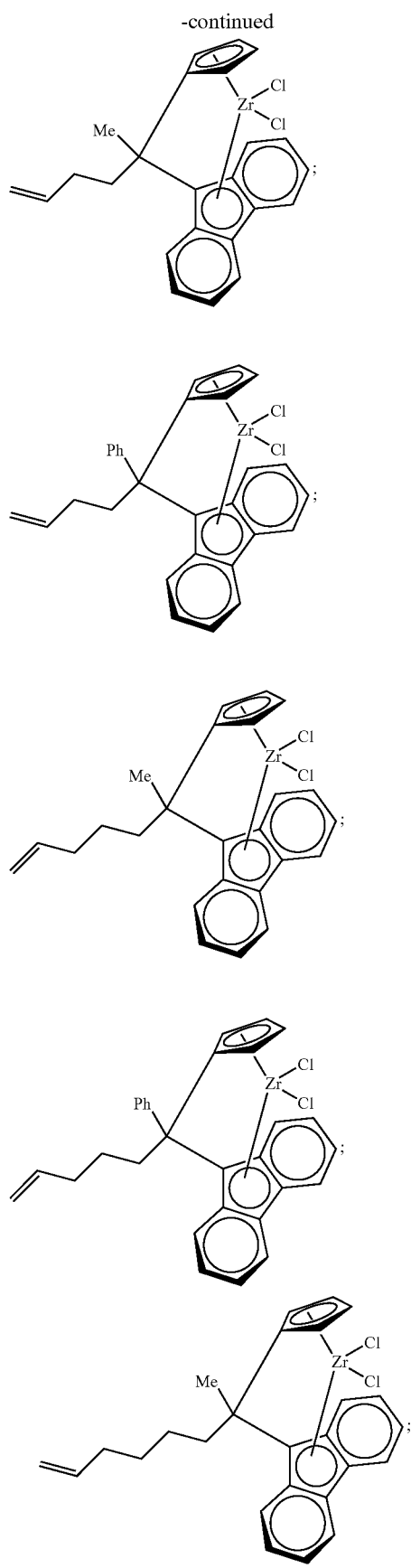
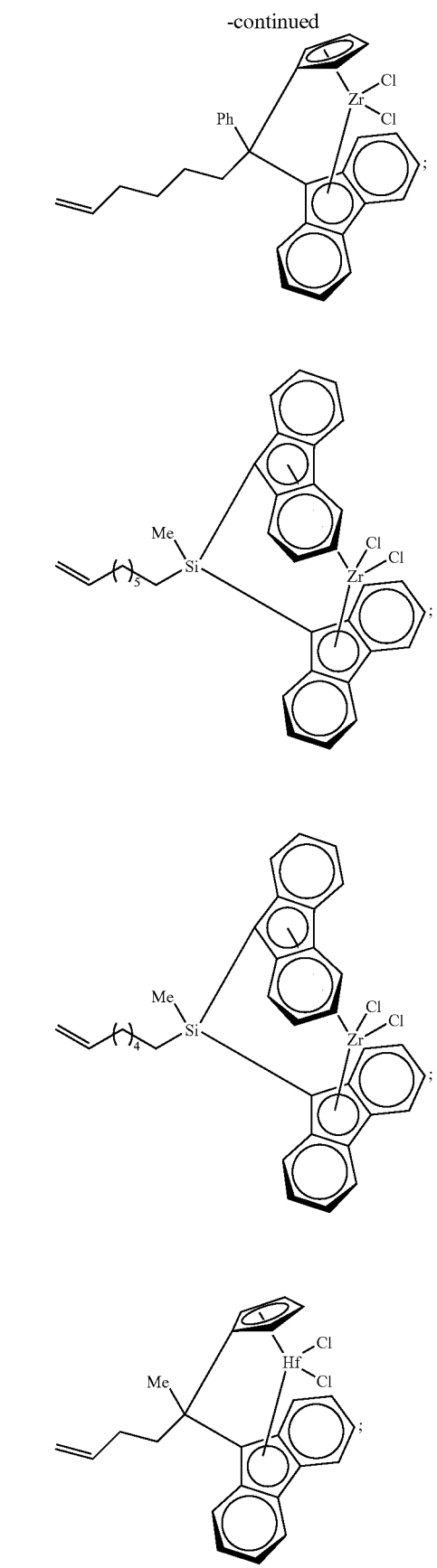

-continued

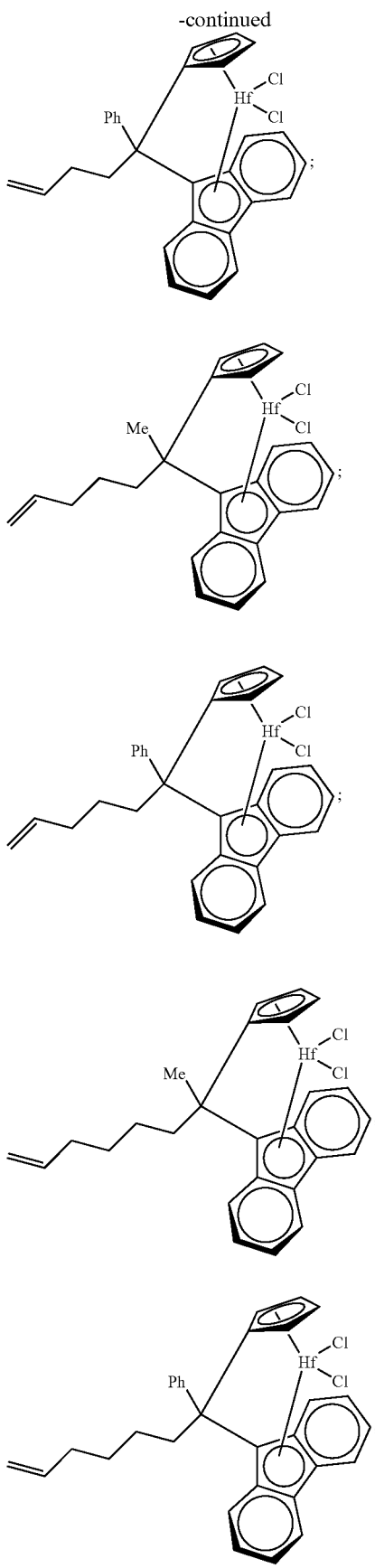

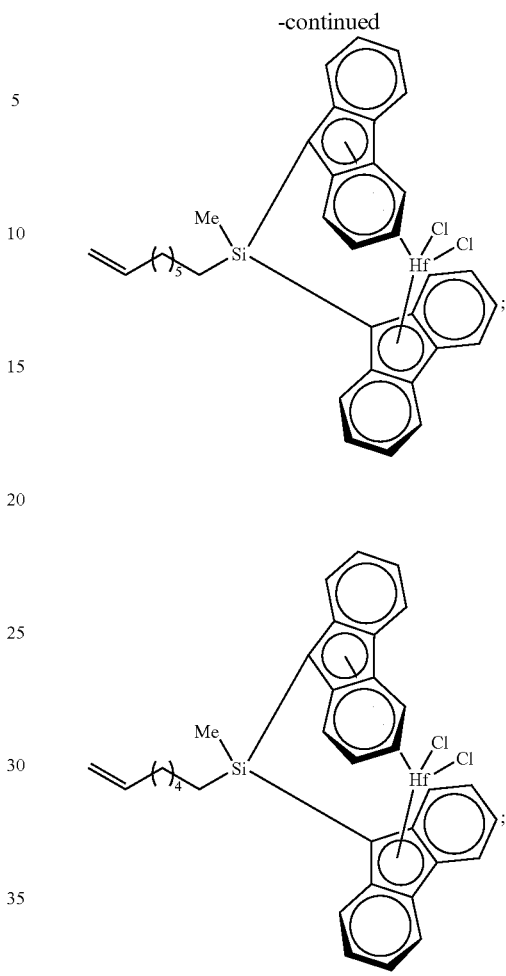

or any combination thereof. Further examples of metallocene compounds that may be suitable for use as the first metallocene compound in accordance with the present invention include, but are not limited to, those provided in U.S. Pat. No. 5,571,880 to Alt et al., incorporated by reference herein in its entirety. General preparative methods for forming hydrocarbyl-substituted metallocenes by substitution reactions, such as alkylating or arylating a halide-substituted or alkoxide-substituted metallocene, can be found in a various references, including: Basset, J.-M., et. al. *J. Am. Chem. Soc.,* 2001, 123, 3520; Marks, T. J. *Acc. Chem Res.,* 1992, 25, 57; Marks, T. J. *Organometallics,* 2002, 21, 1788; each of which is incorporated herein by reference, in its entirety.

(b) The Second Metallocene Compound

In accordance with the present invention, the second metallocene compound is an unbridged metallocene compound having the formula:

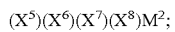

wherein ($X^5$) and ($X^6$) are independently a cyclopentadienyl, indenyl, substituted cyclopentadienyl or a substituted indenyl, each substituent on ($X^5$) and ($X^6$) is independently a linear or branched alkyl group, or a linear or branched alkenyl group, wherein the alkyl group or alkenyl group is unsubstituted or substituted, any substituent on ($X^5$) and ($X^6$) having from 1 to about 20 carbon atoms; ($X^7$) and ($X^8$) independently are a halide; and $M^2$ is Zr or Hf.

Examples of metallocene compounds that may be suitable for use as the second metallocene compound in accordance with the present invention include, but are not limited to:
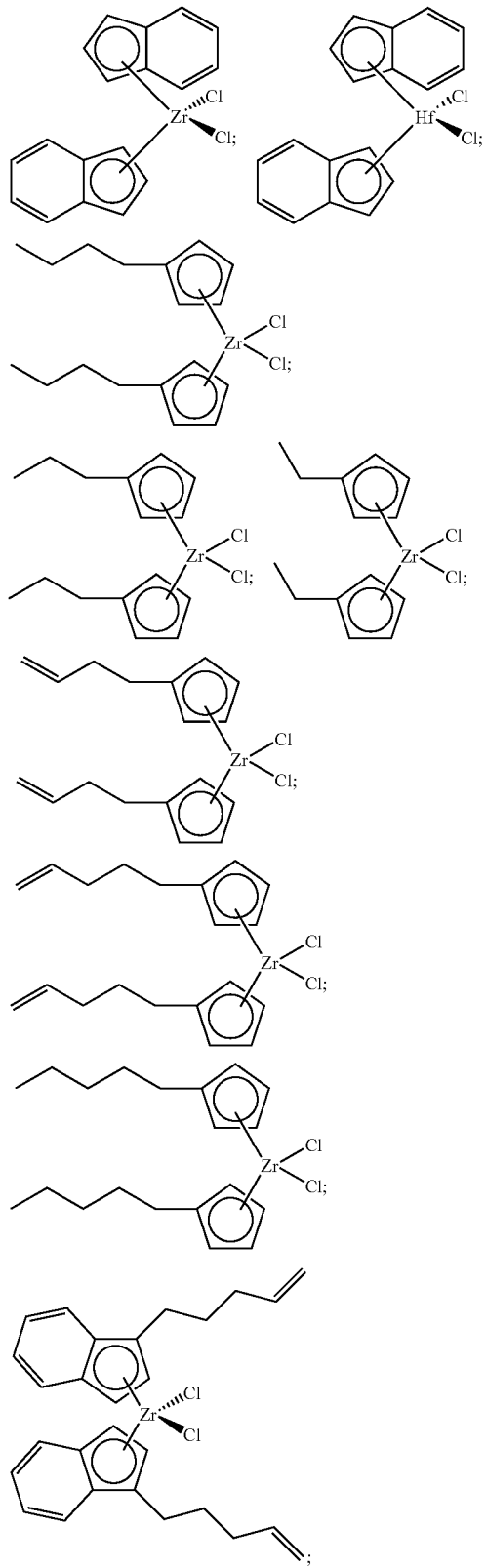
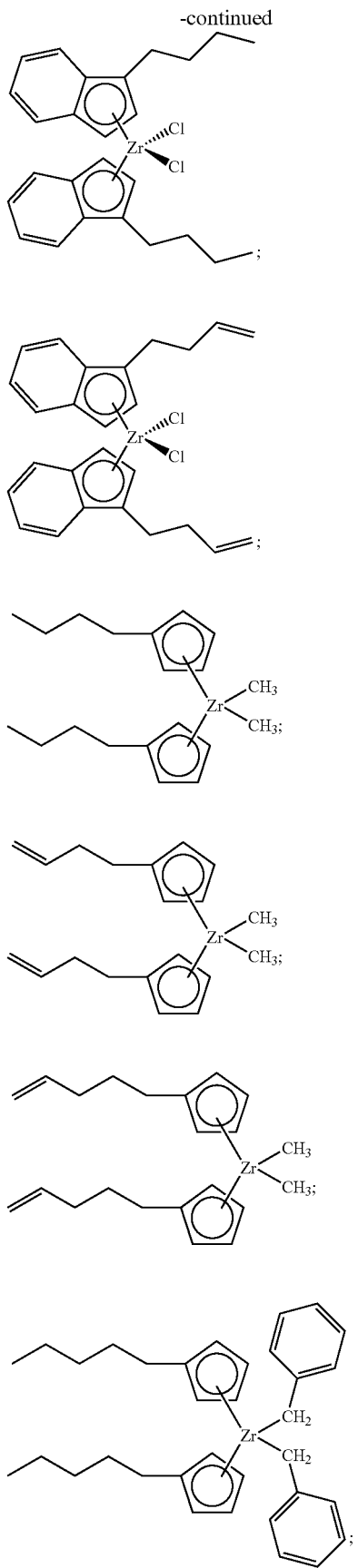

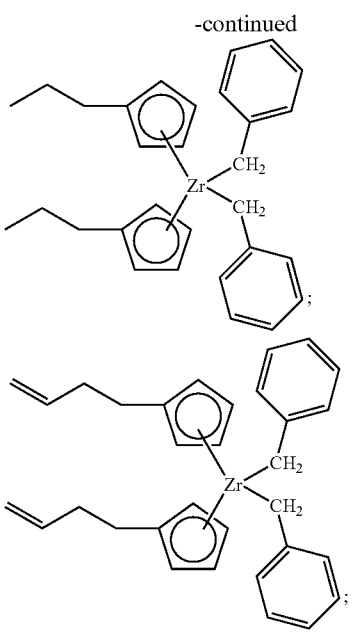

or any combination thereof.

Examples of metallocene compounds that may be suitable for use as the second metallocene compound in accordance with the present invention include, but are not limited to, those provided in Grimmer et al., J. Molecular Catalysis A, Chemical (2002), 188 (1-2), 105-113; Thorshaug et al., Macromolecules (2000), 33(22), 8136-8145; Schumann et al., Journal of Organometallic Chemistry 636 (2001) 31-40; Licht et al., Journal of Organometallic Chemistry, 648 (2002) 134-148; the disclosures of which are incorporated by reference herein in their entirety.

In this and other aspects of the present invention, the ratio of the first metallocene compound to the second metallocene compound may be from about 1:10 to about 10:1. In yet other aspects of the present invention, the ratio of the first metallocene compound to the second metallocene compound may be from about 1:5 to about 5:1. In still other aspects of the present invention, the ratio of the first metallocene compound to the second metallocene compound may be from about 1:2 to about 2:1.

2. The Activator-Support

The present invention encompasses various catalyst compositions including an activator-support comprising a chemically-treated solid oxide. Alternatively, the activator-support may comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof, or a supported aluminoxane.

The chemically-treated solid oxide exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, or ionizing ionic compounds.

The chemically-treated solid oxide may comprise at least one solid oxide treated with at least one electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

The chemically-treated solid oxide of this invention is formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present invention, the solid oxide used to prepare the chemically-treated solid oxide may have a pore volume greater than about 0.1 cc/g. According to another aspect of the present invention, the solid oxide may have a pore volume greater than about 0.5 cc/g. According to yet another aspect of the present invention, the solid oxide may have a pore volume greater than about 1.0 cc/g.

According to another aspect of the present invention, the solid oxide may have a surface area of from about 100 to about 1000 m$^2$/g. According to yet another aspect of the present invention, the solid oxide may have a surface area of from about 200 to about 800 m$^2$/g. According to still another aspect of the present invention, the solid oxide may have a surface area of from about 250 to about 600 m$^2$/g.

The chemically-treated solid oxide may comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: Hawley's Condensed Chemical Dictionary, 11$^{th}$ Ed., John Wiley & Sons; 1995; Cotton, F. A.; Wilkinson, G.; Murillo; C. A.; and Bochmann; M. Advanced Inorganic Chemistry, 6$^{th}$ Ed., Wiley-Interscience, 1999.) For example, the inorganic oxide may comprise oxygen and at least one element. selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide may be silica, alumina, silica-alumina, aluminum phosphate, heteropolytungstates, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention include, but are not limited to, silica-alumina, silica-titania, silica-zirconia, zeolites, various clay minerals, alumina-titania, alumina-zirconia, zinc-aluminate and the like.

The electron-withdrawing component used to treat the solid oxide may be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

Thus, for example, the chemically-treated solid oxide used with the present invention may be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components may be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which an chemically-treated solid oxide is prepared is as follows: a selected solid oxide compound, or combination of oxide compounds, is contacted with a first electron-withdrawing anion source compound to form a first mixture; this first mixture is calcined and then contacted with a second electron-withdrawing anion source compound to form a second mixture; the second mixture is then calcined to form a treated solid oxide compound. In such a process, the first and second electron-withdrawing anion source compounds may be different compounds or the same compound.

According to another aspect of the present invention, the chemically-treated solid oxide may comprise a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. The metal or metal ion may be, for example, zinc, nickel, vanadium, titanium, silver, copper, gallium, tin, tungsten, molybdenum, or any combination thereof. Examples of chemically-treated solid oxides that include a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof.

Any method of impregnating the solid oxide material with a metal may be used. The method by which the oxide is contacted with a metal source, typically a salt or metal-containing compound, may include, but is not limited to, gelling, co-gelling, impregnation of one compound onto another, and the like. If desired, the metal-containing compound may be added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, or a combination thereof. For example, zinc may be used to impregnate the solid oxide because it provides good catalyst activity and low cost.

The solid oxide may be treated with metal salts or metal-containing compounds before, after, or at the same time that the solid oxide is treated with the electron-withdrawing anion. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

Various processes may be used to form the chemically-treated solid oxide. The chemically-treated solid oxide may comprise the contact product of at least one solid oxide compound and at least one electron-withdrawing anion source. It is not required that the solid oxide compound be calcined prior to contacting the electron-withdrawing anion source. The contact product may be calcined either during or after the solid oxide compound is contacted with the electron-withdrawing anion source. The solid oxide compound may be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, each of which is incorporated by reference herein in its entirety.

According to one aspect of the present invention, the solid oxide material may be chemically-treated by contacting it with at least one electron-withdrawing component, typically an electron-withdrawing anion source. Further, the solid oxide material optionally may be chemically treated with a metal ion, and then calcined to form a metal-containing or metal-impregnated chemically-treated solid oxide. According to another aspect of the present invention, the solid oxide material and electron-withdrawing anion source are contacted and calcined simultaneously.

The method by which the oxide is contacted with the electron-withdrawing component, typically a salt or an acid of an electron-withdrawing anion, may include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (chemically-treated solid oxide) may thus be produced by a process comprising:

1) contacting a solid oxide compound with at least one electron-withdrawing anion source compound to form a first mixture; and 2) calcining the first mixture to form the solid oxide activator-support.

According to another aspect of the present invention, the solid oxide activator-support (chemically-treated solid oxide) may be produced by a process comprising:

1) contacting at least one solid oxide compound with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes and organoborates.

Calcining of the treated solid oxide generally is conducted in an ambient atmosphere, typically in a dry ambient atmosphere, at a temperature from about 200° C. to about 900° C., and for a time of about 1 minute to about 100 hours. Calcining may be conducted at a temperature of from about 300° C. to about 800° C., for example, at a temperature of from about 400° C. to about 700° C. Calcining may be conducted for about 1 hour to about 50 hours, for example, for about 3 hours to about 20 hours. Thus, for example, calcining may be carried out for about 1 to about 10 hours at a temperature of from about 350° C. to about 550° C. Any type of suitable ambient atmosphere can be used during calcining. Generally, calcining is conducted in an oxidizing atmosphere, such as air. Alternatively, an inert atmosphere, such as nitrogen or argon, or a reducing atmosphere, such as hydrogen or carbon monoxide, may be used.

According to one aspect of the present invention, the solid oxide material may be treated with a source of halide ion, sulfate ion, or a combination of anions, optionally treated with a metal ion, and then calcined to provide the chemically-treated solid oxide in the form of a particulate solid. For example, the solid oxide material may be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia; a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of the activator-supports optionally may be treated with a metal ion.

The chemically-treated solid oxide may comprise a fluorided solid oxide in the form of a particulate solid. The fluorided solid oxide may be formed by contacting a solid oxide with a fluoriding agent. The fluoride ion may be added to the oxide by forming a slurry of the oxide in a suitable solvent such as alcohol or water including, but are not limited to, the one to three carbon alcohols because of their volatility and low surface tension. Examples of fluoriding agents that may be suitable include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

If desired, the solid oxide may be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself also can be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide may comprise a chlorided solid oxide in the form of a particulate solid. The chlorided solid oxide may be formed by contacting a solid oxide with a chloriding agent. The chloride ion may be added to the oxide by forming a slurry of the oxide in a suitable solvent. The solid oxide may be treated with a chloriding agent during the calcining step. Any chloriding agent capable of serving as a source of chloride and thoroughly contacting the oxide during the calcining step may be used. For example, volatile organic chloriding agents may be used. Examples of volatile organic chloriding agents that may be suitable include, but are not limited to, certain freons, perchlorobenzene, chloromethane, dichloromethane, chloroform, carbon tetrachloride, trichloroethanol, or any combination thereof. Gaseous hydrogen chloride or chlorine itself may also be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide may be from about 2 to about 50% by weight, where weight percent is based on the weight of the solid oxide, for example, silica-alumina, before calcining. According to another aspect of this invention, the amount of fluoride or chloride ion present before calcining the solid oxide may be from about 3 to about 25% by weight, and according to another aspect of this invention, may be from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present invention, the pore volume may be greater than about 0.8 cc/g, and according to another aspect of the present invention, the pore volume may be greater than about 1.0 cc/g. Further, the silica-alumina may have a surface area greater than about 100 $m^2/g$. According to one aspect of this invention, the surface area may be greater than about 250 $m^2/g$, and according to another aspect of this invention, the surface area may be greater than about 350 $m^2/g$.

The silica-alumina used with the present invention typically has an alumina content from about 5 to about 95%. According to one aspect of this invention, the alumina content of the silica-alumina may be from about 5 to about 50%, and according to another aspect of this invention, the alumina content of the silica-alumina may be from about 8% to about 30% alumina by weight. According to yet another aspect of this invention, the solid oxide component may comprise alumina without silica, and according to another aspect of this invention, the solid oxide component may comprise silica without alumina.

The sulfated solid oxide comprises sulfate and a solid oxide component, such as alumina or silica-alumina, in the form of a particulate solid. Optionally, the sulfated oxide may be treated further with a metal ion such that the calcined sulfated oxide comprises a metal. According to one aspect of the present invention, the sulfated solid oxide comprises sulfate and alumina. In some instances, the sulfated alumina is formed by a process wherein the alumina is treated with a sulfate source, for example, but not limited to, sulfuric acid or a sulfate salt such as ammonium sulfate. This process may be performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining may be from about 0.5 parts by weight to about 100 parts by weight sulfate ion to about 100 parts by weight solid oxide. According to another aspect of this invention, the amount of sulfate ion present before calcining may be from about 1 part by weight to about 50 parts by weight sulfate ion to about 100 parts by weight solid oxide, and according to still another aspect of this invention, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention can comprise an ion-exchangeable activator-support, including but not limited to silicate and aluminosilicate compounds or minerals, either with layered or non-layered structures, and any combination thereof. In another aspect of this invention, ion-exchangeable, layered aluminosilicates such as pillared clays may be used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention can comprise clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the ansa-metallocene and organoaluminum catalyst components. While not intending to be bound by theory, it is believed that the ion exchangeable activator-support serves as an insoluble reactant that reacts with the ansa-metallocene and organoaluminum components to form a catalyst composition used to produce polymer.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III) and Zn(II) with ligands such as halide, acetate, sulfate, nitrate, or nitrite.

According to another aspect of the present invention, activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars", effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; each of which is incorporated herein in its entirety.

The pillaring process utilizes clay minerals having exchangeable cations and layers capable of expanding. Any pillared clay that can enhance the polymerization of olefins in the catalyst composition of the present invention may be used. Therefore, suitable clay minerals for pillaring include, but are not limited to: allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay may be pretreated if desired. For example, a pillared bentonite may be pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention may be combined with other inorganic support materials, including, but are not limited to, zeolites, inorganic oxides, phosphated inorganic oxides, and the like. In one aspect, typical support materials that may be used include, but are not limited to, silica, silica-alumina, alumina, titania, zirconia, magnesia, boria, fluorided alumina, silated alumina, thoria, aluminophosphate, aluminum phosphate, phosphated silica, phosphated alumina, silica-titania, coprecipitated silica/titania, fluorided/silated alumina, and any combination or mixture thereof.

According to yet another aspect of the present invention, one or more of the metallocene compounds may be precontacted with an olefin monomer and an organoaluminum compound for a first period of time prior to contacting this mixture with the activator-support. Once the precontacted mixture of the metallocene compound(s), olefin monomer, and organoaluminum compound is contacted with the activator-support, the composition further comprising the activator-support is termed the "postcontacted" mixture. The postcontacted mixture may be allowed to remain in further contact for a second period of time prior to being charged into the reactor in which the polymerization process will be carried out.

3. The Organoaluminum Compound

Organoaluminum compounds that may be used with the present invention include, but are not limited to, compounds having the formula:

$(R^2)_3Al$;

where $(R^2)$ is an aliphatic group having from 2 to about 6 carbon atoms. For example, $(R^2)$ may be ethyl, propyl, butyl, hexyl, or isobutyl.

Other organoaluminum compounds that may be used in accordance with the present invention include, but are not limited to, compounds having the formula:

$Al(X^9)_n(X^{10})_{3-n}$, where $(X^9)$ is a hydrocarbyl having from 1 to about 20 carbon atoms, $(X^{10})$ is an alkoxide or an aryloxide, any one of which having from 1 to about 20 carbon atoms, a halide, or a hydride, and n is a number from 1 to 3, inclusive. According to one aspect of the present invention, $(X^9)$ is an alkyl having from 1 to about 10 carbon atoms. Examples of $(X^9)$ moieties include, but are not limited to, ethyl, propyl, n-butyl, sec-butyl, isobutyl, hexyl, and the like. According to another aspect of the present invention, $(X^{10})$ may be independently selected from fluoro or chloro. According to yet another aspect of the present invention, $(X^{10})$ may be chloro. In the formula $Al(X^9)_n(X^{10})_{3-n}$, n is a number from 1 to 3 inclusive, and typically, n is 3. The value of n is not restricted to be an integer; therefore, this formula includes sesquihalide compounds or other organoaluminum cluster compounds.

Examples of organoaluminum compounds that may be suitable for use with the present invention include, but are not limited to, trialkylaluminum compounds, dialkylaluminium halide compounds, dialkylaluminum alkoxide compounds, dialkylaluminum hydride compounds, and combinations thereof. Specific examples of organoaluminum compounds that may be suitable include, but are not limited to: trimethylaluminum (TMA), triethylaluminum (TEA), tripropylaluminum, diethylaluminum ethoxide, tributylaluminum, diisobutylaluminum hydride, triisobutylaluminum, and diethylaluminum chloride.

The present invention contemplates precontacting the first metallocene compound, the second metallocene compound, or both, with at least one organoaluminum compound and an olefin monomer to form a precontacted mixture, prior to contacting this precontacted mixture with the activator-support to form the active catalyst. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator. However, the entire organoaluminum compound may be used to prepare the catalyst in either the precontacting or postcontacting step. Alternatively, all the catalyst components may be contacted in a single step.

Further, more than one organoaluminum compound may be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

4. The Aluminoxane Cocatalyst

The present invention further provides a catalyst composition comprising an aluminoxane cocatalyst. As used herein the term "aluminoxane" refers to aluminoxane compounds, compositions, mixtures, or discrete species, regardless of how such aluminoxanes are prepared, formed or otherwise provided. For example, a catalyst composition comprising an optional aluminoxane cocatalyst can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step may be used. The catalyst composition formed in this manner may be collected by methods known to those of skill in the art including, but not limited to, filtration. Alternatively, the catalyst composition may be introduced into the polymerization reactor without being isolated.

The aluminoxane compound of this invention may be an oligomeric aluminum compound comprising linear structures, cyclic, or cage structures, or mixtures of all three. Cyclic aluminoxane compounds having the formula:

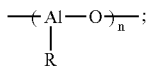

wherein R is a linear or branched alkyl having from 1 to 10 carbon atoms, and n is an integer from 3 to about 10, are encompassed by this invention. The $(AlRO)_n$ moiety shown here also constitutes the repeating unit in a linear aluminoxane. Thus, linear aluminoxanes having the formula:

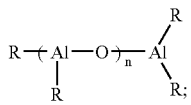

wherein R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$, wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ is a terminal alkyl group, and $R^b$ is a bridging alkyl group, and R is a linear or branched alkyl having from 1 to 10 carbon atoms.

Thus, aluminoxanes that may serve as optional cocatalysts in this invention are represented generally by formulas such as $(R—Al—O)_n$, $R(R—Al—O)_n AlR_2$, and the like, wherein the R group is typically a linear or branched $C_1$-$C_6$ alkyl such as methyl, ethyl, propyl, butyl, pentyl, or hexyl, and n typically represents an integer from 1 to about 50. Examples of aluminoxane compounds that may be used in accordance with the present invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, or any combination thereof. Methyl aluminoxane, ethyl aluminoxane, and isobutyl aluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of n in the aluminoxane formulas $(R—Al—O)_n$ and $R(R—Al—O)_n AlR_2$, and n typically may be at least about 3. However, depending upon how the organoaluminoxane is prepared, stored, and used, the value of n may vary within a single sample of aluminoxane, and such combinations of organoaluminoxanes are contemplated hereby.

In preparing the catalyst composition of this invention comprising an optional aluminoxane, the molar ratio of the aluminum in the aluminoxane to the metallocene in the composition maybe from about 1:10 to about 100,000:1, for example, from about 5:1 to about 15,000:1. The amount of optional aluminoxane added to a polymerization zone may be from about 0.01 mg/L to about 1000 mg/L, from about 0.1 mg/L to about 100 mg/L, or from about 1 mg/L to about 50 mg/L.

Organoaluminoxanes may be prepared by various procedures that are well known in the art. Examples of organoaluminoxane preparations are disclosed in U.S. Pat. Nos. 3,242,099 and 4,808,561, each of which is incorporated by reference herein in its entirety. For example, water in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R—Al—O)_n$ aluminoxane species, both of which are encompassed by this invention. Alternatively, organoaluminoxanes may be prepared by reacting an aluminum alkyl compound, such as $AlR_3$ with a hydrated salt, such as hydrated copper sulfate, in an inert organic solvent.

5. The Organoboron Cocatalyst

The present invention further provides a catalyst composition comprising an organoboron cocatalyst. The organoboron compound may comprise neutral boron compounds, borate salts, or any combination thereof. For example, the organoboron compounds of this invention may comprise a fluoroorgano boron compound, a fluoroorgano borate compound, or a combination thereof.

Any fluoroorgano boron or fluoroorgano borate compound known in the art can be utilized with the present invention. Examples of fluoroorgano borate compounds that may be used as cocatalysts in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof. Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, incorporated herein by reference in its entirety.

Generally, any amount of organoboron compound may be used. According to one aspect of this invention, the molar ratio of the organoboron compound to the metallocene compound in the composition may be from about 0.1:1 to about 10:1. Typically, the amount of the fluoroorgano boron or fluoroorgano borate compound used as a cocatalyst for the metallocenes may be from about 0.5 mole to about 10 moles of boron compound per total moles of the metallocene compounds. According to another aspect of this invention, the amount of fluoroorgano boron or fluoroorgano borate compound may be from about 0.8 mole to about 5 moles of boron compound per total moles of the metallocene compound.

6. The Ionizing Ionic Compound Cocatalyst

The present invention further provides a catalyst composition comprising an ionizing ionic compound cocatalyst. An ionizing ionic compound is an ionic compound that can function to enhance the activity of the catalyst composition. While not intending to be bound by theory, it is believed that the ionizing ionic compound may be capable of reacting with a metallocene compound and converting the metallocene into one or more cationic metallocene compounds, or incipient cationic metallocene compounds. Again, while not intending to be bound by theory, it is believed that the ionizing ionic compound may function as an ionizing compound by completely or partially extracting an anionic ligand, possibly a non-$\eta^5$-alkadienyl ligand such as ($X^3$) or ($X^4$), from the metallocene. However, the ionizing ionic compound is an activator regardless of whether it is ionizes the metallocene, abstracts an ($X^3$) or ($X^4$) ligand in a fashion as to form an ion pair, weakens the metal-($X^3$) or metal-($X^4$) bond in the metallocene, simply coordinates to an ($X^3$) or ($X^4$) ligand, or activates the metallocene by some other mechanism.

Further, it is not necessary that the ionizing ionic compound activate the metallocenes only. The activation function of the ionizing ionic compound is evident in the enhanced activity of catalyst composition as a whole, as compared to a catalyst composition containing catalyst composition that does not comprise any ionizing ionic compound. It is also not necessary that the ionizing ionic compound activate each of the metallocene compounds present, nor is it necessary that it activate the any of the metallocene compounds to the same extent.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis(3,5-dimethylphenyl)aluminate, tri(n-butyl)ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethyl-phenyl)aluminate, N,N-dimethylanilinium tetrakis (pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like. However, the optional ionizing ionic compounds that are useful in this invention are not limited to these. Other examples of ionizing ionic compounds are disclosed in U.S. Pat. Nos. 5,576,259 and 5,807,938, each of which is incorporated herein by reference in its entirety.

B. Olefin Monomer

Unsaturated reactants that may be useful with catalyst compositions and polymerization processes of this invention typically include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. The resulting copolymer may comprise a major amount of ethylene (>50 mole percent) and a minor amount of comonomer <50 mole percent), though this is not a requirement. The comonomers that may be copolymerized with ethylene may typically have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

When a copolymer is desired, the monomer ethylene may be copolymerized with a comonomer. Examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. According to one aspect of the present invention, the comonomer may be selected from 1-butene, 1-pentene, 1-hexene, 1-octene, 1-decene, or styrene.

The amount of comonomer introduced into a reactor zone to produce the copolymer generally may be from about 0.01 to about 50 weight percent comonomer based on the total weight of the monomer and comonomer. According to another aspect of the present invention, the amount of comonomer introduced into a reactor zone may be from about 0.01 to about 40 weight percent comonomer based on the total weight of the monomer and comonomer. According to still another aspect of the present invention, the amount of comonomer introduced into a reactor zone may be from about 0.1 to about 35 weight percent comonomer based on the total weight of the monomer and comonomer. Alternatively, the amount of comonomer introduced into a reactor zone may be any amount sufficient to provide the above concentrations by weight.

While not intending to be bound by this theory, where branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one reactant for the catalyst compositions of this invention may be ethylene, so the polymerizations are either homopolymerizations or copolymerizations with a different acyclic, cyclic, terminal, internal, linear, branched, substituted, or unsubstituted olefin. In addition, the catalyst compositions of this invention may be used in the polymerization of diolefin compounds including, but not limited to, 1,3-butadiene, isoprene, 1,4-pentadiene, and 1,5-hexadiene.

C. Preparation of the Catalyst Composition

The present invention encompasses a catalyst composition comprising the contact product of a first metallocene compound, a second metallocene compound, an activator-support, and an organoaluminum compound. This invention further encompasses methods of making the catalyst composition encompassing contacting a first metallocene compound, a second metallocene compound, an activator-support, and an organoaluminum compound, in any order. According to such methods, an active catalyst composition is obtained when the catalyst components are contacted in any sequence or order.

One or more of the metallocene compounds may be precontacted with an olefinic monomer if desired, not necessarily the olefin monomer to be polymerized, and an organoaluminum cocatalyst for a first period of time prior to contacting this precontacted mixture with the activator-support. The first period of time for contact, the precontact time, between the metallocene compound or compounds, the olefinic monomer, and the organoaluminum compound may typically range from a time of about 0.1 hour to about 24 hours, for example, from about 0.1 to about 1 hour. Precontact times from about 10 minutes to about 30 minutes are also typical.

Alternatively the precontacting process can be carried out in multiple steps, rather than a single step, in which multiple mixtures are prepared, each comprising a different set of catalyst components. For example, at least two catalyst components can be contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components may be split and used in different precontacting treatments. For example, part of a catalyst component can be fed into a first precontacting vessel for precontacting with at least one other catalyst component, while the remainder of that same catalyst component can be fed into a second precontacting vessel for precontacting with at least one other catalyst component, or can be fed directly into the reactor, or a combination thereof. The precontacting may be carried out in any suitable equipment, such as tanks, stirred mix tanks, various static mixing devices, a flask, a vessel of any type, or any combination thereof.

In another aspect of this invention, the various catalyst components (for example, ansa-metallocene, activator-support, organoaluminum cocatalyst, and optionally an unsaturated hydrocarbon) can be contacted in the polymerization reactor simultaneously while the polymerization reaction is proceeding. Alternatively, any two or more of these catalyst components may be precontacted in a vessel prior to their entering the reaction zone. This precontacting step can be continuous process, in which the precontacted product is fed continuously to the reactor, or it can be a stepwise or batchwise process in which a batch of precontacted product can be added to make a catalyst composition. This precontacting step can be carried out over a time period that can range from a few seconds to as much as several days, or longer. In this aspect, the continuous precontacting step can last typically from about 1 second to about 1 hour. Also in this aspect, the continuous precontacting step can last typically from about 10 seconds to about 45 minutes, or from about 1 minute to about 30 minutes.

Once the precontacted mixture of the metallocene compound or compounds, olefin monomer, and organoaluminum cocatalyst is contacted with the activator-support, this composition (further comprising the activator-support) is termed the "postcontacted mixture". The postcontacted mixture optionally may be allowed to remain in contact for a second period of time, the postcontact time, prior to initiating the polymerization process. Postcontact times between the precontacted mixture and the activator-support may range in time from about 0.1 hour to about 24 hours, for example, from about 0.1 hour to about 1 hour. The precontacting, the postcontacting step, or both may increase the productivity of the polymer as compared to the same catalyst composition that is prepared without precontacting or postcontacting. However, neither a precontacting step nor a postcontacting step is required.

The postcontacted mixture may be heated at a temperature and for a duration sufficient to allow adsorption, impregnation, or interaction of precontacted mixture and the activator-support, such that a portion of the components of the precontacted mixture is immobilized, adsorbed, or deposited thereon. Where heating is used, the postcontacted mixture may be heated from between about 0° F. to about 150° F., for example, from about 40° F. to about 95° F.

According to one aspect of this invention, the molar ratio of the total moles of the metallocene compounds to the organoaluminum compound may be from about 1:1 to about 1:10,000. According to another aspect of this invention, the molar ratio of the total moles of the metallocene compounds combined to the organoaluminum compound may be from about 1:1 to about 1:1,000. According to yet another aspect of this invention, the molar ratio of the total moles of the metallocene compounds combined to the organoaluminum compound may be from about 1:1 to about 1:100. These molar ratios reflect the ratio of the metallocene compounds to the total amount of organoaluminum compound in both the precontacted mixture and the postcontacted mixture combined.

When a precontacting step is used, the molar ratio of olefin monomer to total moles of metallocene compound combined in the precontacted mixture may be from about 1:10 to about 100,000:1, for example, from about 10:1 to about 1,000:1.

The weight ratio of the activator-support to the organoaluminum compound may be from about 1:5 to about 1,000:1. The weight ratio of the activator-support to the organoaluminum compound may be from about 1:3 to about 100:1, for example, from about 1:1 to about 50:1.

According to a further aspect of this invention, the weight ratio of the total moles of the metallocene compound combined to the activator-support may be from about 1:1 to about 1:1,000,000. According to yet another aspect of this invention, the weight ratio of the total moles of the metallocene compound combined to the activator-support may be from about 1:10 to about 1:10,000. According to still another aspect of this invention, the weight ratio of the total moles of the metallocene compound combined to the activator-support may be from about 1:20 to about 1:1000.

Aluminoxane compounds are not required to form the catalyst composition of the present invention. Thus, the polymerization proceeds in the absence of aluminoxanes. Accordingly, the present invention may use $AlR_3$-type organoaluminum compounds and an activator-support in the absence of aluminoxanes. While not intending to be bound by theory, it is believed that the organoaluminum compound likely does not activate the metallocene catalyst in the same manner as an organoaluminoxane. As a result, the present invention results in lower polymer production costs.

Additionally, no expensive borate compounds or $MgCl_2$ are required to form the catalyst composition of this invention. Nonetheless, aluminoxanes, organoboron compounds, ionizing ionic compounds, organozinc compounds, $MgCl_2$, or any combination thereof optionally may be used in the catalyst composition of this invention. Further, cocatalysts such as aluminoxanes, organoboron compounds, ionizing ionic compounds, organozinc compounds, or any combination thereof optionally may be used as cocatalysts with the metallocene compound, either in the presence or in the absence of the activator-support, and either in the presence or in the absence of the organoaluminum compound.

According to one aspect of this invention, the catalyst activity of the catalyst of this invention may be greater than or equal to about 100 grams polyethylene per gram of chemically-treated solid oxide per hour (abbreviated gP/(gCTSO.hr)). According to another aspect of this invention, the catalyst of this invention may be characterized by an activity of greater than or equal to about 250 gP/(gCTSO.hr). According to still another aspect of this invention, the catalyst of this invention may be characterized by an activity of greater than or equal to about 500 gP/(gCTSO.hr). According to yet another aspect of this invention, the catalyst of this invention may be characterized by an activity of greater than or equal to about 1000 gP/(gCTSO.hr). According to a further aspect of this invention, the catalyst of this invention may be characterized by an activity of greater than or equal to about 2000 gP/(gCTSO.hr). This activity is measured under slurry polymerization conditions using isobutane as the diluent, at a polymerization temperature of about 90° C. and an ethylene pressure of about 550 psig. The reactor should have substantially no indication of any wall scale, coating or other forms of fouling upon making these measurements.

Any combination of the metallocene compounds, the activator-support, the organoaluminum compound, and the olefin monomer, may be precontacted. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture may be used in a subsequent postcontacting step between any other combination of catalyst components for a second period of time. For example, all the catalyst components and 1-hexene may be used in a precontacting step for a first period of time, and this precontacted mixture may then be contacted with the activator-support to form a postcontacted mixture that is contacted for a second period of time prior to initiating the polymerization reaction. For example, the first period of time for contact, the precontact time, between any combination of the metallocene compounds, the olefinic monomer, the activator-support, and the organoaluminum compound may be from about 0.1 hour to about 24 hours, for example, from about 0.1 to about 1 hour. Precontact times from about 10 minutes to about 30 minutes are also typical. The postcontacted mixture optionally may be allowed to remain in contact for a second period of time, the postcontact time, prior to initiating the polymerization process. According to one aspect of this invention, postcontact times between the precontacted mixture and any remaining catalyst components may be from about 0.1 hour to about 24 hours, for example, from about 0.1 hour to about 1 hour. According to another aspect of this invention, each metallocene of a multiple metallocene catalyst system may be precontacted and/or postcontacted independently of any other metallocene compound.

D. Use of the Catalyst Composition in Polymerization Processes

After catalyst activation, the catalyst composition may be used to homopolymerize ethylene or copolymerize ethylene with a comonomer.

The polymerization temperature may be from about 60° C. to about 280° C., for example, from about 70° C. to about 110° C. The polymerization reaction typically begins in an inert atmosphere substantially free of oxygen and under substantially anhydrous conditions. For example, a dry, inert atmosphere such as dry nitrogen or dry argon may be used.

The polymerization reaction pressure may be any pressure that does not terminate the polymerization reaction, and is typically a pressure higher than the pretreatment pressures. According to one aspect of the present invention, the polymerization pressure may be from about atmospheric pressure to about 1000 psig. According to another aspect of the present invention, the polymerization pressure may be from about 50 psig to about 800 psig. Further, hydrogen can be used in the polymerization process of this invention to control polymer molecular weight.

Polymerizations using the catalysts of this invention may be carried out in any manner known in the art. Such processes that may be suitable for use with the present invention include, but are not limited to, slurry polymerizations, gas phase polymerizations, solution polymerizations, and multi-reactor combinations thereof. Thus, any polymerization zone known in the art to produce olefin-containing polymers can be utilized. For example, a stirred reactor may be utilized for a batch process, or a loop reactor or a continuous stirred reactor may be used for a continuous process.

A typical polymerization method is a slurry polymerization process (also known as the particle form process), which is well known in the art and is disclosed, for example, in U.S. Pat. No. 3,248,179, incorporated by reference herein in its entirety. Other polymerization methods of the present invention for slurry processes are those employing a loop reactor of the type disclosed in U.S. Pat. No. 6,239,235, incorporated by reference herein in its entirety, and those utilized in a plurality of stirred reactors either in series, parallel, or combinations thereof, where the reaction conditions are different in the different reactors. Suitable diluents used in slurry polymerization are well known in the art and include hydrocarbons that are liquids under reaction conditions. The term "diluent" as used in this disclosure does not necessarily mean an inert material, as this term is meant to include compounds and compositions that may contribute to polymerization process. Examples of hydrocarbons that may be used as diluents include, but are not limited to, cyclohexane, isobutane, n-butane, propane, n-pentane, isopentane, neopentane, and n-hexane. Typically, isobutane may be used as the diluent in a slurry polymerization, as provided by U.S. Pat. Nos. 4,424,341, 4,501,885, 4,613,484, 4,737,280, and 5,597,892, each of which is incorporated by reference herein in its entirety.

Various polymerization reactors are contemplated by the present invention. As used herein, "polymerization reactor" includes any polymerization reactor or polymerization reactor system capable of polymerizing olefin monomers to produce homopolymers or copolymers of the present invention. Such reactors may be slurry reactors, gas-phase reactors, solution reactors, or any combination thereof. Gas phase reactors may comprise fluidized bed reactors or tubular reactors. Slurry reactors may comprise vertical loops or horizontal loops. Solution reactors may comprise stirred tank or autoclave reactors.

Polymerization reactors suitable for the present invention may comprise at least one raw material feed system, at least one feed system for catalyst or catalyst components, at least one reactor system, at least one polymer recovery system or any suitable combination thereof. Suitable reactors for the present invention further may comprise any one, or combination of, a catalyst storage system, an extrusion system, a cooling system, a diluent recycling system, or a control system. Such reactors may comprise continuous take-off and direct recycling of catalyst, diluent, and polymer. Generally, continuous processes may comprise the continuous introduction of a monomer, a catalyst, and a diluent into a polymerization reactor and the continuous removal from this reactor of a suspension comprising polymer particles and the diluent.

Polymerization reactor systems of the present invention may comprise one type of reactor per system or multiple reactor systems comprising two or more types of reactors operated in parallel or in series. Multiple reactor systems may comprise reactors connected together to perform polymerization or reactors that are not connected. The polymer may be polymerized in one reactor under one set of conditions, and then transferred to a second reactor for polymerization under a different set of conditions.

According to one aspect of the invention, the polymerization reactor system may comprise at least one loop slurry reactor. Such reactors are known in the art and may comprise vertical or horizontal loops. Such loops may comprise a single loop or a series of loops. Multiple loop reactors may comprise both vertical and horizontal loops. The slurry polymerization is typically performed in an organic solvent that can disperse the catalyst and polymer. Examples of suitable solvents include butane, hexane, cyclohexane, octane, and isobutane. Monomer, solvent, catalyst and any comonomer may be continuously fed to a loop reactor where polymerization occurs. Polymerization may occur at low temperatures and pressures. Reactor effluent may be flashed to remove the solid resin.

According to yet another aspect of this invention, the polymerization reactor may comprise at least one gas phase reactor. Such systems may employ a continuous recycle stream containing one or more monomers continuously cycled through the fluidized bed in the presence of the catalyst under polymerization conditions. The recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

According to still another aspect of the invention, the polymerization reactor may comprise a tubular reactor. Tubular reactors may make polymers by free radical initiation, or by employing the catalysts typically used for coordination polymerization. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor. During solution polymerization, the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed during polymerization to obtain better temperature control and to maintain uniform polymerization mixtures throughout the polymerization zone. Adequate means are utilized for dissipating the exothermic heat of polymerization. The polymerization may be effected in a batch manner, or in a continuous manner. The reactor may comprise a series of at least one separator that employs high pressure and low pressure to separate the desired polymer.

According to a further aspect of the invention, the polymerization reactor system may comprise the combination of two or more reactors. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Such reactors may include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

According to one aspect of the present invention, a polymer or copolymer of ethylene may be characterized by a HLMI of from about 0.5 to about 25, a polymer density of from about 0.920 to about 0.965, and a polydispersity of from about 3.0 to about 30. According to another aspect of the present invention, the polymer or copolymer of ethylene may be characterized further by a weight average molecular weight greater than about 50,000. According to yet another aspect of the present invention, the polymer or copolymer of ethylene may be characterized still further by a PENT value greater than about 10 hours.

According to yet another aspect of the present invention, a polymer or copolymer of ethylene may be characterized by a HLMI of from about 3.0 to about 15, a polymer density of from about 0.935 to about 0.960, and a polydispersity of from about 5.0 to about 30. According to another aspect of the present invention, the polymer or copolymer of ethylene may be characterized further by a weight average molecular weight greater than about 150,000. According to yet another aspect of the present invention, the polymer or copolymer of ethylene may be characterized still further by a PENT value greater than about 30 hours.

According to still another aspect of the present invention, a polymer or copolymer of ethylene may be characterized by a HLMI of from about 4.0 to about 10, a polymer density of from about 0.940 to about 0.955, and a polydispersity of from about 6.0 to about 25. According to another aspect of the present invention, the polymer or copolymer of ethylene may be characterized further by a weight average molecular weight greater than about 200,000. According to yet another aspect of the present invention, the polymer or copolymer of ethylene may be characterized still further by a PENT value greater than about 500 hours.

After the polymer is produced, it may be formed into various articles, including but not limited to, household containers, utensils, film products, drums, fuel tanks, pipes, geomembranes, and liners. Various processes may be used to form these articles. Usually, additives and modifiers are added to the polymer in order to provide desired effects. By using the invention described herein, articles can likely be produced at a lower cost, while maintaining most or all of the unique properties of polymers produced with metallocene catalysts.

E. Pipe Extrusion

According to one aspect, a method of making a PE-100 pipe is encompassed by the present invention, the method comprising extruding the polymer or copolymer in a molten state through a die to form the PE-100 pipe and cooling the pipe.

According to yet other aspects, a PE-100 pipe comprising the polymer or copolymer of the present invention is contemplated.

Pipe extrusion in the simplest terms is performed by melting, conveying polyethylene pellets into a particular shape (generally an annular shape), and solidifying that shape during a cooling process. There are numerous steps to pipe extrusion as provided below.

The polymer feedstock can either be a pre-pigmented polyethylene resin or it can be a mixture of natural polyethylene and color concentrate (referred to as "Salt and Pepper blends"). In North American, the most common feedstock for pipe extrusion is "Salt and Pepper blends". In Europe and other areas of the world, the most common feedstock for pipe extrusion is pre-pigmented polyethylene resin. Feedstock is rigidly controlled to obtain the proper finished product (pipe) and ultimate consumer specifications.

The feedstock is then fed into an extruder. The most common extruder system for pipe production is a single-screw extruder. The purpose of the extruder is to melt, convey, and homogenize the polyethylene pellets. Extrusion temperatures typically range from 178° C. to 232° C. depending upon the extruder screw design and flow properties of the polyethylene.

The molten polymer is then passed through a die. The die distributes the homogenous polyethylene polymer melt around a solid mandrel, which forms it into an annular shape. Adjustments can be made at the die exit to try to compensate for polymer sag through the rest of the process.

In order for the pipe to meet the proper dimensional parameters, the pipe is then sized. There are two methods for sizing: vacuum or pressure. Both employ different techniques and different equipment.

Next, the pipe is cooled and solidified in the desired dimensions. Cooling is accomplished by the use of several water tanks where the outside pipe is either submerged or water is sprayed on the pipe exterior. The pipe is cooled from the outside surface to the inside surface. The interior wall and inside surfaces of the pipe can stay very hot for a long period of time, as polyethylene is a poor conductor of heat.

Finally, the pipe is printed and either coiled or cut to length.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may be suggested to one of ordinary skill in the art without departing from the spirit of the present invention or the scope of the appended claims.

EXAMPLES

For each of the following examples, various combinations of the following metallocenes were evaluated to determine their effect on polymer attributes, particularly stiffness and slow crack growth resistance. For convenience, the various metallocenes are set forth in below with letter abbreviation:

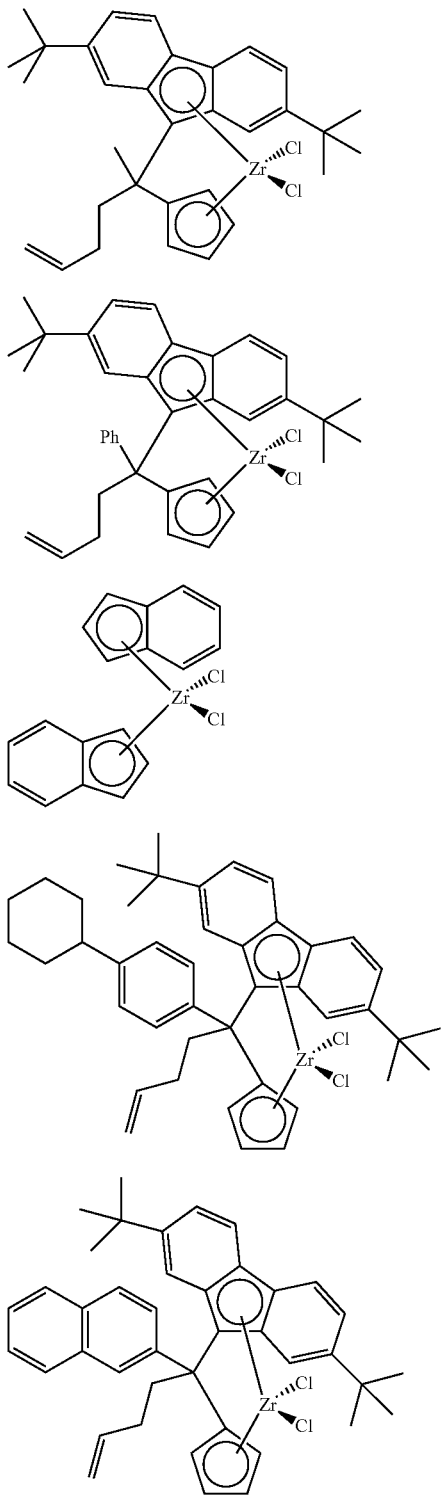

The following testing procedures were used to evaluate the various polymers and compositions.

Melt index (MI, g/10 min) was determined in accordance with ASTM D1238 condition F at 190° C. with a 2,160 gram weight.

High load melt index (HLMI, g/10 min) was determined in accordance with ASTM D1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_n$, and the breadth parameter—$\alpha$. The simplified Carreau-Yasuda (CY) empirical model is as follows.

$$|\eta^*(\omega)| = \frac{\eta^0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_n$=viscous relaxation time;
$\alpha$="breadth" parameter;
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety. The CY "a" parameter is reported in the tables for the resins disclosed herein.

A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8×300 mm) and were calibrated with a broad linear polyethylene standard (Chevron Phillips Chemical Marlex® BHB 5003) for which the molecular weight had been determined.

Molecular weight distributions and branch profiles were obtained through size exclusion chromatography using an FTIR detector. Chromatographic conditions are those described above. However, the sample injection volume was 500 microliters. Samples were introduced to the FTIR detector via a heated transfer line and flow cell (KBr windows, 1 mm optical path, and ca. 70 µL cell volume). The temperatures of the transfer line and flow cell were kept at 143±1° C. and 140±1° C., respectively. Perkin Elmer FTIR spectrophotometer (PE 2000) equipped with a narrow band mercury cadmium telluride (MCT) detector was used in these studies.

All spectra were acquired using Perkin Elmer Timebase software. Background spectra of the TCB solvent were obtained prior to each run. All IR spectra were measured at 8 cm$^{-1}$ resolution (16 scans). Chromatograms were generated using the root mean square absorbance over the 3000-2700 cm$^{-1}$ spectral region (i.e., FTIR serves as a concentration detector). Molecular weight calculations were made as previously described using a broad molecular weight polyethylene (PE) standard [see Jordens K, Wilkes G L, Janzen J, Rohlfing D C, Welch M B. Polymer 2000; 41:7175]. Spectra from individual time slices of the chromatogram are subsequently analyzed for comonomer branch levels using chemometric techniques. All calibration spectra were taken at sample concentrations which far exceeded that needed for good signal to noise (i.e., >0.08 mg/mL at the detector).

Branching determination was made as follows. Narrow molecular weight ($M_w/M_n$~1.1 to 1.3), solvent gradient fractions of ethylene 1-butene, ethylene 1-hexene, polyethylene homopolymers, and low molecular weight alkanes were used in calibration and verification studies. The total methyl content of these samples ranged from 1.4 to 82.7 methyls per 1000 total carbons. Methyl content of samples was calculated from $M_n$ or measured using C-13 NMR spectroscopy. C-13 NMR spectra were obtained on 15 wt. % samples in TCB using a 500 MHz Varian Unity Spectometer run at 125° C. as previous described [see Randall J C, Hsieh E T, NMR and Macromolecules; Sequence, Dynamic, and Domain Structure, ACS Symposium Series 247, J. C. Randall, Ed., American Chemical Society, Washington D.C., 1984.]. Methyl content per 1000 carbons by NMR was obtained by multiplying (×1000) the ratio of total methyl signals to total signal intensity.

A partial least squares (PLS) calibration curve was generated using Pirouette chemometric software (Infometrix) to correlate changes in the FTIR absorption spectra with calculated or NMR measured values for methyls/1000 total carbons for the 25 samples. The FTIR absorption spectra used in the calibration model were made from co-added spectra collected across the whole sample. Only a portion of the spectral region (2996 and 2836 cm$^{-1}$) was used in the calibration step in order to minimize the effects of residual solvent absorption. Preprocessing of spectral data included area normalization, taking the first derivative of the spectra and mean centering all data.

A four component calibration model was calculated and optimized using the process of cross validation (RSQ=0.999, SEV=0.7). The calibration model was verified using 23 additional samples. The predicted versus actual values for the validation data showed excellent correlation (RSQ=0.987) and exhibited a root mean square error of prediction equal to +/−0.4 methyl groups per 1000 total carbon molecules.

Short chain branching levels were calculated by subtracting out methyl chain end contributions. The amount of methyl chain ends were calculated using the equation $Me_{ce}=C(2-V_{ce})/M$, where $Me_{ce}$ is the number of methyl chain ends per 1000 total carbon molecules, C is a constant equal to 14000, $V_{ce}$ is the number of vinyl terminated chain ends (1 for chromium catalyzed resins), and M is the molecular weight calculated for a particular slice of the molecular weight distribution.

PENT slow crack growth resistance values were obtained at 80° C. (176° F.) according to ASTM F1473 (2001), with the exception that the initial load was 3.8 MPa, in order to accelerate the test. This 3.8 MPa PENT test may be referred to herein as a "high stress" PENT test.

The Charpy testing was the Razor-Notched Room-Temperature Charpy Energy test carried out according to ASTM F2231.

Example 1

Preparation of Sulfated Alumina Activator-Support

Alumina A, from W.R. Grace Company, was impregnated to incipient wetness with an aqueous solution of ammonium sulfate. Typically, the alumina had a surface area of about 330 m$^2$/gram and a pore volume of about 1.3 cc/gram. The amount of ammonium sulfate used was equal to 20% of the starting alumina. The volume of water used to dissolve the ammonium sulfate was calculated from the total pore volume of the starting sample (i.e. 2.6 mLs of water for each gram of alumina to be treated). Thus, a solution of about 0.08 grams of ammonium sulfate per mL of water was employed. The resulting wet sand was dried in a vacuum oven overnight at 120° C., and then screened through a 35 mesh screen. Finally, the material was activated in a fluidizing stream of dry air at 550° C. for 3 hours, in the case of bench scale samples, or 6 hours, for the larger pilot plant samples. The samples were then stored under nitrogen.

Example 2

Preparation of Metallocene Compounds

The metallocenes used in the various examples were purchased or prepared as follows. While certain preparations are set forth herein, it should be understood that the metallocenes used in accordance with this invention can be prepared using numerous techniques. Several techniques are described in U.S. patent application Ser. No. 10/876,948, "IMPROVED SYNTHESIS OF ANSA-METALLOCENES AND THEIR PARENT LIGANDS IN HIGH YIELD", incorporated by reference herein in its entirety.

All manipulations involving air-sensitive reagents and materials were performed under nitrogen by using standard Schlenk line or dry box techniques. The solvent THF was distilled from potassium, while anhydrous diethyl ether, methylene chloride, pentane, and toluene (Fisher Scientific Company) were stored over activated alumina. All solvents were degassed and stored under nitrogen. Zirconium (IV) chloride (99.5%) and n-butyllithium were purchased from Aldrich Chemical Company and were used as received. Products were analyzed by $^1$H NMR (300 MHz, CDCl$_3$, referenced against residual CHCl$_3$ peak at 7.24 ppm) or $^{13}$C NMR (75 MHz, CDCl$_3$, referenced against central line of CDCl$_3$ at 77.00 ppm).

6-butenyl-6-methylfulvene was prepared according to the method used by Stone and Little (*J. Org. Chem.* 1984, 49, 1849).

2,7-di-tert-butylfluorene was prepared according to the procedure in *Bull. Chem. Soc. Jpn.*, 1986, 59, 97-103.

Metallocene I: Bis(indenyl)zirconium dichloride was purchased from Witco (Eurecen 5032).

Metallocene B: Methyl-3-butenylmethylidene($\eta^5$-cyclopentadienyl)($\eta^5$-9-2,7-di-tert-butylfluorenyl)zirconium dichloride can be prepared from 2,7-di-tert-butylfluorenyl lithium and 6-butenyl-6-methylfulvene as follows. A one-liter flask is charged with 2,7-di-tert-butylfluorene (50 g, 179.6 mmol) and a stir bar, capped with a rubber septum, and placed under a nitrogen atmosphere. Diethyl ether (about 200 mL) is added via a cannula, and the resulting mixture is cooled to −78° C. in a dry-ice bath. This mixture is stirred at this temperature as n-butyllithium (19.0 mL of 10 M in hexanes, 190 mmol) is added slowly via syringe. After the addition of n-butyllithium is complete, the reddish solution is slowly warmed to room temperature and stirred overnight (at least about 12 hours). After this time, the reaction mixture is cooled to −78° C., and 6-butenyl-6-methylfulvene (40 mL) is added quickly (in less than 1 minute) at this temperature with stirring. Upon completion of the fulvene addition, the mixture is removed from the dry ice bath and warmed to room temperature, and a GC aliquot is taken after ca. 15 minutes following removal of the dry-ice bath.

Stirring is continued for 7 hours, after which time the reaction mixture is quenched with a saturated $NH_4Cl/H_2O$ solution (300 mL). The organic layer is extracted with diethyl ether, washed twice with $H_2O$ (500 mL), dried over anhydrous $Na_2SO_4$, filtered, and the filtrate evaporated to dryness to afford a solid. Methanol (ca. 500 mL) is added to the solid and the mixture stirred overnight to form the product as a finely divided white solid. After filtration, washing with MeOH, and drying overnight, the desired parent ligand 1-(methyl)-1-(3-butenyl)-1-(cyclopentadienyl)-1-(2,7-di-tert-butylfluorenyl)methane is isolated and may be used without further purification.

A one-liter flask is charged with the parent ligand 1-(methyl)-1-(3-butenyl)-1-(cyclopentadienyl)-1-(2,7-di-tert-butylfluorenyl)methane (46.3 g, 109.0 mmol) and a stir bar, capped with a rubber septum, and placed under a nitrogen atmosphere. Diethyl ether (about 500 mL) is added to the flask and the mixture stirred and cooled to 0° C. in an ice bath. While stirring is continued, n-butyllithium (23 mL of 10 M in hexanes, 230 mmol) is added slowly to the mixture via syringe. After the addition of n-butyllithium is complete, the reaction mixture is warmed to room temperature and stirred overnight (at least about 12 hours) under a nitrogen atmosphere.

In a nitrogen-filled drybox, a one-liter flask is charged with $ZrCl_4$ (25.4 g, 109.0 mmol) and a stir bar, capped with a rubber septum, brought out of the drybox, charged with about 300 mL of pentane under nitrogen, and cooled in an ice bath to 0° C. The diethyl ether mixture of dilithiated parent ligand is added to the $ZrCl_4$ slurry via cannula over the course of thirty-minutes at 0° C., and the resulting orange slurry is warmed to room temperature and stirred overnight (at least about 12 hours). The solvent is then removed under vacuum affording an orange solid. Pentane (about 200 mL) is added to the solid, the slurry centrifuged, and the supernatant decanted. The remaining solid is then extracted with methylene chloride, centrifuged, and the supernatant decanted and evaporated to dryness to afford 55.0 g (86%) of the desired metallocene (5-cyclopentadienyl)[5-(2,7-di-tert-butylfluorenyl)]hex-1-ene zirconium dichloride that can be used without further purification.

Metallocene C: Phenyl-3-butenylmethylidene($\eta^5$-cyclopentadienyl)($\eta^5$-9-2,7-di-tert-butylfluorenyl)zirconium dichloride was prepared as follows. A solution of 42.3 g (152 mmoles) of 2,7-di-t-butylfluorene in 150 mLs of dry, degassed THF was cooled in dry ice. A solution of n-butyl lithium in hexanes, 61 mLs of 2.5 M (152 mmoles) was added dropwise over 30 minutes. The bath was then removed. After stirring for an additional 90 minutes, this solution was added to 38 g (167 mmoles) of 6-phenyl-6-(3-butenyl)fulvene in 100 mLs of THF while cooling in an ice bath. The addition took 1½ hours. The mixture was allowed to warm while stirring for about 120 hours.

While cooling in a water bath, a solution of 6 g of ammonium chloride in 100 mLs of water was added followed by 100 mLs of heptane. The layers were separated and the organic layer was washed with 3×100 mLs of water, filtered, and dried over sodium sulfate. The solvent was stripped off and the product was crystallized from a minimal heptane and washed with methanol before drying.

A portion of the ligand from above, 20.0 g (41.3 mmoles) was dissolved in diethylether and cooled in dry ice. A hexane solution of n-butyl lithium, 33 mLs of 2.5 M (82.5 mmoles), was added over 0.5 hour. The bath was removed and the orange slurry was stirred overnight. This slurry was then added to a slurry of 10.1 g (43.3 mmoles) of zirconium (IV) chloride in 200 mLs of n-pentane cooled in ice water. The bath was removed and the slurry was stirred for 5 days and then the slurry was filtered through sodium sulfate. The solid was washed with pentane and then extracted with methylene chloride. The solution was taken to dryness to yield 21.5 g of orange solid (80%).

Metallocene E: (2'-naphthyl)-3-butenylmethylidene($\eta^5$-cyclopentadienyl)($\eta^5$-9-2,7-di-tert-butylfluorenyl)zirconium dichloride was prepared as follows.

First, 6-(2-naphthyl)-6-(3-butenyl)fulvene was prepared from cyclopentadienyl Grignard reagents as follows. A 1 L round bottomed flask was charged with 1-(2-naphthyl)-4-penten-1-one, 97% (21.73 g, 100 mmol), THF (100 mL), and a stir bar, and cooled in an ice bath. Cyclopentadienyl magnesium chloride (150 mL of approximately 1 M solution in THF, 330 mmol) was added dropwise over ½ hour. The yellow solution was stirred for 2 hours in the ice bath. The yellow solution was then refluxed for 2.5 hours, during which time a red color developed. The solution was acidified by first adding 100 mLs of water, and then adding 100 mL of 1 M HCl. The product was extracted with pentane, and the pentane extracts were collected, washed with water, and dried over sodium sulfate. Elution through silica with pentane and concentration under vacuum afforded 20.25 g (73%) of the product 6-(2-naphthyl)-6-(3-butenyl)fulvene as a red oil, which was 93% pure. The major impurity was dicyclopentadiene.

Subsequently, 1-(2-naphthyl)-1-(3-butenyl)-1-(cyclopentadienyl)-1-(2,7-di-tert-butylfluorenyl)methane was prepared by reacting 2,7-di-tert-butylfluorenyl lithium and 6-(2-naphthyl)-6-(3-butenyl)fulvene as follows. A 500 mL flask was charged with 2,7-di-tert-butylfluorene (18.04 g, 64.8 mmoles) and a stir bar placed under a nitrogen atmosphere. Tetrahydrofuran (THF), 100 mLs, was added and the resulting solution was cooled in a dry-ice bath. This mixture was stirred as n-hexyllithium (30 mLs of 2.16 M in hexanes, 64.8 mmoles) was added dropwise yielding a dark red solution. After ½ hour the bath was removed and the solution was slowly warmed to room temperature over 1 and ½ hours. Meanwhile, the flask containing 20.25 g of 93% fulvene (72.7 mmoles) and 100 mLs of THF was cooled in ice. The fluorenyl anion solution from above was then added dropwise over 1 hour. After two days of stirring while warming to room temperature, a GC aliquot was taken. Another aliquot was taken after an additional 2 days of stirring and no change was found.

The reaction mixture was quenched with a saturated $NH_4Cl/H_2O$ solution (200 mL) and 200 mLs of 1 M HCl. The organic layer was extracted with 200 mLs of heptane, washed with 3×150 mLs of water, and dried over anhydrous $Na_2SO_4$. A solid began to precipitate, so the solution was filtered hot. The filtrate was concentrated to a thick slurry and cooled in a freezer for 2 days. Cold methanol was added to the solid and the mixture filtered. After washing with cold methanol, the product was dried under a blanket of nitrogen. The yield was 29.43 g (85%) of the desired parent ligand 1-(2-naphthyl)-1-(3-butenyl)-1-(cyclopentadienyl)-1-(2,7-di-tert-butylfluorenyl)methane.

Next, (2'-naphthyl)-3-butenylmethylidene($\eta^5$-cyclopentadienyl)($\eta^5$-9-2,7-di-tert-butylfluorenyl)zirconium dichloride was prepared. A flask was charged with the parent ligand 1-(2-naphthyl)-1-(5-hexenyl)-1-(cyclopentadienyl)-1-(2,7-di-tert-butylfluorenyl)-methane (14.49 g, 27.0 mmol) and a stir bar and placed under a nitrogen atmosphere. Diethyl ether (about 150 mLs) was added to the flask and the mixture stirred and cooled in an ice bath. While stirring was continued, n-hexyllithium (54 mLs of 2.16 M in hexanes, 230 mmol) was added dropwise. After the addition of n-hexyllithium was complete, the reaction mixture was stirred for 1 hour and the bath was removed. Vigorous stirring overnight produced a red solution. Stirring for an additional 24 hours produced a thick orange slurry. About 200 mLs of ether were added.

In a nitrogen-filled drybox, a one-liter flask was charged with $ZrCl_4$ (6.60 g, 28.3 mmoles) and a stir bar and capped with a rubber septum. After it was brought out of the drybox, the flask was charged with about 100 mLs of pentane under nitrogen, and cooled in an ice bath. The diethyl ether mixture of dilithiated parent ligand was added to the $ZrCl_4$ slurry via Teflon® tubing. The resulting orange slurry was warmed to room temperature and stirred for three days. The slurry was transferred to bottles and centrifuged and the solvent was then removed and saved. The solid was extracted with methylene chloride and centrifuged. The resulting solution was taken to dryness under vacuum to yield 4.76 g of orange solid.

Metallocene D: (4'-cyclohexylphenyl)-3-butenyl methylidene($\eta^5$-cyclopentadienyl)($\eta^5$-9-2,7-di-tert-butylfluorenyl)zirconium dichloride was prepared as follows. Starting from 1-(4'-cyclohexylphenyl)-4-penten-1-one, and proceeding by the methods outlined above, 32.27 g of the orange solid, [5-(4'-cyclohexylphenyl)](5-cyclopentadienyl)[5-(2,7-di-tert-butylfluorenyl)]pent-1-ene zirconium dichloride, was prepared.

Example 3

Preparation of Metallocene Solutions

Metallocene I: Under nitrogen, 1.00 g of solid metallocene I, bis(indenyl)dichlorozirconium, was slurried in 30 mL of hexene-1, followed by addition of 25 grams of neat (93%) triethylaluminum. This solution was diluted with 200 to 300 grams of n-heptane and transferred to a steel vessel. Isobutane was added to obtain a total of 40 pounds of solution.

Metallocene B: Under nitrogen, 2.00 g of solid metallocene B, 1-(methyl)-1-(3-butenyl)-1-(cyclopentadienyl)-1-(2,7-di-tert-butylfluorenyl)methane zirconium dichloride, was slurried in 100 to 200 mL of hexene-1, followed by addition of 25 grams of neat (93%) triethylaluminum. This solution was diluted with 160 to 240 grams of n-heptane and transferred to a steel vessel. Isobutane was added to obtain a total of 40 pounds of solution.

Metallocene C: Under nitrogen, 2.00 g of solid metallocene C, 1-(phenyl)-1-(3-butenyl)-1-(cyclopentadienyl)-1-(2,7-di-tert-butylfluorenyl)methane zirconium dichloride, was slurried in about 200 mL of hexene-1, followed by addition of 25 grams of neat (93%) triethylaluminum. This solution was diluted with 100 to 240 grams of n-heptane and transferred to a steel vessel. Isobutane was added to obtain a total of 40 pounds of solution.

Example 4

Pilot plant polymerizations were conducted in a 23-gallon slurry loop reactor at a production rate of approximately 25 pounds of polymer per hour. Polymerization runs were carried out under continuous particle form process conditions in a loop reactor (also known as a slurry process) by contacting a metallocene solution in isobutane, triethylaluminum, and a solid activator in a 2 L stirred autoclave with continuous output to the loop reactor.

The precontacting was carried out in the following manner. Triethylaluminum solution and metallocene solution in isobutane were fed as separate streams into a tee upstream of the autoclave where they contacted each other. The solid activator (sulfated alumina) was flushed with isobutane into a tee between the aforementioned tee and the autoclave, contacting the triethylaluminum/metallocene mixture just before entering the autoclave. The isobutane flush used to transport the solid activator into the autoclave was set at a rate that would result in a residence time of approximately 25 minutes in the autoclave. The total flow from the autoclave then entered the loop reactor.

Ethylene used was polymerization grade ethylene (previously obtained from the former Union Carbide Corporation) which was purified through a column of alumina and activated at 250° C. (482° F.) in nitrogen. 1-Hexene, when used, was polymerization grade 1-hexene (obtained from Chevron Phillips Chemical Company) which was purified by nitrogen purging and storage over 13-X molecular sieve activated at 250° C. (482° F.) in nitrogen. The loop reactor was a liquid full, 15.2 cm diameter, loop reactor, having a volume of 23 gallons (87 liters). Liquid isobutane was used as the diluent. Some hydrogen was added to regulate the molecular weight of the low molecular weight component of the polymer product. The isobutane was polymerization grade isobutane (obtained from Chevron Phillips Chemical Company, Borger, Tex.) that was further purified by distillation and subsequently passed through a column of alumina [activated at 250° C. (482° F.) in nitrogen].

Reactor conditions included a pressure around 580 psi (4 MPa), and a temperature that was varied from about 90° C. (194° F.) to about 99° C. (210° F.) as indicated in Table 1. Also, the reactor was operated to have a residence time of 1.25 hours. The solid activator was added through a 0.35 cc circulating ball-check feeder and fed to the 2-Liter autoclave as described above. Metallocene concentrations in the reactor were within a range of about 1 to 2 parts per million (ppm) of the diluent in the polymerization reactor. Polymer was removed from the reactor at the rate of about 25 lbs per hour and recovered in a flash chamber. A Vulcan dryer was used to dry the polymer under nitrogen at about 60-80° C. (140-176° F.).

Cocatalyst triethylaluminum (TEA) (obtained from Akzo Corporation) was also used. The cocatalyst was obtained as a one molar solution in heptane, but was further diluted to 1 weight percent. The cocatalyst was added in a concentration in a range of from about 8 to 12 parts per million of the diluent in the polymerization reactor. To prevent static buildup of the reactor, a small amount (less than 5 ppm, by weight, of diluent) of a commercial antistatic agent sold as "Stadis 450" was usually added.

Various resins were prepared according to the above procedure, as specified in Table 1. Table 2 presents a summary of the results.

As is evident, the resins produced according to the present invention exhibit excellent long-term failure due to slow crack growth properties. This is essential for pipe applications, particularly for gas distribution utility companies. In addition, the resins display high impact strength, illustrated by the 23° C. notched charpy impact.

Comparative Run 15 is a typical single reactor pipe resin. Despite the lower density it does not display the excellent properties of the present invention.

TABLE 1

Process Conditions for Various Experimental Runs.

| | Run No. | | | | | | |
|---|---|---|---|---|---|---|---|
| | 1 | 2 | 3 | 4 | 5 | 6 | 7 |
| Activator-Support | Sulfated alumina | Sulfated alumina | Sulfated alumina | Sulfated alumina | Sulfated alumina | Sulfated alumina | Sulfated alumina |
| Metallocene | B + I | B + I | B + I | B + I | C + I | C + I | C + I |
| Metallocene to Reactor (ppm) | 1.62 + 0.52 | 1.63 + 0.52 | 1.35 + 0.54 | 1.44 + 0.49 | 0.95 + 0.56 | 0.76 + 0.56 | 0.72 + 0.55 |
| Autoclave Residence Time (Min) | 21.70 | 21.85 | 22.16 | 21.86 | 22.86 | 2.84 | 23.30 |
| Cocatalyst Type | TEA | TEA | TEA | TEA | TEA | TEA | TEA |
| Cocatalyst (ppm) | 8.75 | 8.68 | 9.68 | 8.63 | 9.41 | 9.44 | 9.39 |
| Rx Temp (° C.) | 98.7 | 98.7 | 98.8 | 98.8 | 98.7 | 98.7 | 98.8 |
| Ethylene (mol %) | 15.76 | 14.86 | 15.11 | 15.44 | 12.50 | 14.48 | 14.01 |
| 1-hexene (mol %) | 0.63 | 0.50 | 0.70 | 0.58 | 0.37 | 0.17 | 0.16 |
| C6=/C2= (Mole Ratio) | 0.04 | 0.03 | 0.05 | 0.04 | 0.03 | 0.01 | 0.01 |
| $H_2$ (mlb/hr)) | 2.5 | 3.5 | 3.5 | 2.5 | 4.5 | 4.5 | 4.5 |
| C2= Feed Rate (lb/hr) | 24.50 | 24.53 | 24.55 | 22.78 | 24.51 | 24.51 | 24.50 |
| 1-Hexene Feed Rate (lb/hr) | 0.34 | 0.30 | 0.35 | 0.27 | 0.52 | 0.61 | 0.62 |
| Total iC4 Flow Rate (lb/hr) | 57.15 | 57.30 | 53.09 | 57.50 | 52.68 | 52.78 | 52.73 |
| Solids Conc. wt. % | 21.50 | 21.90 | 23.00 | 20.70 | 23.70 | 21.70 | 23.20 |
| Polymer Production (lb/hr) | 18.00 | 18.33 | 18.33 | 17.00 | 18.78 | 17.25 | 18.42 |
| Density (pellets) (g/cc) | 0.9516 | 0.9507 | 0.9487 | 0.9529 | 0.9504 | 0.9529 | 0.9531 |
| HLMI | 10.28 | 5.29 | 9.83 | 16.25 | 10.32 | 34.15 | 25.89 |
| Melt Index (MI) | 0.22 | 0.20 | 0.27 | 0.31 | 0.20 | 0.35 | 0.37 |
| HLMI/MI | 47 | 26 | 36 | 52 | 52 | 98 | 70 |

| | Run No. | | | | | | |
|---|---|---|---|---|---|---|---|
| | 8 | 9 | 10 | 11 | 12 | 13 | 14 |
| Activator-Support | Sulfated alumina | Sulfated alumina | Sulfated alumina | Sulfated alumina | Sulfated alumina | Sulfated alumina | Sulfated alumina |
| Metallocene | C + I | C + I | C + I | C + I | C + I | C + I | C + I |
| Metallocene to Reactor (ppm) | 1.66 + 0.41 | 1.38 + 0.39 | 1.37 + 0.40 | 1.38 + 0.39 | 1.28 + 0.41 | 1.30 + 0.41 | 1.39 + 0.40 |
| Autoclave Residence Time (Min) | 21.66 | 22.26 | 22.54 | 22.22 | 22.66 | 22.80 | 22.63 |
| Cocatalyst Type | TEA | TEA | TEA | TEA | TEA | TEA | TEA |
| Cocatalyst (ppm) | 10.72 | 10.05 | 9.75 | 9.69 | 9.45 | 9.69 | 9.62 |
| Rx Temp (° C.) | 89.8 | 89.9 | 89.9 | 89.9 | 89.9 | 89.9 | 89.9 |
| Ethylene (mol %) | 17.89 | 18.54 | 19.32 | 19.31 | 17.91 | 19.40 | 18.59 |
| 1-hexene (mol %) | 0.25 | 0.24 | 0.24 | 0.23 | 0.25 | 0.24 | 0.25 |
| C6=/C2= (Mole Ratio) | 0.01 | 0.01 | 0.01 | 0.01 | 0.01 | 0.01 | 0.01 |
| $H_2$ (mlb/hr)) | 3.3 | | 3.5 | 3.5 | 3.5 | 3.5 | 3.5 |
| C2= Feed Rate (lb/hr) | 26.34 | 26.59 | 26.56 | 26.60 | 26.67 | 26.59 | 26.59 |
| 1-Hexene Feed Rate (lb/hr) | 0.87 | 0.94 | 0.93 | 0.86 | 0.95 | 0.91 | 0.95 |
| Total iC4 Flow Rate (lb/hr) | 53.21 | 53.14 | 53.14 | 53.14 | 53.25 | 52.74 | 53.11 |
| Solids Conc. wt. % | 23.00 | 22.50 | 22.10 | 21.50 | 23.00 | 21.70 | 23.00 |
| Polymer Production (lb/hr) | 18.87 | 18.48 | 18.11 | 17.67 | 18.89 | 17.75 | 18.89 |
| Density (pellets) (g/cc) | 0.9469 | 0.9516 | 0.9520 | 0.9498 | 0.9490 | 0.9528 | 0.9521 |
| HLMI | 3.95 | 9.12 | 14.87 | 5.81 | 7.93 | 11.65 | 12.40 |
| Melt Index (MI) | 0.09 | 0.10 | 0.07 | 0.07 | 0.07 | 0.11 | 0.11 |
| HLMI/MI | 44 | 91 | 212 | 83 | 113 | 106 | 113 |

TABLE 2

Summary of Results.

| Run No. | Metallocene Type (Ratio) | Reactor Temp (° C.) | Cocatalyst type | Hydrogen (mLb/hr) | Pellet HLMI (dg/10 min) | Pellet MI (dg/10 min) | Pellet density (g/cc) | Mw ($\times 10^{-3}$) | Mw/Mn | Charpy (J @23° C.) notched | Pent (hrs) (2.4 Mpa) |
|---|---|---|---|---|---|---|---|---|---|---|---|
| 1 | B + I (3.1) | 98.7 | TEA | 2.5 | 10.28 | 0.22 | 0.9507 | 188 | 9.1 | 2.704 | — |
| 2 | B + I (3.1) | 98.7 | TEA | 3.5 | 5.29 | 0.2 | 0.9487 | 191 | 14 | 2.125 | — |
| 3 | B + I (2.5) | 98.8 | TEA | 3.5 | 9.83 | 0.27 | 0.9511 | 175 | 12 | 1.449 | — |
| 4 | B + I (2.9) | 98.8 | TEA | 2.5 | 16.25 | 0.31 | 0.9529 | 177 | 8.8 | — | — |
| 5 | C + I (1.7) | 98.7 | TEA | 4.5 | 10.32 | 0.2 | 0.9504 | 190 | 14 | 0.9479 | — |
| 6 | C + I (1.36) | 98.7 | TEA | 4.5 | 34.15 | 0.35 | 0.9529 | 169 | 12.7 | — | — |
| 7 | C + I (1.3) | 98.8 | TEA | 4.5 | 25.89 | 0.37 | 0.9531 | 169 | 12.5 | — | — |
| 8 | C + I (4.0) | 89.8 | TEA | 3.3 | 3.95 | 0.09 | 0.9469 | 279 | 15.3 | 1.5117 | >3671 |
| 9 | C + I (3.5) | 89.9 | TEA | 3.5 | 9.12 | 0.1 | 0.9516 | 247 | 15.2 | 1.009 | 1660 |
| 10 | C + I (3.4) | 89.9 | TEA | 3.5 | 14.87 | 0.07 | 0.952 | 243 | 15.3 | 1.177 | 885 |
| 11 | C + I (3.5) | 89.9 | TEA | 3.5 | 5.81 | 0.07 | 0.9498 | 262 | 14.8 | 1.5854 | 2383 |
| 12 | C + I ((3.1) | 89.9 | TEA | 3.5 | 7.93 | 0.07 | 0.949 | 260 | 14.6 | 1.2469 | 3349 |
| 13 | C + I (3.2) | 89.9 | TEA | 3.5 | 11.65 | 0.11 | 0.9528 | — | — | 0.7366 | 1838 |
| 14 | C + I (3.5) | 89.9 | TEA | 3.5 | 12.4 | 0.11 | 0.9521 | 217 | 17.6 | 0.9266 | 1466 |
| 15 | Comparative | — | — | — | 10 | 0.11 | 0.944 | — | — | — | 150 |

Run Nos. 1-7 were produced at 99° C.
Run Nos. 8-14 were produced at 90° C.
Run 15 is commercially available TR-480 HDPE made by Chevron Phillips Chemical Company, LP GPC curves for Example 3, Runs 1, 5, and 15 are provided in FIG. 1, demonstrating that a true bimodal distribution is obtained from this process.

Figure 2:
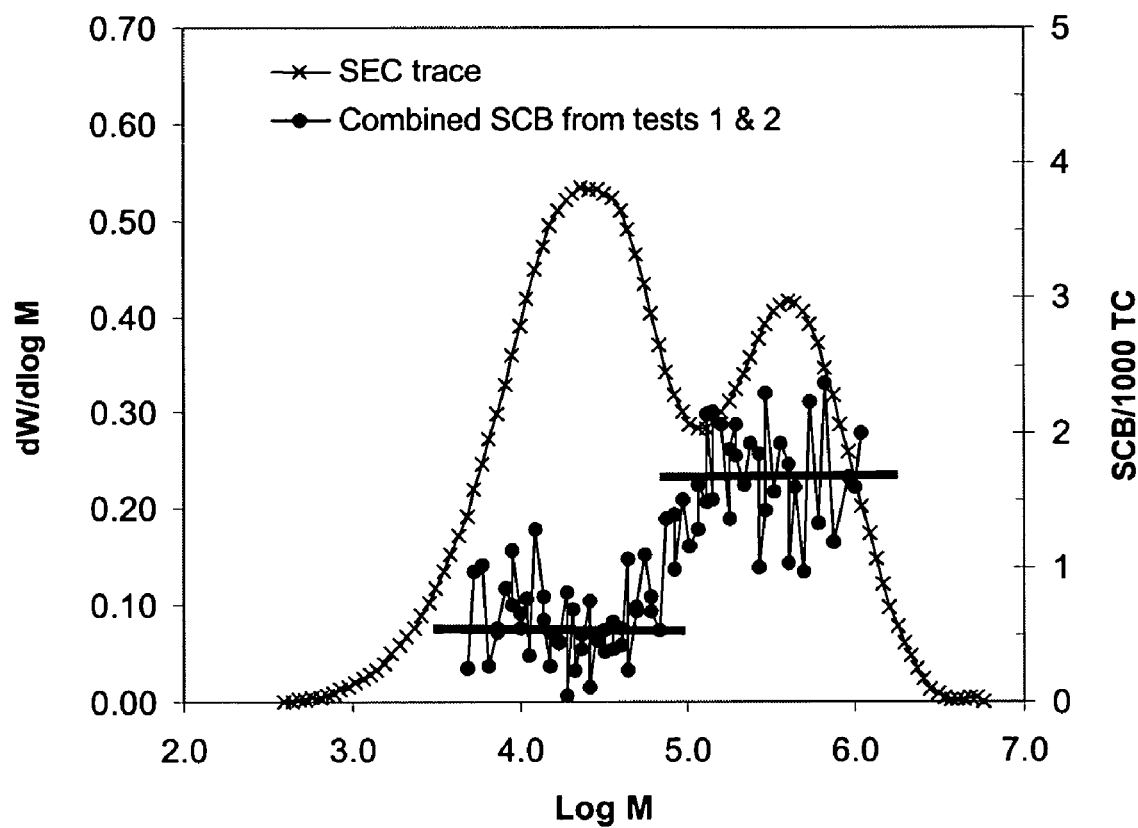
FIG. 2 presents the molecular weight distribution and the short chain branching distribution (SCB) across the molecular weight distribution for Run 14 of Example 3, prepared according to the present invention. The SCB test was run in duplicate.

FIG. 2 presents not only the molecular weight distribution (MWD), but also the short chain branching distribution across the MWD for Run 14. It is evident that the short chain branches produced through use of hexene-1 as a comonomer are largely concentrated in the high molecular weight portion of the polymer.

In sum, the present invention provides various catalyst compositions, methods for forming a catalyst composition, and resins and pipes formed by using the catalyst compositions. The catalyst composition generally includes two metallocene compounds, an activator, and a cocatalyst. The two metallocene compounds are selected such that the two metallocenes produce polymers having two distinctly different molecular weights. The metallocenes are combined with an activator-support, an organoaluminum compound, and an olefin monomer to produce a polyolefin having a bimodal molecular weight distribution. The resulting polymers feature an outstanding balance of stiffness and slow crack growth resistance. Additionally, the polymers produced according to the present invention have excellent impact strength.

Example 5

Bench Scale Polymerization of Additional Metallocenes Suitable for Production of the High Molecular Weight Component Runs 16-19 in Table 3 illustrate ethylene polymerization runs performed in a one-gallon autoclave with a single metallocene. The runs were performed at about 90° C. or at about 100° C., with two liters of isobutane diluent and 1 mmole of triethylaluminum cocatalyst. No hydrogen was added.

For solutions C2 and E2, 24 mg of ansa-Metallocenes C and E, respectively, were dissolved in 12 mLs of hexene-1 and then 2 mLs of 15 wt % triethylaluminum in heptane were added followed by sonicating for 10 minutes. For solutions C1 and D1, 24 mg of ansa-Metallocenes C and D, respectively, were dissolved in 24 mLs of toluene with stirring.

Following preparation of the metallocene solution, 1 mL of 15 wt % triethylaluminum in heptane was added to a cool reactor, which had been purged with nitrogen and then isobutane. This was followed by the chemically-treated solid oxide (CTSO) and the metallocene solution, all under isobutane purge. The autoclave was then closed and 2 L of isobutane were charged, and the stirrer set at 700 rpm. The autoclave was then heated to just below the set point and ethylene and 5 grams of hexene-1 were introduced. Ethylene was fed on demand to maintain the specified pressure for 60 minutes. The run was terminated by shutting off the ethylene flow and venting the volatile components. The polymer was removed, dried, and weighed.

TABLE 3

| | Run No. | | | |
|---|---|---|---|---|
| | 16 | 17 | 18 | 19 |
| Metallocene | C | D | C | E |
| Metallocene Solution | C1 | D1 | C2 | E2 |
| Metallocene (mg) | 0.5 | 0.5 | 0.17 | 0.17 |
| Temp (C.) | 90 | 90 | 100 | 100 |
| Ethylene (psig) | 450 | 450 | 550 | 550 |
| CTSO (mg) | 168 | 145 | 148 | 158 |
| Solid PE (g) | 81 | 120 | 189.1 | 126.7 |
| CTSO Activity (g/g/hr) | 482 | 828 | 1278 | 802 |
| Mw/1000 | 824 | 758 | 535 | 443 |
| Mn/1000 | 343 | 304 | 243 | 194 |
| Mw/Mn | 2.4 | 2.49 | 2.2 | 2.28 |

Comparison of the molecular weights from Runs and 16 and 17 from metallocenes C and D shows that metallocene D is also suitable for use in producing the high molecular weight portion of the bimodal resin produced by this invention.

In like manner, comparison of the molecular weights in Runs 18 and 19 from metallocenes C and E shows that metallocene E is also suitable for use in producing the high molecular weight portion of the bimodal resin produced by this invention.

The foregoing description has been presented for purposes of illustration and description. It is not intended to be exhaustive or to limit the invention to the precise examples or embodiments disclosed. Obvious modifications or variations are possible in light of the above teachings. The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A catalyst composition comprising a first metallocene compound, an unbridged second metallocene compound, an activator-support, and an organoaluminum compound, wherein:

(a) the first metallocene compound has the formula:

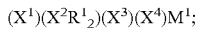
   $(X^1)(X^2R^1{}_2)(X^3)(X^4)M^1$;

wherein $(X^1)$ is cyclopentadienyl, indenyl, or fluorenyl;
   $(X^2)$ is fluorenyl;
   $(X^1)$ and $(X^2)$ are connected by a disubstituted bridging group comprising one atom bonded to both $(X^1)$ and $(X^2)$, wherein the atom is carbon or silicon;
   a first substituent of the disubstituted bridging group is an aliphatic or aromatic group having from 1 to about 20 carbon atoms;
   a second substituent of the disubstituted bridging group is an unsaturated aliphatic group having from 3 to about 10 carbon atoms;
   $R^1$ is H, an alkyl group having from 1 to about 12 carbon atoms, or an aryl group having from 1 to about 12 carbon atoms;
   $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide;
   $M^1$ is Zr or Hf;

(b) the second metallocene has the formula:

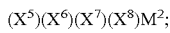
   $(X^5)(X^6)(X^7)(X^8)M^2$;

wherein $(X^5)$ is a substituted or unsubstituted cyclopentadienyl, or substituted or unsubstituted indenyl, any substituent on $(X^5)$ is independently a linear or branched substituted or unsubstituted alkyl group, or a linear or branched substituted or unsubstituted alkenyl group, having from 1 to about 20 carbon atoms;
   $(X^6)$ is a substituted or unsubstituted cyclopentadienyl, or substituted or unsubstituted indenyl, any substituent on $(X^6)$ is independently a substituted linear alkyl group, a branched substituted or unsubstituted alkyl group, or a linear or branched substituted or unsubstituted alkenyl group, having from 1 to about 20 carbon atoms;
   $(X^7)$ and $(X^8)$ are independently an aliphatic group, an aromatic group, a cyclic group, a combination of aliphatic and cyclic groups, or a substituted derivative thereof, having from 1 to about 20 carbon atoms, or a halide; and
   $M^2$ is Zr or Hf.

2. The catalyst composition of claim 1, wherein the ratio of the first metallocene compound to the second metallocene compound is from about 1:10 to about 10:1.

3. The catalyst composition of claim 1, wherein the ratio of the first metallocene compound to the second metallocene compound is from about 1:5 to about 5:1.

4. The catalyst composition of claim 1, wherein the ratio of the first metallocene compound to the second metallocene compound is from about 1:2 to about 2:1.

5. The catalyst composition of claim 1, wherein the first substituent of the disubstituted bridging group is a phenyl group, a cyclohexylphenyl group, a naphthyl group, or a methyl group.

6. The catalyst composition of claim 1, wherein the second substituent of the disubstituted bridging group is a butenyl group, a pentenyl group, or a hexenyl group.

7. The catalyst composition of claim 1, wherein the first metallocene is:

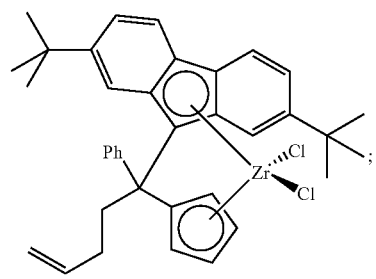

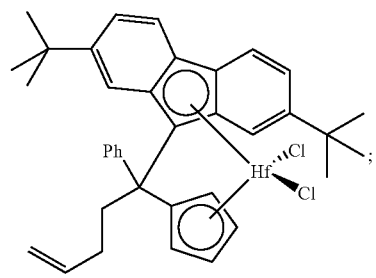

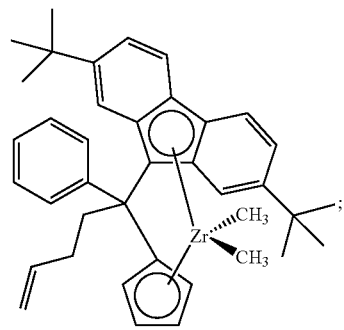

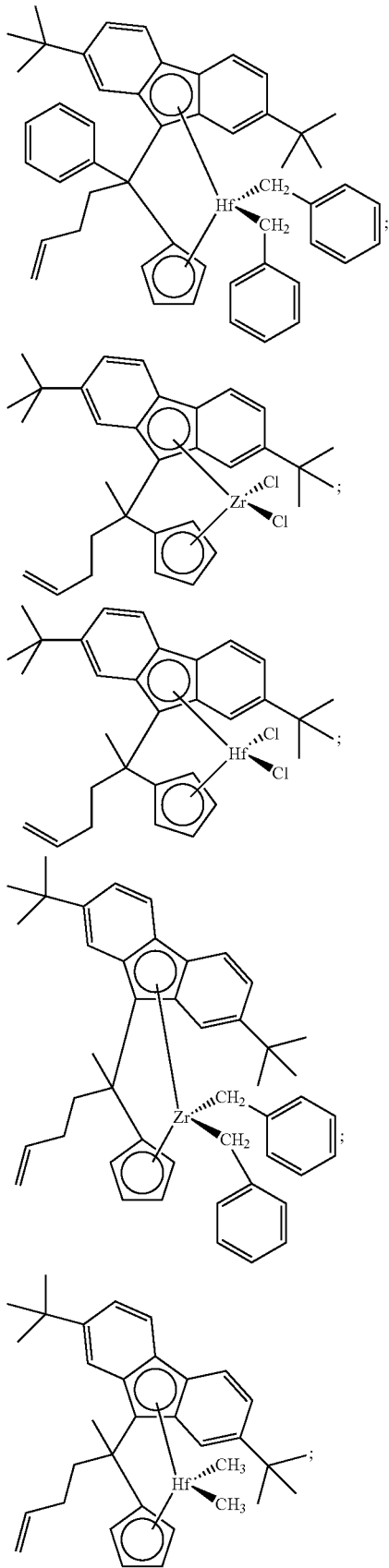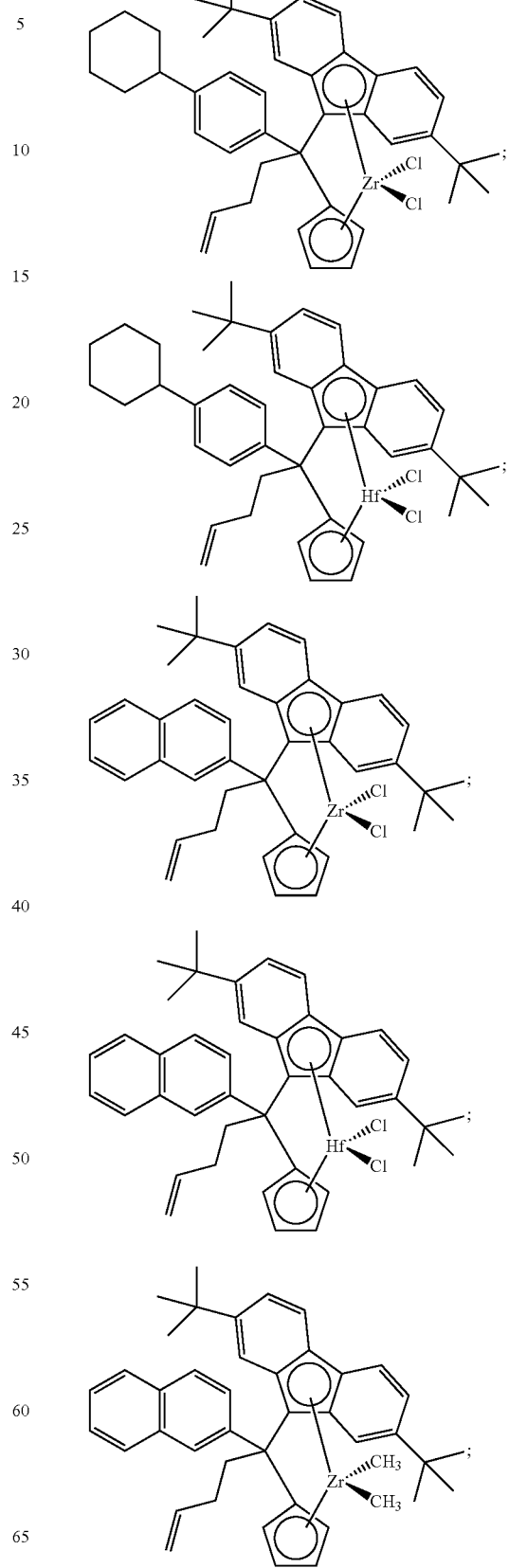

-continued
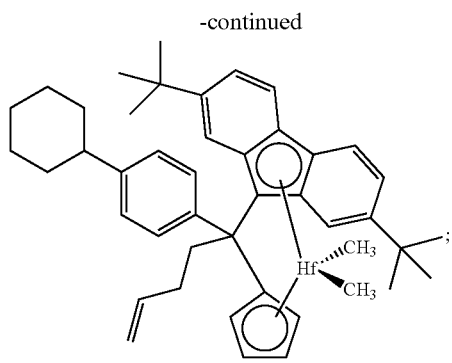
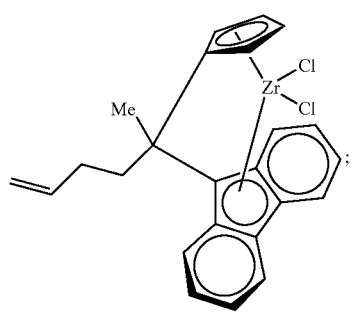
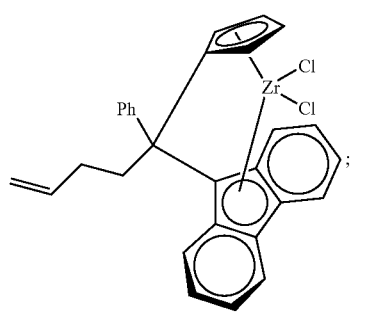
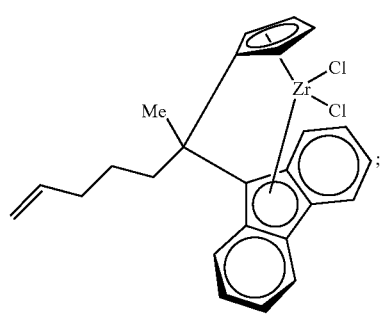
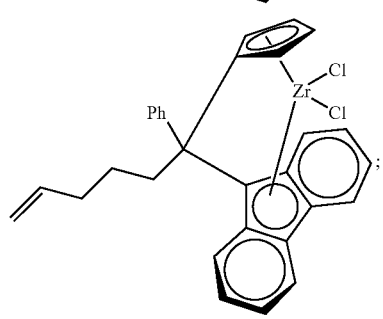
-continued
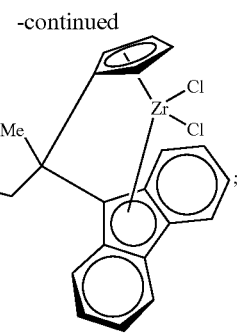
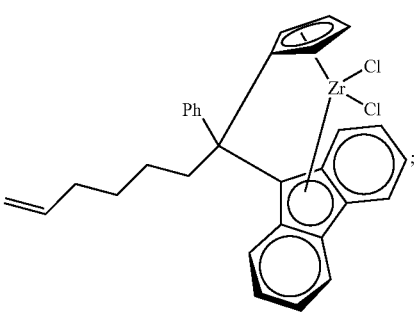
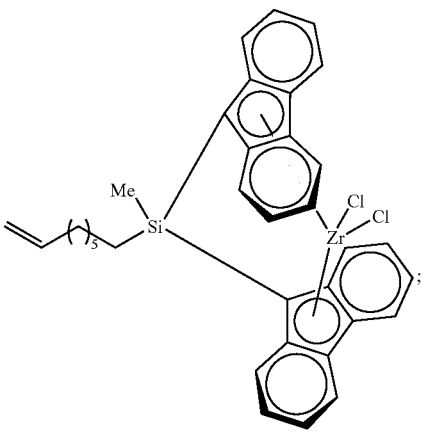
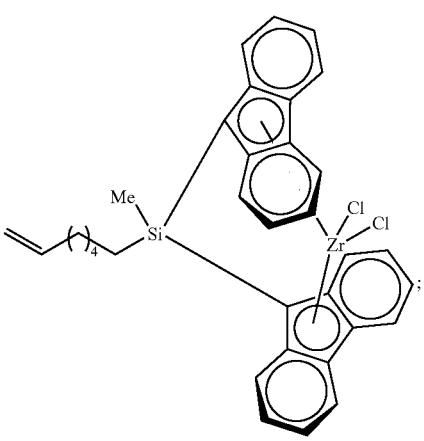

-continued
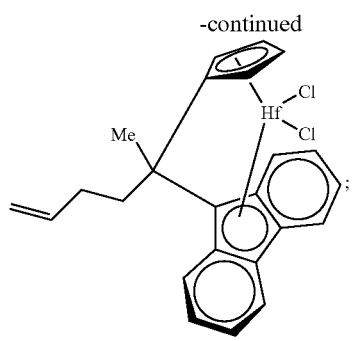
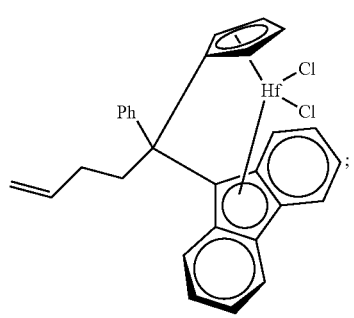
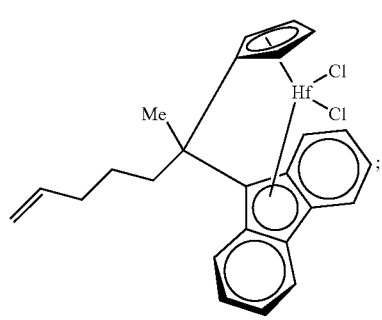
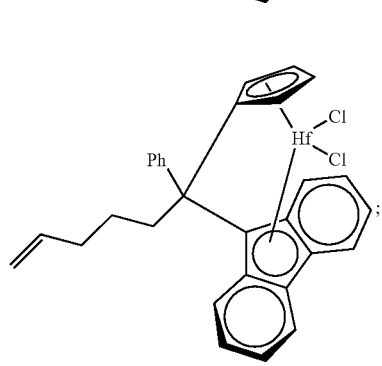
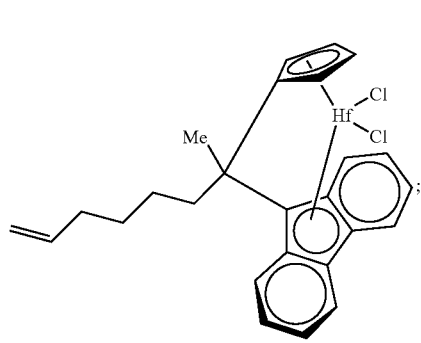
-continued
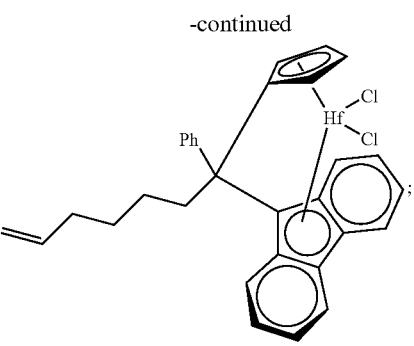
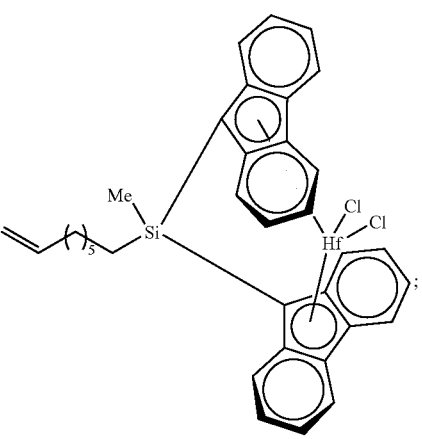
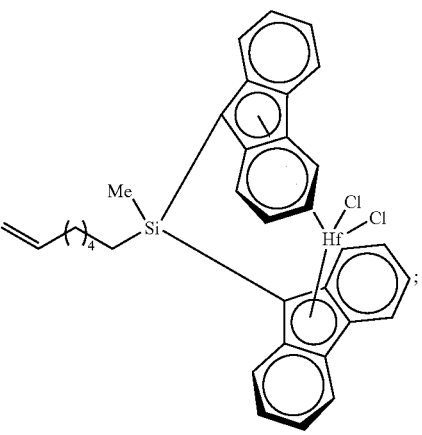
or any combination thereof.
8. The catalyst composition of claim 1, wherein the second metallocene is:
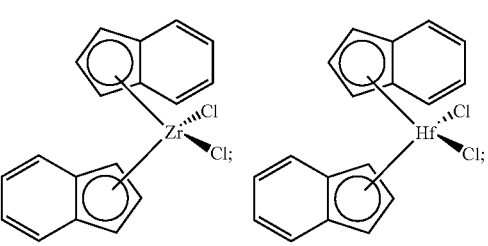

-continued

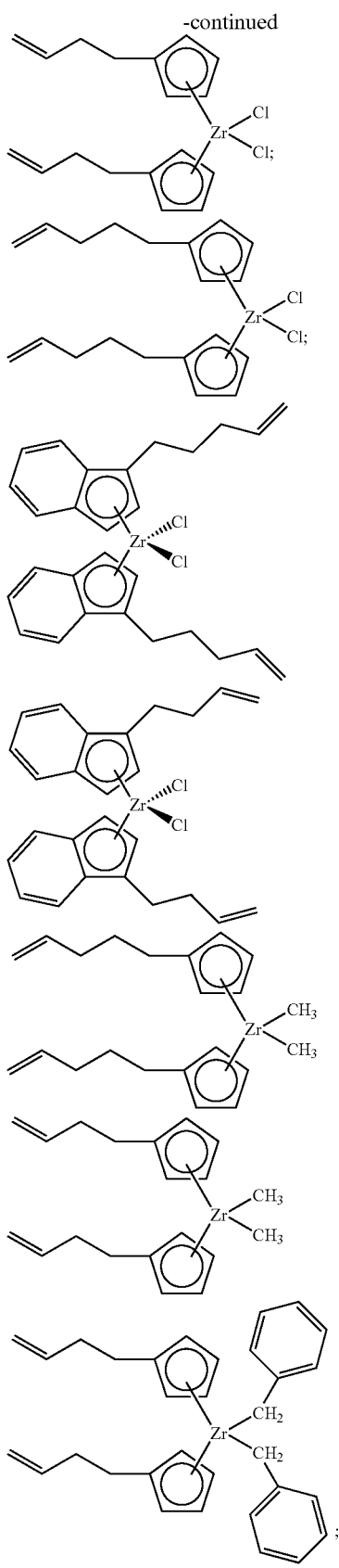

or any combination thereof.

9. The catalyst composition of claim 1, wherein the activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

10. The catalyst composition of claim 1, wherein the activator-support comprises a solid oxide treated with an electron-withdrawing anion,
wherein the solid oxide is silica, alumina, silica-alumina, aluminum phosphate, heteropolytungstates, titania, zirconia, magnesia, boria, zinc oxide, any mixed oxides thereof, or any mixture thereof and
the electron-withdrawing anion is fluoride, chloride, bromide, phosphate, triflate, bisulfate, sulfate, or any combination thereof.

11. The catalyst composition of claim 10, wherein the activator-support further comprises a metal or metal ion, wherein the metal or metal ion is zinc, nickel, vanadium, silver, copper, gallium, tin, tungsten, molybdenum, or any combination thereof.

12. The catalyst composition of claim 1, wherein the activator-support comprises a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or a supported aluminoxane activator-support, or any combination thereof.

13. The catalyst composition of claim 1, wherein the organoaluminum compound has the formula:

$$(R^2)_3Al;$$

wherein $(R^2)$ is an aliphatic group having from 2 to about 6 carbon atoms.

14. The catalyst composition of claim 13, wherein $(R^2)$ is ethyl, propyl, butyl, hexyl, or isobutyl.

15. The catalyst composition of claim 1, wherein the organoaluminum compound has the formula:

$$Al(X^9)_n(X^{10})_{3-n};$$

wherein $(X^9)$ is a hydrocarbyl having from 1 to about 20 carbon atoms, $(X^{10})$ is an alkoxide or an aryloxide having from 1 to about 20 carbon atoms, a halide, or a hydride, and n is a number from 1 to 3, inclusive.

16. The catalyst composition of claim 1, wherein the organoaluminum compound is trimethylaluminum, triethylaluminum, tri-n-propylaluminum, diethylaluminum ethoxide, tri-n-butylaluminum, diisobutylaluminum hydride, triisobutylaluminum, diethylaluminum chloride, or any combination thereof.

17. The catalyst composition of claim 1, wherein the weight ratio of the organoaluminum compound to the activator-support is from about 10:1 to about 1:1000.

18. The catalyst composition of claim 1, farther comprising at least one aluminoxane compound, at least one organozinc compound, at least one organoboron compound, at least one ionizing ionic compound, or any combination thereof.

19. The catalyst composition of claim 1, wherein the activator support comprises at least one aluminoxane compound or supported aluminoxane compound, wherein the aluminoxane comprises a cyclic aluminoxane having the formula:

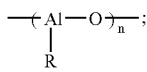

wherein R is a linear or branched alkyl having from 1 to 10 carbon atoms, and n is an integer from 3 to about 10; a linear aluminoxane having the formula:

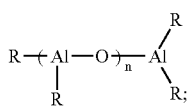

wherein R is a linear or branched alkyl having from 1 to 10 carbon atoms, and n is an integer from 1 to about 50; a cage aluminoxane having the formula $R^t_{5m+\alpha}R^b_{m-\alpha}Al_{4m}O_{3m}$;
wherein m is 3 or 4 and $\alpha$ is $=n_{Al(3)}-n_{O(2)}+n_{O(4)}$;
wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group;
wherein R is a linear or branched alkyl having from 1 to 10 carbon atoms; or any combination thereof.

20. The catalyst composition of claim 1, comprising at least one ionizing ionic compound.

21. A catalyst composition comprising an ansa-metallocene compound, an unbridged metallocene compound, an activator-support, and an organoaluminum compound, wherein:
(a) the ansa-metallocene compound has the formula:

$(X^1)(X^2R^1_2)(X^3)(X^4)M^1$;

wherein $(X^1)$ is cyclopentadienyl, indenyl, or fluorenyl; $(X^2)$ is fluorenyl;
$(X^1)$ and $(X^2)$ are connected by a disubstituted bridging group comprising one atom bonded to both $(X^1)$ and $(X^2)$, wherein the atom is carbon or silicon;
a first substituent of the disubstituted bridging group is an aliphatic or aromatic group having from 1 to about 20 carbon atoms;
a second substituent of the disubstituted bridging group is an unsaturated aliphatic group having from 3 to about 6 carbon atoms;
$R^1$ is an alkyl group having from 1 to about 4 carbon atoms;
$(X^3)$ and $(X^4)$ are independently a halide;
$M^1$ is Zr or Hf; and
(b) the unbridged metallocene has the formula:

$(X^5)(X^6)(X^7)(X^8)M^2$;

wherein $(X^5)$ and $(X^6)$ are independently a substituted or unsubstituted cyclopentadienyl, or substituted or unsubstituted indenyl, any substituent on $(X^5)$ and $(X^6)$ is independently a linear or branched, substituted or unsubstituted alkyl group, or a linear or branched substituted or unsubstituted alkenyl group, having from 1 to about 20 carbon atoms; $(X^7)$ and $(X^8)$ are independently a halide; and
$M^2$ is Zr or Hf.

22. The catalyst composition of claim 21, wherein the ratio of the ansa-metallocene compound to the unbridged metallocene compound is from about 1:10 to about 10:1.

23. The catalyst composition of claim 21, wherein the ratio of the ansa-metallocene compound to the unbridged metallocene compound is from about 1:5 to about 5:1.

24. The catalyst composition of claim 21, wherein the ratio of the ansa-metallocene compound to the unbridged metallocene compound is from about 1:2 to about 2:1.

25. The catalyst composition of claim 21, wherein the first substituent of the disubstituted bridging group is a phenyl group, a cyclohexylphenyl group, a naphthyl group, or a methyl group.

26. The catalyst composition of claim 21, wherein the second substituent of the disubstituted bridging group is a butenyl group, a pentenyl group, or a hexenyl group.

27. The catalyst composition of claim 21, wherein the ansa-metallocene compound is:

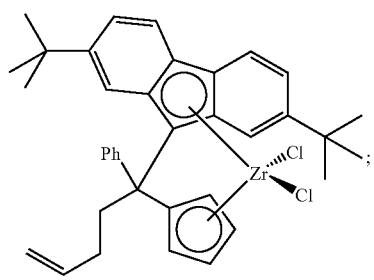

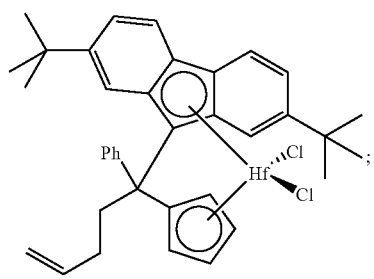

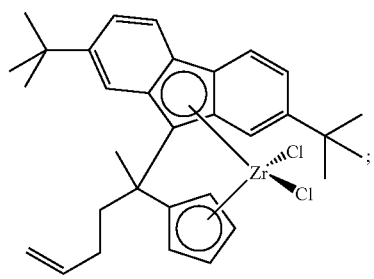

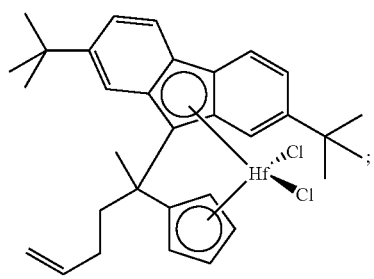

-continued
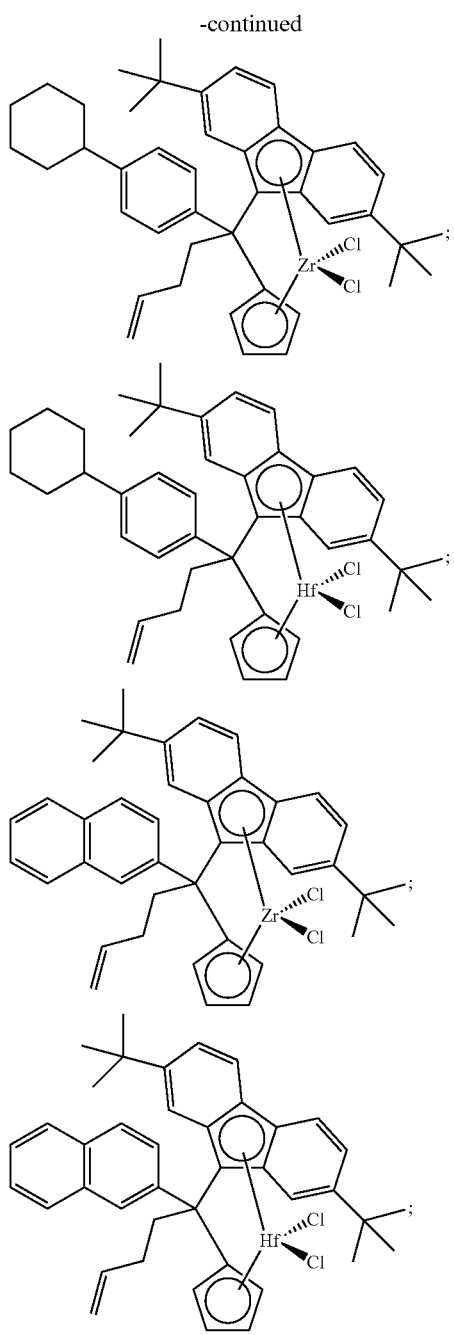
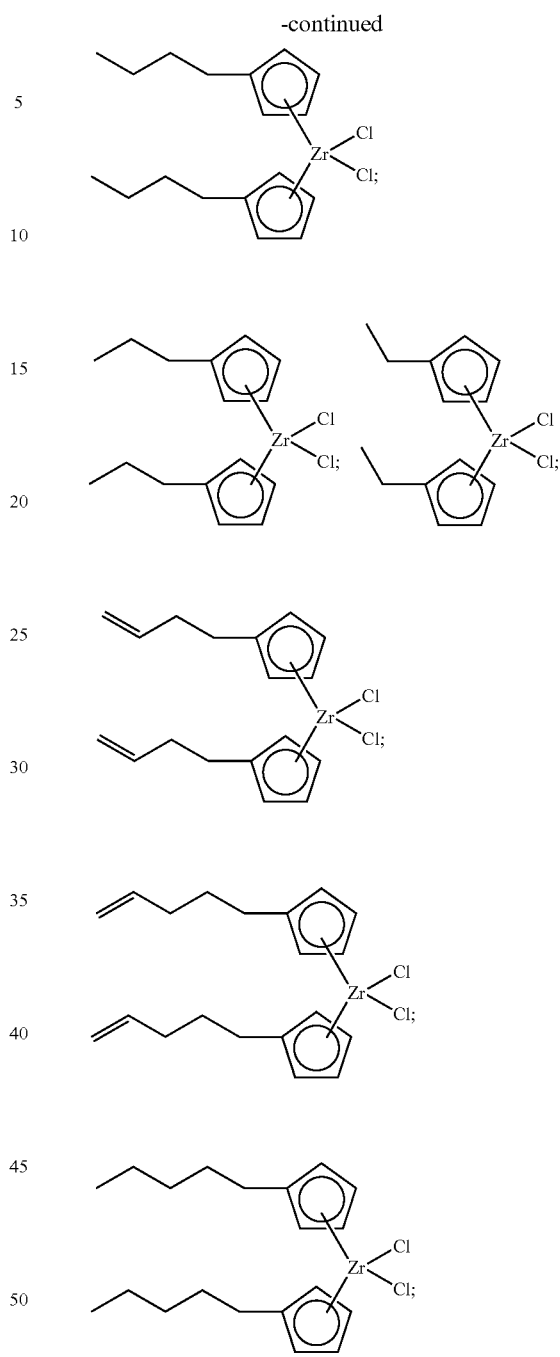
or any combination thereof.
28. The catalyst composition of claim 21, wherein the unbridged metallocene compound is:
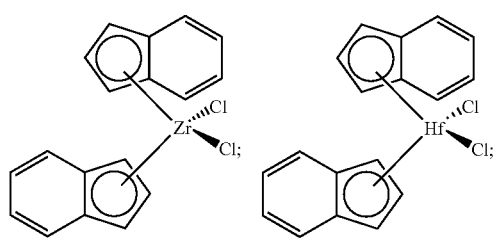
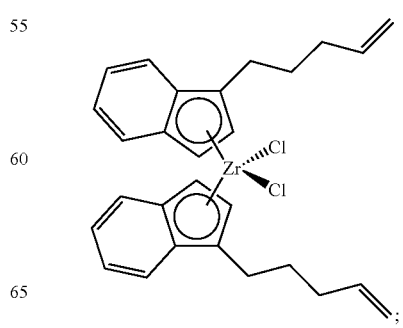

-continued

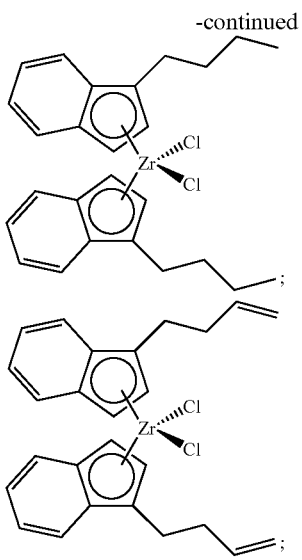

or any combination thereof.

29. The catalyst composition of claim 21, wherein the activator-support comprises a solid oxide treated with an electron-withdrawing anion,
  wherein the solid oxide is silica, alumina, silica-alumina, aluminum phosphate, heteropolytungstates, titania, zirconia, magnesia, boria, zinc oxide, any mixed oxide thereof, or any mixture thereof; and
  the electron-withdrawing anion is fluoride, chloride, bromide, phosphate, triflate, bisulfate, sulfate, or any combination thereof.

30. The catalyst composition of claim 21, wherein the activator-support comprises a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

31. The catalyst composition of claim 21, wherein the organoaluminum compound has the formula:

wherein ($R^2$) is an aliphatic group having from 2 to about 6 carbon atoms.

32. The catalyst composition of claim 31, wherein ($R^2$) is ethyl, propyl, butyl, hexyl, or isobutyl.

33. The catalyst composition of claim 21, wherein the organoaluminum compound has the formula:

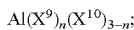

wherein ($X^9$) is a hydrocarbyl having from 1 to about 20 carbon atoms, ($X^{10}$) is an alkoxide or an aryloxide having from 1 to about 20 carbon atoms, a halide, or a hydride, and n is a number from 1 to 3, inclusive.

34. The catalyst composition of claim 21, wherein the organoaluminum compound is trimethylaluminum, triethylaluminum, tri-n-propylaluminum, diethylaluminum ethoxide, tri-n-butylaluminum, diisobutylaluminum hydride, triisobutylaluminum, diethylaluminum chloride, or any combination thereof.

35. A catalyst composition comprising an ansa-metallocene compound, an unbridged metallocene compound, an activator-support, and an organoaluminum compound, wherein:

(a) the ansa-metallocene compound is:

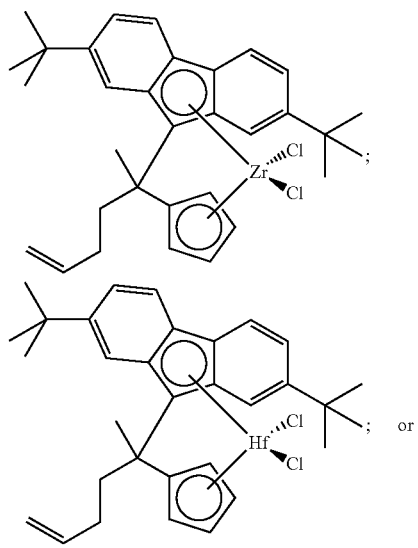

a combination thereof (b) the unbridged metallocene is:

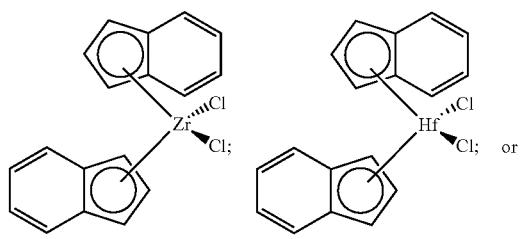

a combination thereof and (c) the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, a pillared clay, or any combination thereof.

36. The catalyst composition of claim 35, wherein the ratio of the ansa-metallocene compound to the unbridged metallocene compound is from about 1:10 to about 10:1.

37. The catalyst composition of claim 35, wherein the organoaluminum compound has the formula:

wherein ($R^2$) is an aliphatic group having from 2 to about 6 carbon atoms.

38. The catalyst composition of claim 37, wherein ($R^2$) is ethyl, propyl, butyl, hexyl, or isobutyl.

39. The catalyst composition of claim 35, wherein the organoaluminum compound has the formula:

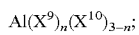

wherein ($X^9$) is a hydrocarbyl having from 1 to about 20 carbon atoms, ($X^{10}$) is an alkoxide or an aryloxide having from 1 to about 20 carbon atoms, a halide, or a hydride, and n is a number from 1 to 3, inclusive.

40. The catalyst composition of claim 35, wherein the weight ratio of the organoaluminum compound to the activator-support is from about 10:1 to about 1:1000.

41. The catalyst composition of claim 35, further comprising at least one aluminoxane compound, at least one organozinc compound, at least one organoboron compound, at least one ionizing ionic compound, or any combination thereof.

42. A catalyst composition comprising an ansa-metallocene compound, an unbridged metallocene compound, an activator-support, and an organoaluminum compound, wherein:

(a) the ansa-metallocene compound is:

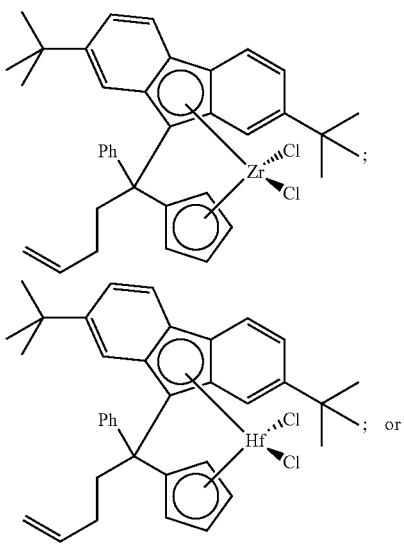

a combination thereof
(b) the unbridged metallocene is:

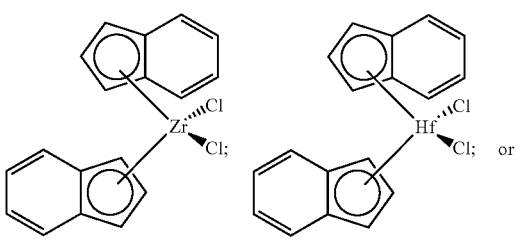

a combination thereof; and
(c) the activator-support comprises fluorided alumina, chiorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, a pillared clay, or any combination thereof.

43. The catalyst composition of claim 42, wherein the ratio of the ansa-metallocene compound to the unbridged metallocene compound is from about 1:10 to about 10:1.

44. The catalyst composition of claim 42, wherein the activator-support farther comprises a metal or metal ion, wherein the metal or metal ion is zinc, nickel, vanadium, silver, copper, gallium, tin, tungsten, molybdenum, or any combination thereof.

45. The catalyst composition of claim 42, wherein the organoaluminum compound has the formula:

wherein ($R^2$) is an aliphatic group having from 2 to about 6 carbon atoms.

46. The catalyst composition of claim 42, wherein ($R^2$) is ethyl, propyl, butyl, hexyl, or isobutyl.

47. The catalyst composition of claim 42, wherein the organoaluminum compound has the formula:

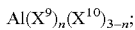

wherein ($X^9$) is a hydrocarbyl having from 1 to about 20 carbon atoms, ($X^{10}$) is an alkoxide or an aryloxide having from 1 to about 20 carbon atoms, a halide, or a hydride, and n is a number from 1 to 3, inclusive.

48. The catalyst composition of claim 42, wherein the organoaluminum compound is trimethylaluminum, triethylaluminum, tri-n-propylaluminum, diethylaluminum ethoxide, tri-n-butylaluminum, diisobutylaluminum hydride, triisobutylaluminum, diethylaluminum chloride, or any combination thereof.

49. The catalyst composition of claim 42, wherein the weight ratio of the organoaluminum compound to the activator-support is from about 10:1 to about 1:1000.

50. The catalyst composition of claim 42, further comprising at least one aluminoxane, at least one organozinc compound, at least one organoboron compound, at least one ionizing ionic compound, or any combination thereof.

51. A catalyst composition comprising a first metallocene compound, a second metallocene compound, an activator-support, and an organoaluminum compound, wherein:

(a) the first metallocene compound is:

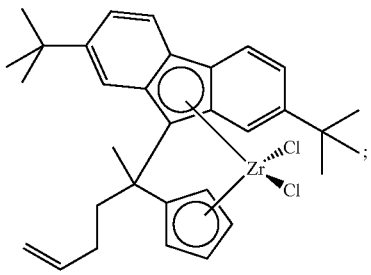

(b) the second metallocene is:

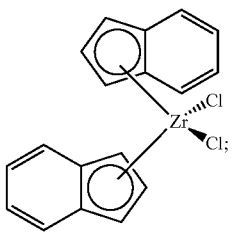

(c) the activator-support is sulfated alumina; and
(d) the organoaluminum compound is triethylaluminum.

52. A catalyst composition comprising a first metallocene compound, an unbridged second metallocene compound, an activator-support, and an organoaluminum compound, wherein:

(a) the first metallocene compound has the formula:

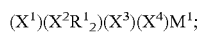

wherein ($X^1$) is cyclopentadienyl, indenyl, or fluorenyl;
($X^2$) is fluorenyl;
($X^1$) and ($X^2$) are connected by a disubstituted bridging group comprising one atom bonded to both ($X^1$) and ($X^2$), wherein the atom is silicon;
a first substituent of the disubstituted bridging group is an aliphatic or aromatic group having from 1 to about 20 carbon atoms;
a second substituent of the disubstituted bridging group is an unsaturated aliphatic group having from 3 to about 10 carbon atoms;
$R^1$ is H, an alkyl group having from 1 to about 12 carbon atoms, or an aryl group having from 1 to about 12 carbon atoms;
($X^3$) and ($X^4$) are independently an aliphatic group, an aromatic group, a cyclic group, a combination of aliphatic and cyclic groups, or a substituted derivative thereof, having from 1 to about 20 carbon atoms, or a halide;
$M^1$ is Zr or Hf;

(b) the second metallocene has the formula:

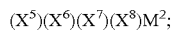

wherein ($X^5$) and ($X^6$) are independently a substituted or unsubstituted cyclopentadienyl, or substituted or unsubstituted indenyl, any substituent on ($X^5$) and ($X^6$) is independently a linear or branched substituted or unsubstituted alkyl group, or a linear or branched substituted or unsubstituted alkenyl group, having from 1 to about 20 carbon atoms;
($X^7$) and ($X^8$) are independently an aliphatic group, an aromatic group, a cyclic group, a combination of aliphatic and cyclic groups, or a substituted derivative thereof, having from 1 to about 20 carbon atoms, or a halide; and
$M^2$ is Zr or Hf.

53. The catalyst composition of claim 52, wherein the first metallocene is:

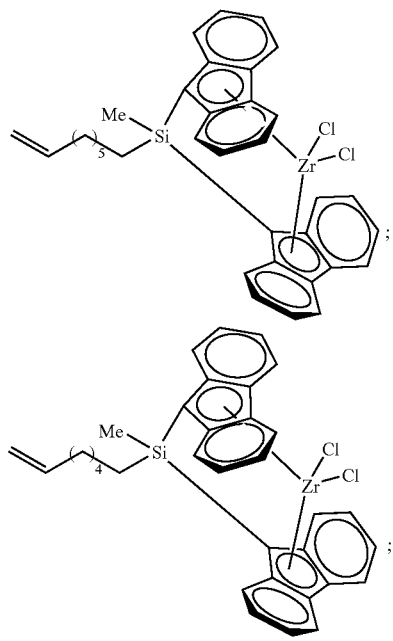

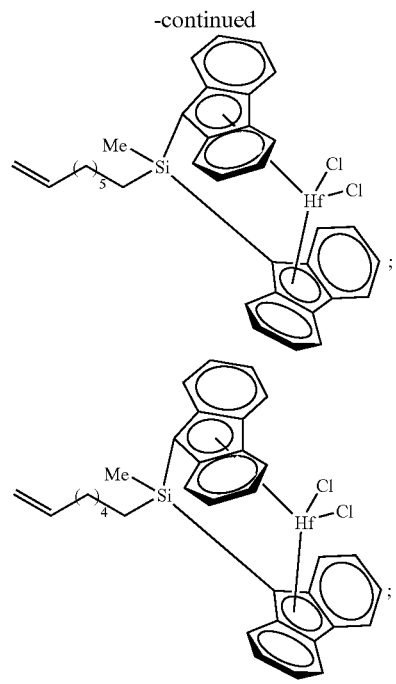

or any combination thereof.

54. A catalyst composition comprising a first metallocene compound, an unbridged second metallocene compound, an activator-support, and an organoaluminum compound, wherein:

(a) the first metallocene compound has the formula:

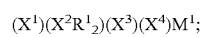

wherein ($X^1$) is cyclopentadienyl, indenyl, or fluorenyl;
($X^2$) is fluorenyl;
($X^1$) and ($X^2$) are connected by a disubstituted bridging group comprising one atom bonded to both ($X^1$) and ($X^2$), wherein the atom is carbon or silicon;
a first substituent of the disubstituted bridging group is an aliphatic or aromatic group having from 1 to about 20 carbon atoms;
a second substituent of the disubstituted bridging group is an unsaturated aliphatic group having from 3 to about 10 carbon atoms;
$R^1$ is an alkyl group having from 1 to about 12 carbon atoms, or an aryl group having from 1 to about 12 carbon atoms;
($X^3$) and ($X^4$) are independently an aliphatic group, an aromatic group, a cyclic group, a combination of aliphatic and cyclic groups, or a substituted derivative thereof, having from 1 to about 20 carbon atoms, or a halide;
$M^1$ is Zr or Hf;

(b) the second metallocene has the formula:

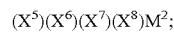

wherein ($X^5$) and ($X^6$) are independently a substituted or unsubstituted cyclopentadienyl, or substituted or unsubstituted indenyl, any substituent on ($X^5$) and ($X^6$) is independently a linear or branched substituted or unsubstituted alkyl group, or a linear or branched substituted or unsubstituted alkenyl group, having from 1 to about 20 carbon atoms;

($X^7$) and ($X^8$) are independently an aliphatic group, an aromatic group, a cyclic group, a combination of aliphatic and cyclic groups, or a substituted derivative thereof, having from 1 to about 20 carbon atoms, or a halide; and
$M^2$ is Zr or Hf.
55. The catalyst composition of claim 54, wherein the first metallocene is:
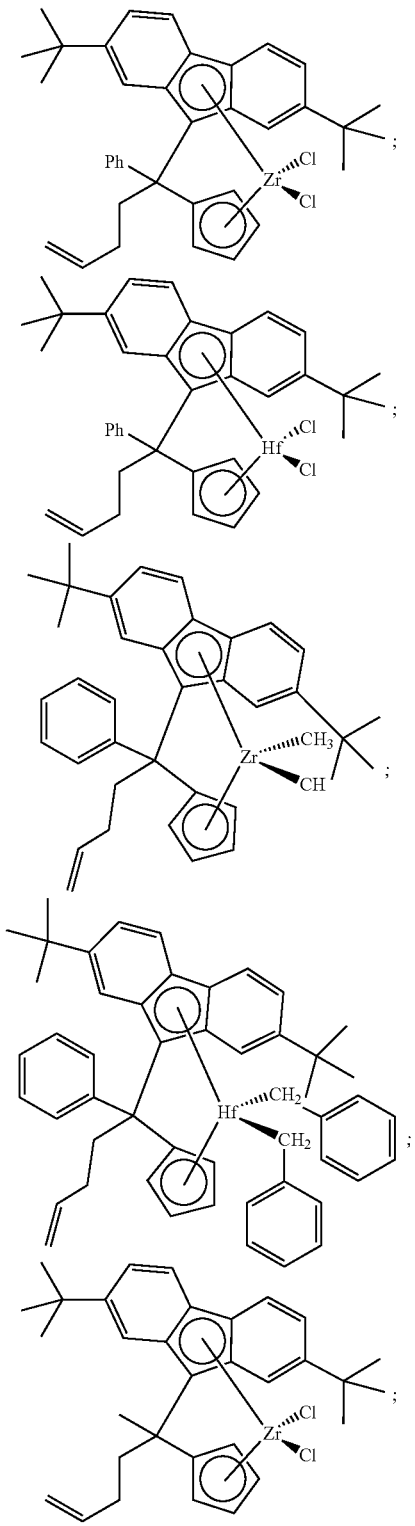
-continued
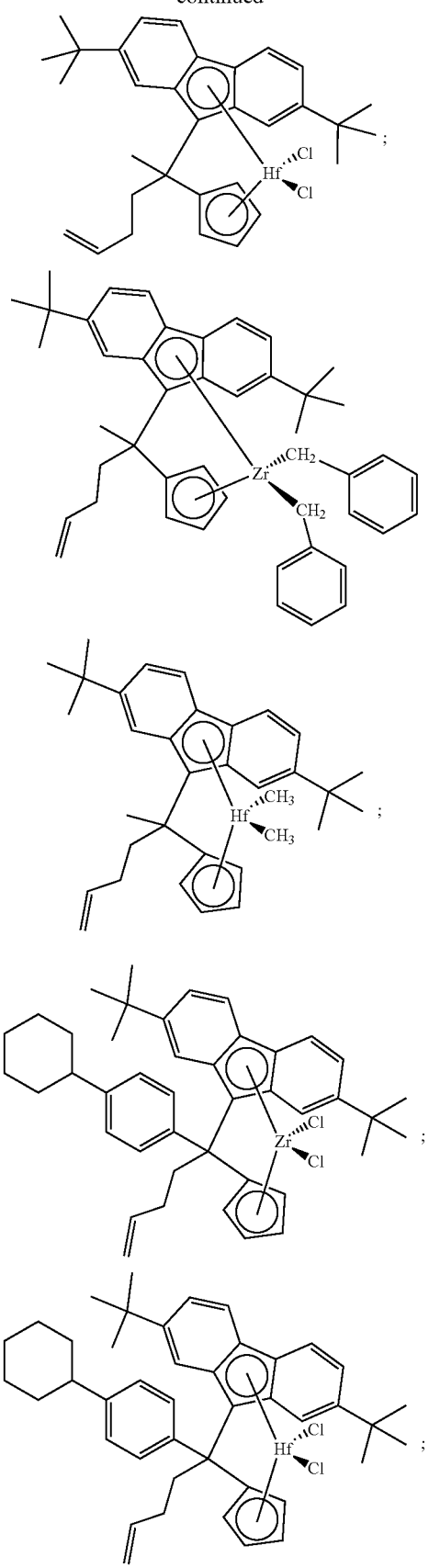

-continued

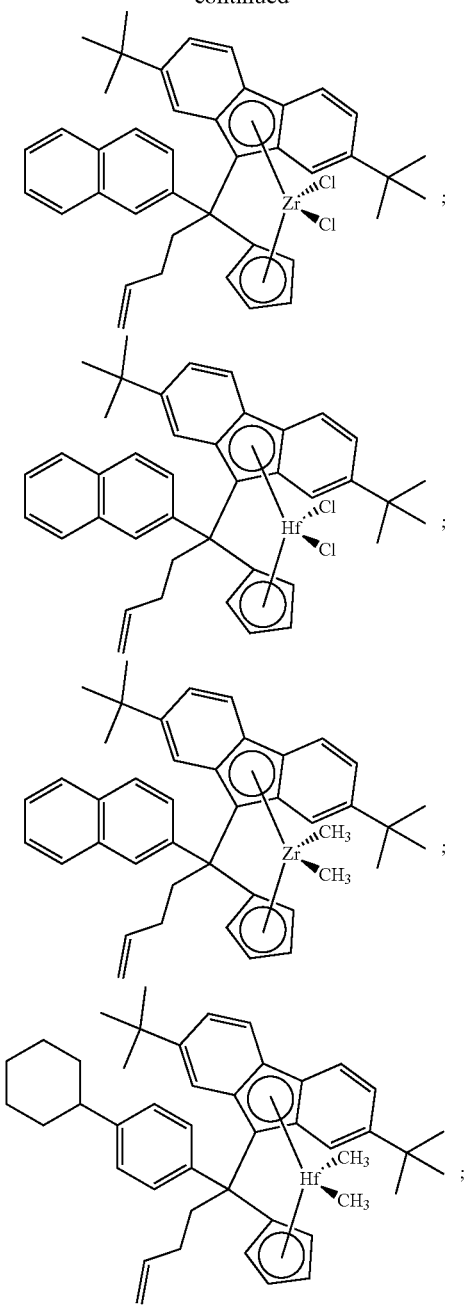

or any combination thereof.

56. A catalyst composition comprising a first metallocene compound, an unbridged second metallocene compound, an activator-support, and an organoaluminum compound, wherein:
(a) the first metallocene compound has the formula:

$(X^1)(X^2R^1_2)(X^3)(X^4)M^1$;

wherein $(X^1)$ is cyclopentadienyl, indenyl, or fluorenyl; $(X^2)$ is fluorenyl;
$(X^1)$ and $(X^2)$ are connected by a disubstituted bridging group comprising one atom bonded to both $(X^1)$ and $(X^2)$, wherein the atom is carbon or silicon;
a first substituent of the disubstituted bridging group is a phenyl group, a cyclohexylphenyl group, or a naphthyl group;

a second substituent of the disubstituted bridging group is an unsaturated aliphatic group having from 3 to about 10 carbon atoms;
$R^1$ is H, an alkyl group having from 1 to about 12 carbon atoms, or an aryl group having from 1 to about 12 carbon atoms;
$(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide;
$M^1$ is Zr or Hf;
(b) the second metallocene has the formula:

$(X^5)(X^6)(X^7)(X^8)M^2$;

wherein $(X^5)$ and $(X^6)$ are independently a substituted or unsubstituted cyclopentadienyl, or substituted or unsubstituted indenyl, any substituent on $(X^5)$ and $(X^6)$ is independently a linear or branched substituted or unsubstituted alkyl group, or a linear or branched substituted or unsubstituted alkenyl group, having from 1 to about 20 carbon atoms;
$(X^7)$ and $(X^8)$ are independently an aliphatic group, an aromatic group, a cyclic group, a combination of aliphatic and cyclic groups, or a substituted derivative thereof, having from 1 to about 20 carbon atoms, or a halide; and
$M^2$ is Zr or Hf.

57. The catalyst composition of claim 56, wherein the first metallocene is:

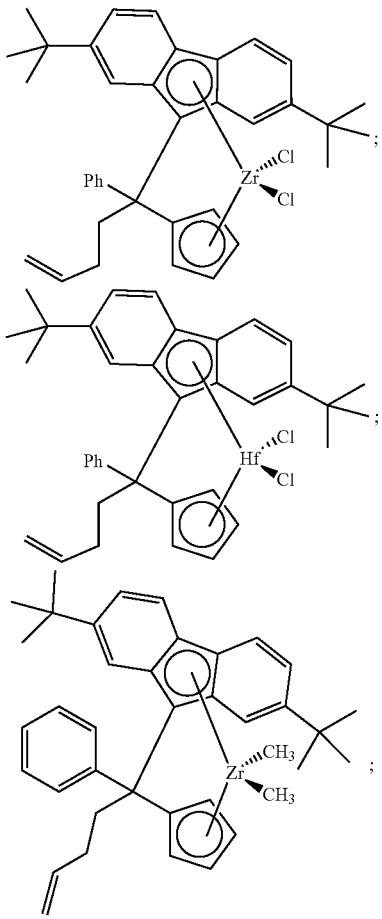

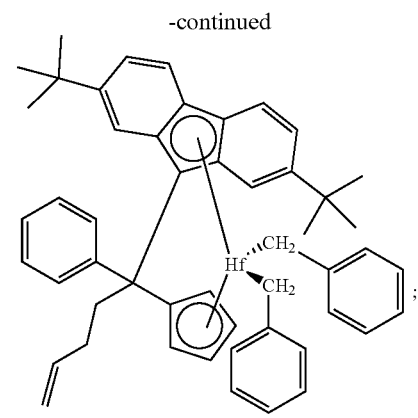
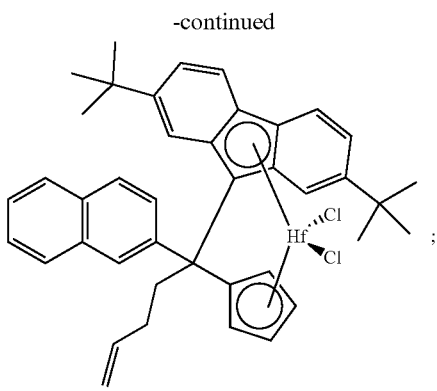
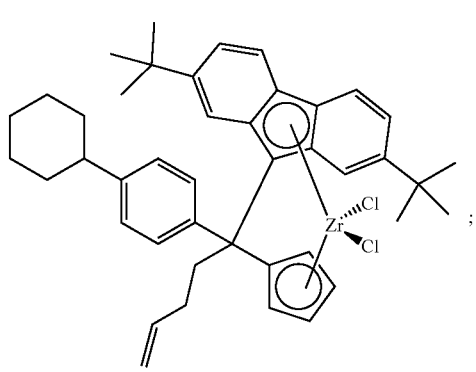
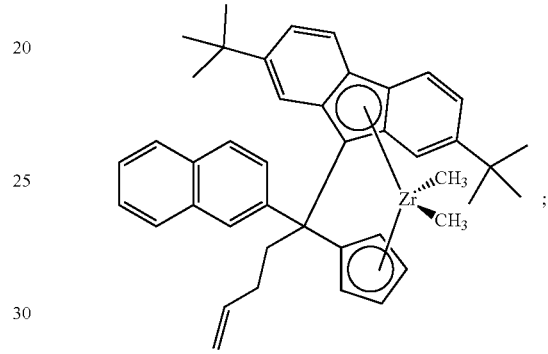
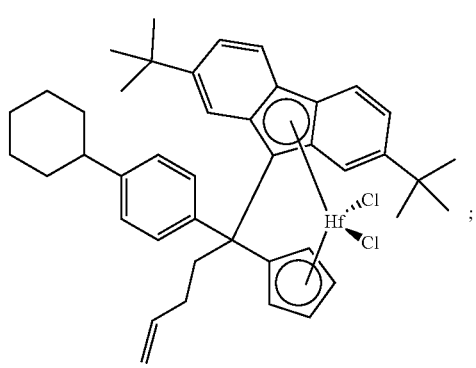
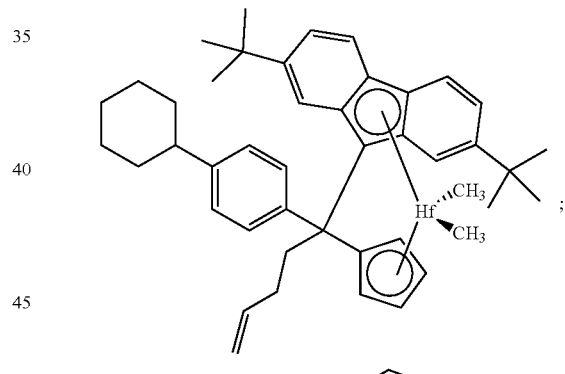
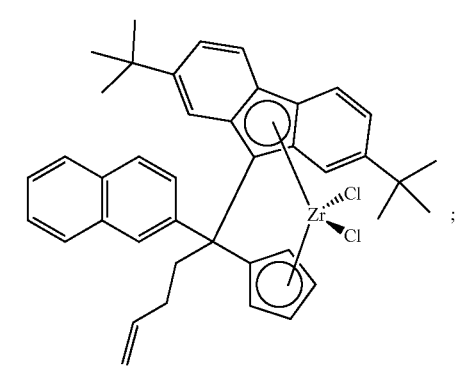
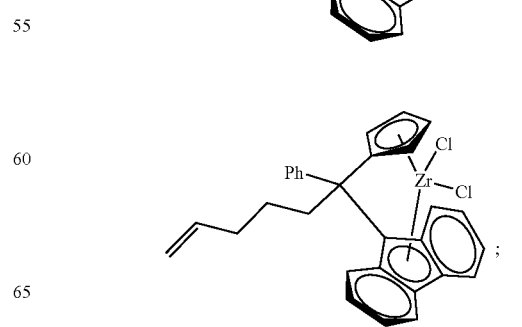

-continued

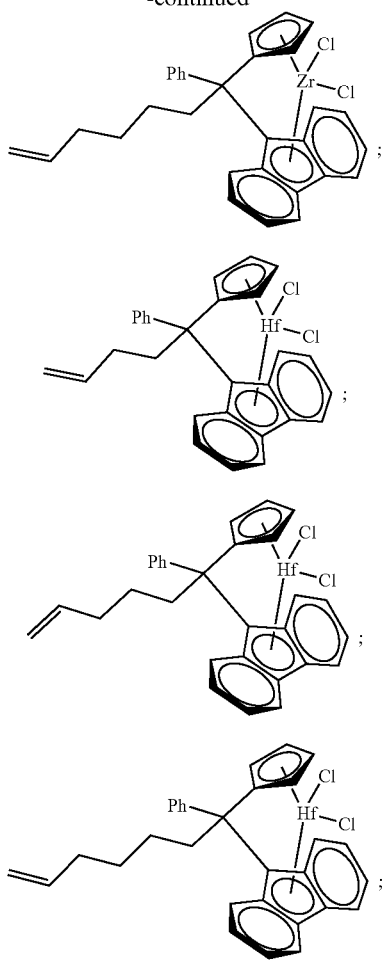

or any combination thereof.

58. A catalyst composition comprising a first metallocene compound, an unbridged second metallocene compound, an activator-support, and an organoaluminum compound, wherein:

(a) the first metallocene compound has the formula:

$(X^1)(X^2R^1{}_2)(X^3)(X^4)M^1$;

wherein $(X^1)$ is cyclopentadienyl, indenyl, or fluorenyl; $(X^2)$ is fluorenyl;

$(X^1)$ and $(X^2)$ are connected by a disubstituted bridging group comprising one atom bonded to both $(X^1)$ and $(X^2)$, wherein the atom is carbon or silicon;

a first substituent of the disubstituted bridging group is an aliphatic or aromatic group having from 1 to about 20 carbon atoms;

a second substituent of the disubstituted bridging group is a pentenyl group or a hexenyl group.

$R^1$ is H, an alkyl group having from 1 to about 12 carbon atoms, or an aryl group having from 1 to about 12 carbon atoms;

$(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide;

$M^1$ is Zr or Hf;

(b) the second metallocene has the formula:

$(X^5)(X^6)(X^7)(X^8)M^2$;

wherein $(X^5)$ and $(X^6)$ are independently a substituted or unsubstituted cyclopentadienyl, or substituted or unsubstituted indenyl, any substituent on $(X^5)$ and $(X^6)$ is independently a linear or branched substituted or unsubstituted alkyl group, or a linear or branched substituted or unsubstituted alkenyl group, having from 1 to about 20 carbon atoms;

$(X^7)$ and $(X^8)$ are independently an aliphatic group, an aromatic group, a cyclic group, a combination of aliphatic and cyclic groups, or a substituted derivative thereof, having from 1 to about 20 carbon atoms, or a halide; and $M^2$ is Zr or Hf.

59. The catalyst composition of claim 58, wherein the first metallocene is:

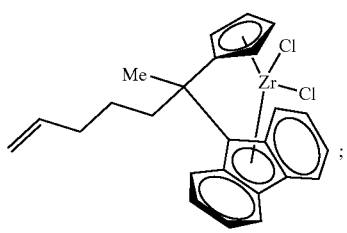

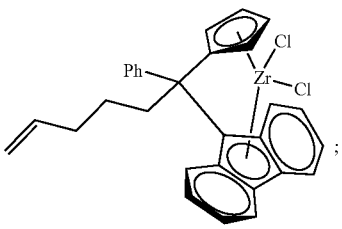

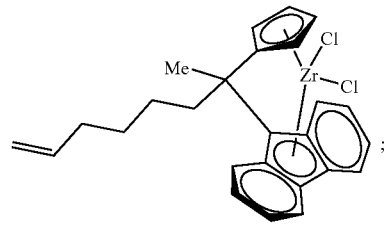

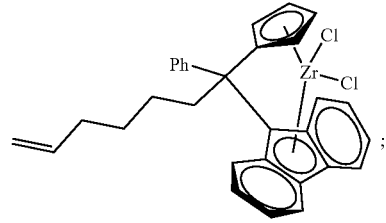

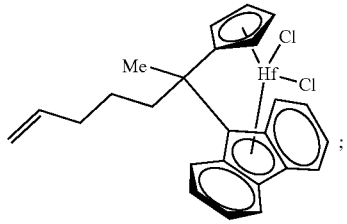

-continued

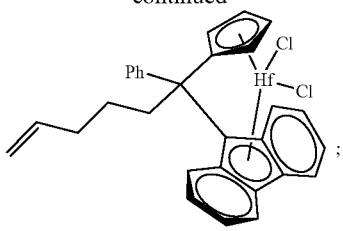

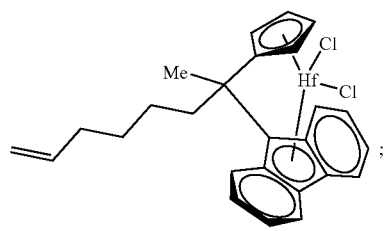

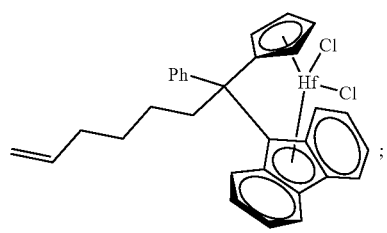

or any combination thereof.

60. A catalyst composition comprising a first metallocene compound, an unbridged second metallocene compound, an activator-support, and an organoaluminum compound, wherein:

(a) the first metallocene compound has the formula:

$(X^1)(X^2R^1_2)(X^3)(X^4)M^1;$ wherein ($X^1$) is cyclopentadienyl, indenyl, or fluorenyl;
($X^2$) is fluorenyl;
($X^1$) and ($X^2$) are connected by a disubstituted bridging group comprising one atom bonded to both ($X^1$) and ($X^2$), wherein the atom is carbon or silicon;
a first substituent of the disubstituted bridging group is an aliphatic or aromatic group having from 1 to about 20 carbon atoms;
a second substituent of the disubstituted bridging group is an unsaturated aliphatic group having from 3 to about 10 carbon atoms;
$R^1$ is H, an alkyl group having from 1 to about 12 carbon atoms, or an aryl group having from 1 to about 12 carbon atoms;
($X^3$) and ($X^4$) are independently an aliphatic group, an aromatic group, a cyclic group, a combination of aliphatic and cyclic groups, or a substituted derivative thereof, having from 1 to about 20 carbon atoms, or a halide;
$M^1$ is Zr or Hf;

(b) the second metallocene has the formula:

$(X^5)(X^6)(X^7)(X^8)M^2;$ wherein ($X^5$) and ($X^6$) are independently a substituted or unsubstituted cyclopentadienyl, or substituted or unsubstituted indenyl, any substituent on ($X^5$) and ($X^6$) is independently a linear or branched substituted or unsubstituted alkyl group, or a linear or branched substituted or unsubstituted alkenyl group, having from 1 to about 20 carbon atoms;

($X^7$) and ($X^8$) are independently an aliphatic group, an aromatic group, a cyclic group, a combination of aliphatic and cyclic groups, or a substituted derivative thereof, having from 1 to about 20 carbon atoms; and $M^2$ is Zr or Hf.

61. The catalyst composition of claim 60, wherein the second metallocene is:

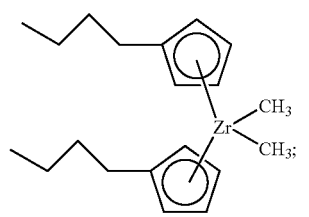

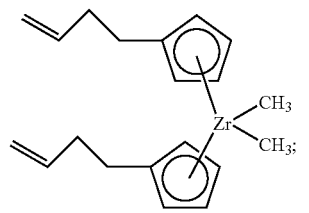

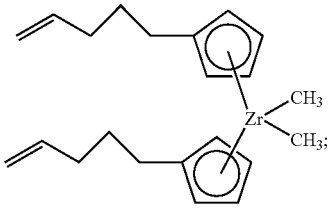

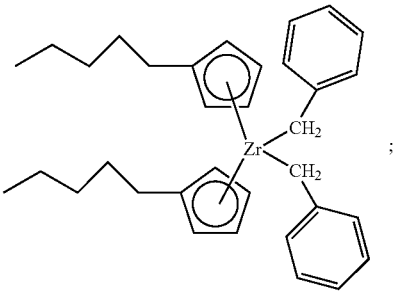

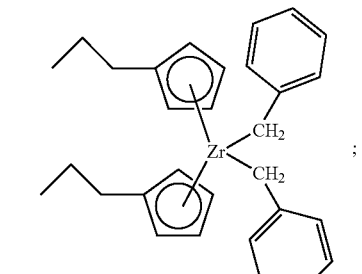

-continued

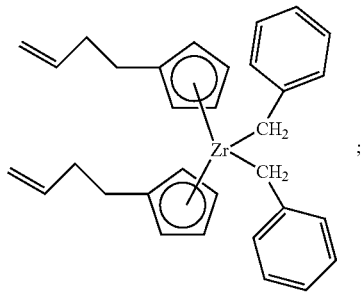

or any combination thereof.

62. A process for producing a catalyst composition comprising contacting a first metallocene compound, an unbridged second metallocene compound, an activator-support, and an organoaluminum compound, in any order, wherein:

(a) the first metallocene compound has the formula:

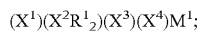

wherein ($X^1$) is cyclopentadienyl, indenyl, or fluorenyl; ($X^2$) is fluorenyl;

($X^1$) and ($X^2$) are connected by a disubstituted bridging group comprising one atom bonded to both ($X^1$) and ($X^2$), wherein the atom is carbon or silicon;

a first substituent of the disubstituted bridging group is an aliphatic or aromatic group having from 1 to about 20 carbon atoms;

a second substituent of the disubstituted bridging group is an unsaturated aliphatic group having from 3 to about 10 carbon atoms;

$R^1$ is H, an alkyl group having from 1 to about 12 carbon atoms, or an aryl group having from 1 to about 12 carbon atoms;

($X^3$) and ($X^4$) are independently an aliphatic group, an aromatic group, a cyclic group, a combination of aliphatic and cyclic groups, or a substituted derivative thereof, having from 1 to about 20 carbon atoms, or a halide;

$M^1$ is Zr or Hf;

(b) the second metallocene has the formula:

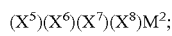

wherein ($X^5$) is a substituted or unsubstituted cyclopentadienyl, or substituted or unsubstituted indenyl, any substituent on ($X^5$) is independently a linear or branched substituted or unsubstituted alkyl group, or a linear or branched substituted or unsubstituted alkenyl group, having from 1 to about 20 carbon atoms;

($X^6$) is a substituted or unsubstituted cyclopentadienyl, or substituted or unsubstituted indenyl, any substituent on ($X^6$) is independently a substituted linear alkyl group, a branched substituted or unsubstituted alkyl group, or a linear or branched substituted or unsubstituted alkenyl group, having from 1 to about 20 carbon atoms;

($X^7$) and ($X^8$) are independently an aliphatic group, an aromatic group, a cyclic group, a combination of aliphatic and cyclic groups, or a substituted derivative thereof, having from 1 to about 20 carbon atoms, or a halide; and $M^2$ is Zr or Hf.

63. The process of claim 62, wherein the ratio of the first metallocene compound to the second metallocene compound is from about 1:10 to about 10:1.

64. The process of claim 62, wherein the ratio of the first metallocene compound to the second metallocene compound is from about 1:5 to about 5:1.

65. The process of claim 62, wherein the ratio of the first metallocene compound to the second metallocene compound is from about 1:2 to about 2:1.

66. The process of claim 62, wherein the weight ratio of the organoaluminum compound to the activator-support is from about 10:1 to about 1:1000.

67. The process of claim 62, further comprising contacting at least one aluminoxane, at least one organozinc compound, at least one organoboron compound, at least one ionizing ionic compound, or any combination thereof.

68. A process for polymerizing olefins in the presence of a catalyst composition, comprising contacting the catalyst composition of claim 1, 21, 35, 42, or 51, with at least one olefin monomer under polymerization conditions.

69. The process of claim 68, wherein the wherein the catalyst composition and the at least one olefin monomer are contacted in a gas phase reactor, a loop reactor, or a stirred tank reactor.

70. The process of claim 68, wherein at least one olefin monomer comprises from about 2 to about 30 carbon atoms per molecule.

71. The process of claim 68, wherein the at least one olefin monomer comprises ethylene, propylene, butane, hexane, octane or combinations thereof.

72. The process of claim 68, further comprising introducing a comonomer to the polymerization process.

73. The process of claim 72, wherein the monomer is ethylene and the comonomer is propylene, butane, hexane, octane or combinations thereof.

74. The process of claim 72, wherein the comonomer is 1-hexene.

75. The process of claim 72, wherein an amount of comonomer introduced is from about 0.01 to about 50 weight percent comonomer to total weight of monomer and comonomer.

* * * * *